United States Patent [19]

Morioka et al.

[11] Patent Number: 5,481,512
[45] Date of Patent: Jan. 2, 1996

[54] SEPARABLE MAGAZINE FOR ACCOMMODATING DISCS AND A DISC PLAYER

[75] Inventors: Shouji Morioka; Hiroshi Matsugase, both of Gunma; Katsutake Togawa; Mitsuru Nakagawa, both of Maebashi, all of Japan

[73] Assignee: Victor Company of Japan, Ltd., Yokohama, Japan

[21] Appl. No.: 85,320

[22] Filed: Jun. 29, 1993

[30] Foreign Application Priority Data

Jun. 30, 1992 [JP] Japan ................................ 4-195960
Jan. 29, 1993 [JP] Japan ................................ 5-034898

[51] Int. Cl.⁶ .......................... G11B 17/22; G11B 17/04
[52] U.S. Cl. ........................ 369/36; 369/34; 369/39; 369/178
[58] Field of Search ................ 369/34, 36, 38, 369/39, 75.1, 75.2, 77.1, 77.2, 178, 192, 193, 194

[56] References Cited

U.S. PATENT DOCUMENTS

| | | | |
|---|---|---|---|
| 4,998,618 | 3/1991 | Borgions | 369/36 |
| 5,058,100 | 10/1991 | Yoshii | 369/291 |
| 5,117,409 | 5/1992 | Shimizu et al. | 369/36 |
| 5,136,563 | 8/1992 | Takemasa et al. | 369/36 |

FOREIGN PATENT DOCUMENTS 0168107  1/1986  European Pat. Off. ............... 369/178

OTHER PUBLICATIONS

A technical sheet by STAAR, s.a. published in Belgium in Jan. 1992 entitled "Dual Changer".

Primary Examiner—Stuart S. Levy
Assistant Examiner—William J. Klimowicz
Attorney, Agent, or Firm—Michael N. Meller

[57] ABSTRACT

The present invention discloses a magazine for accommodating a plurality discs and an automatic disc player employing the magazine from which a desired disc to be played by the player is automatically selected and separated from the magazine. The magazine comprises a plurality of stacked wafers for holding the plurality of discs a coupling device for separably coupling the wafers forming the magazine. The wafers include a plurality of trays each of which comprises a disc clamping device for releasably holding each of the discs on a bottom surface of each tray. When the magazine is loaded into the automatic disc player, the coupling device is activated to separate the wafers for providing at least a predetermined space between the wafers and for allowing a disc playing device of the player to enter into the predetermined space, wherein the disc clamping device releases one of the discs held by the disc clamping device of the tray selected by the player so that a released disc is transferred to a turntable of the disc playing device to be played.

3 Claims, 46 Drawing Sheets

TOP VIEW

TOP VIEW ( LOCKED )

TOP VIEW ( UNLOCKED )

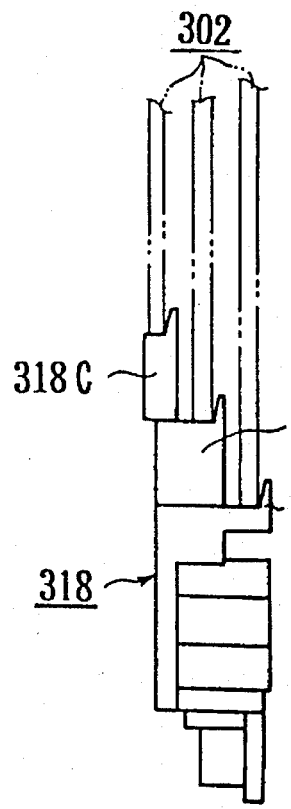
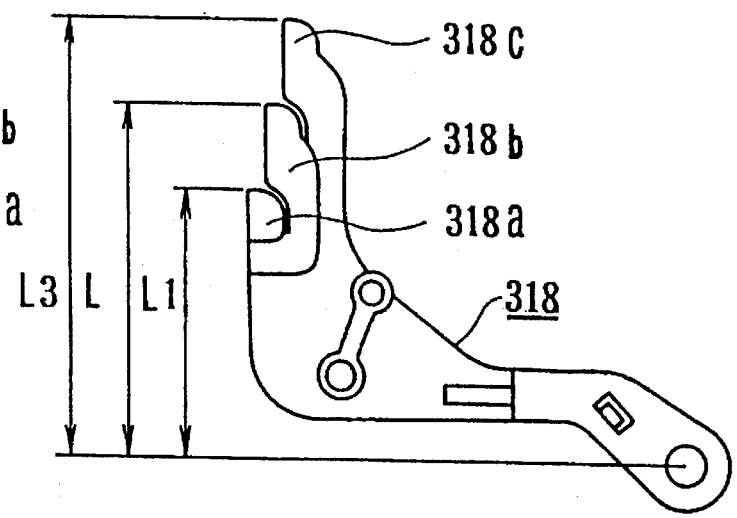
Fig.30(A)   Fig.30(B)
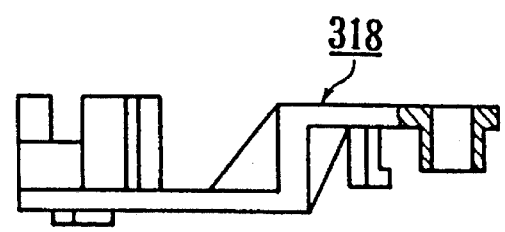
Fig.30(C)

SEPARABLE MAGAZINE FOR ACCOMMODATING DISCS AND A DISC PLAYER

BACKGROUND OF THE INVENTION

1. Field of the Invention

The present invention relates to improvements of a magazine for accommodating discs therein, and it particularly relates to a magazine comprising a stack of plural trays for holding discs, which magazine is inserted in an automatic disc player so that a desired disc in the magazine is automatically selected and played therein by causing the automatic disc player to separate vertically the magazine containing discs held by respective trays so that the desired disc held by a tray is exposed to allow an access of a disc play mechanism of the automatic disc player for playing the desired disc.

2. Description of the Related Art

Recently, a disc (optical disc) such as a CD (Compact Disc), a CD-ROM (Read Only Memory), a CD-I (Interactive) or a VD (Video Disc) is popular among users and is widely used as recorded sound information, picture information, or character information because it is capable of storing a large amount of information by converting the information into a plurality of microscopic pits on the disc and of performing a quick random access by using an optical pick-up provided in a disc player.

There is such a disc player for automatically playing the above discs as employing a magazine for accommodating a plurality of discs therein of a prior art as shown in FIG. 1, wherein the magazine is mounted on a loading mechanism of the disc player and a desired disc is automatically played by causing the loading mechanism to select and drawn out the desired disc from the the magazine.

FIG. 1 is a perspective view showing the magazine for accommodating discs of a prior art.

Referring to FIG. 1, a numeral 500 designates the magazine for accommodating discs of the prior art (hereafter referred to as magazine 500) having a boxlike configuration in appearance, 500a an opening provided on the side of the magazine 500, 500b and 500b guide grooves provided at both inner side wall of the magazine 500, 501 plural trays each accommodating a disc 502 provided slidably along the guide grooves 500b and 500b being stacked with a predetermined spacing provided therebetween.

The magazine 500 is mounted in a magazine accommodating place 510b of an automatic disc player 510 by being inserted through an inlet 510a thereof in a direction as shown with an arrow FA. A tray 501 holding a desired disc 502 is drawn out and transferred to an upper position of a disc playing section 510c of the automatic disc player 510 from the magazine 500 by a tray drawing means (not shown). The selected disc 502 is mounted on a turntable 511 from the tray 501 by causing a tray transfer mechanism (not shown) to transfer the tray 501 downward. After that, the tray 501 is retracted in a downward position of the turntable 511 and the selected disc 502 is played by using an optical pickup 512 of the disc player 510.

In the magazine 500 of the prior art, however, the disc playing section 510c is provided in a position adjacent to the magazine accommodating place 510b in the disc player 510, i.e. a location of the disc playing section 510c is required to be remote enough to draw out the tray 501 from the magazine 500 completely, which requires approximately the same area as that of the magazine accommodating place 510b. Thus, it poses a problem of downsizing the disc player 510 because the employment of the magazine requires at least more than twice an occupied area of the magazine 500 even when the magazine would be designed small enough to accommodate the discs 502 therein.

Still more, it poses a problem that the magazine 500 degrades portability itself because of an increase of a height in overall dimensions due to such a structure of the magazine that plural trays each accommodating a disc 502 are provided slidably along the guide grooves 500b and 500b being stacked with a predetermined spacing provided therebetween for the slidability in the magazine 500 as mentioned in the foregoing.

SUMMARY OF THE INVENTION

Accordingly, a general object of the present invention is to provide a magazine for accommodating discs in which the above disadvantages have been eliminated.

A specific object of the present invention is to provide a magazine for accommodating a plurality of discs each held by disc clamp means on a tray, the magazine being loaded into an automatic disc player having a disc play mechanism so that a desired disc in the magazine is automatically selected and played therein, the magazine comprising, a tray base for stacking a plurality of the trays tightly thereon, a magazine slide plate slidably provided around the stacked trays and the tray base so as to be displaced to take a magazine hand-carried state where the magazine is integrally formed for allowing the magazine to be hand-carried by causing the magazine slide plate to enclose one part of the periphery of the tray base and the stacked trays, and so as to be displaced to take a magazine separable state where the stacked trays are separable in two parts in a stacked direction of the trays, and restrict means provided between the tray base and the magazine slide plate for restricting the magazine slide plate in the magazine hand-carried state and for preventing the magazine slide plate from being displaced to take the magazine separable state, whereby the magazine is allowed to be loaded in the automatic disc player when the magazine slide plate is slidably displaced to take the magazine hand-carried state, and the desired disc is selected together with one of the trays and the one of the trays being separated from the stacked trays when the magazine slide plate is displaced to take the magazine separable state in the automatic disc player by causing the restrict means to release restrict on of the magazine slide plate upon loading of the magazine into the automatic disc player.

An another specific object of the present invention is to provide an automatic disc player adapted to use a magazine comprising a plurality of stacked wafer containing a tray base and a plurality of tray for holding a plurality of discs therebetween and a magazine slide plate for separably coupling the wafers forming the magazine, each of the trays having a selection engage portion for being selected in the magazine, the automatic disc player having means for selecting a desired disc held by a selected tray and separating the selected tray from the stacked trays by causing the magazine slide plate to displace to a position taking a magazine separable state upon an insertion of the magazine in the automatic disc player comprising, magazine loading means for displacing and positioning the magazine to the position taking the magazine separable state upon the insertion of the magazine in the automatic disc player by engaging with the tray base of the magazine, disc play means including a turntable and an optical pickup, and tray selection and separation means for selecting one of the trays holding the desired disc and for separating the magazine into two parts in a tray stacked direction so as to form a predetermined space beneath the selected tray to allow the disc play means to access the desired disc to be played by engaging with the selection engage portion of the selected tray.

Other object and further features of the present invention will be apparent from the following detailed description.

BRIEF DESCRIPTION OF THE DRAWINGS

FIGS. 30 (A) through (c) are plan views for explaining the disc clamp release lever.

FIGS. 35(A)–35(B) are perspective views respectively showing the second state of the magazine 301 corresponding to the second slide position of the magazine slide plate 307 when the magazine 301 is mounted on the disc player 330, wherein FIG. 35(A) shows a separation of the lower tray 305 from the tray base 306, FIG. 35(B) shows a separation of the middle tray 304 from the lower tray 305.

DETAILED DESCRIPTION OF THE PREFERRED EMBODIMENT

Figure 1:
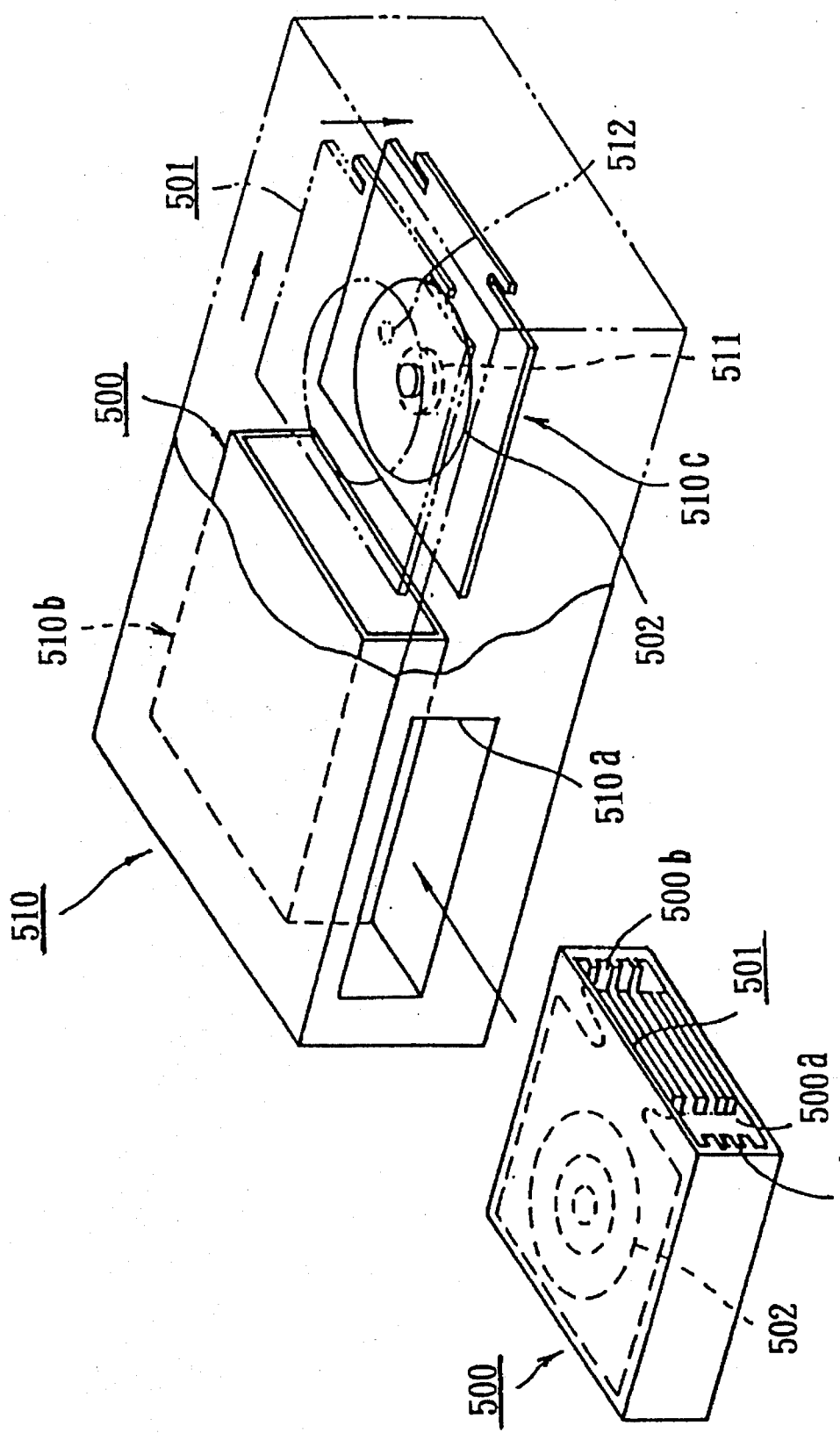
FIG. 1 is a perspective view showing a magazine for accommodating discs of a prior art.

A description will be given to first and second embodiments of magazines (referred to magazine hereafter) for accommodating discs according to the present invention referring to figures, wherein a construction and an operation of the magazine as well as a construction and operation of each component of an automatic disc player for using the magazine of the present invention and an overall operation of the automatic disc player are described in detail.

In the first embodiment, a magazine 1 of the present invention is described together with an automatic disc player 20 (referred to as player 20 hereafter) referring to FIGS. 2 through 25, and in the second embodiment, a magazine 301 is described together with an automatic disc player 330 (referred to as player 330 hereafter) referring to FIGS. 26 through 43.

Further, it should be noted that, comparing the first embodiment with the second embodiment, both the embodiments are realized based on such a common technical concept that a magazine 1 (301) comprising a plurality of stacked wafers for holding a plurality of discs therebetween and coupling means for separably coupling the wafers forming the magazine, the wafers including a plurality of trays each of which comprises clamping means for releasably holding each of the discs directly on a bottom surface of each tray, however, the two embodiments are different from each other in constructions and in operation, so that players 20 and 330 are respectively constructed to be suited for the magazine 1 of the first embodiment and the magazine 301 of the second embodiment.

1. A First Embodiment

A Construction of a Magazine of the First Embodiment

Figure 2:
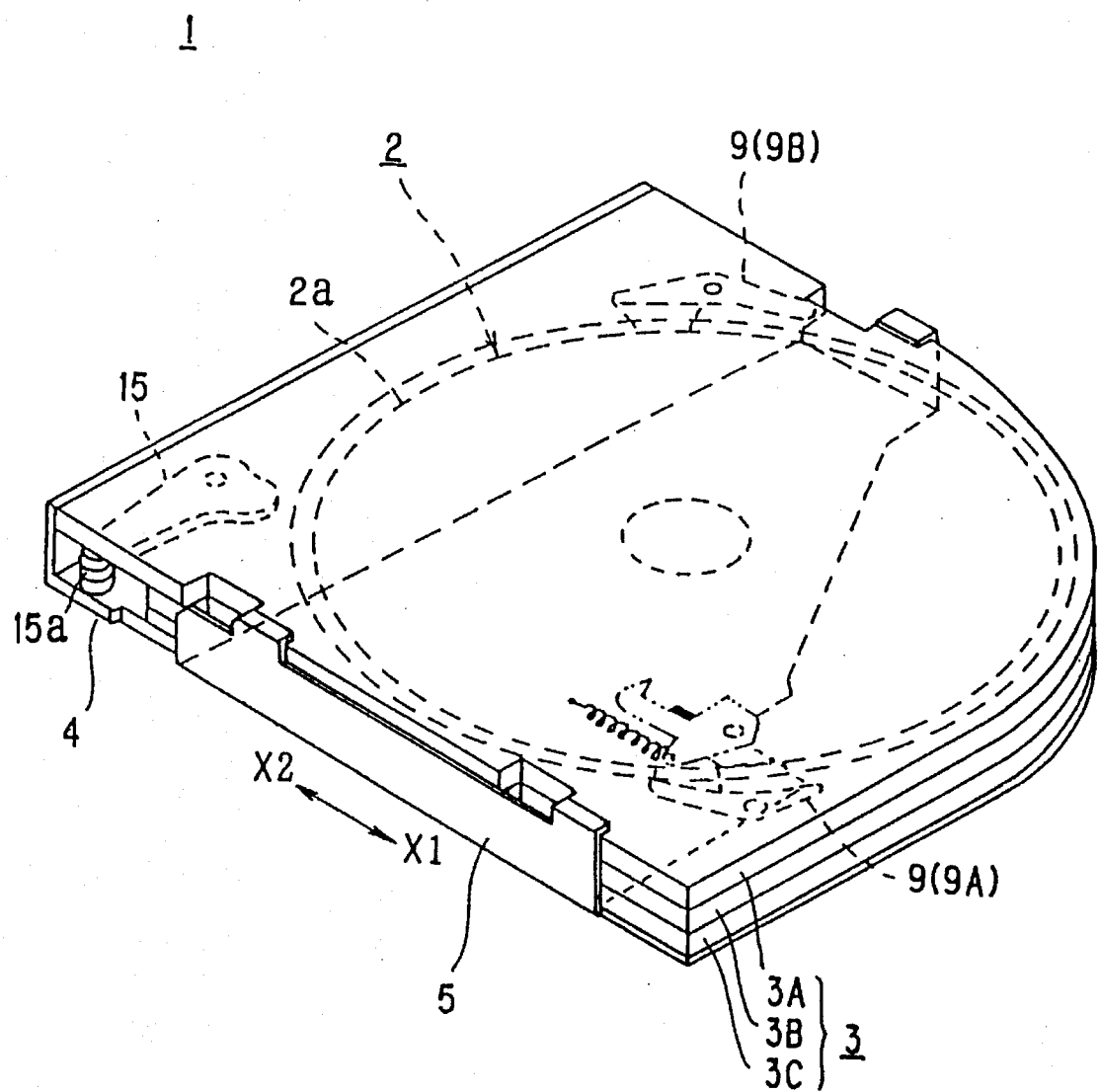
FIG. 2 is a perspective view showing a magazine of the first embodiment of the present invention.
Figure 3:
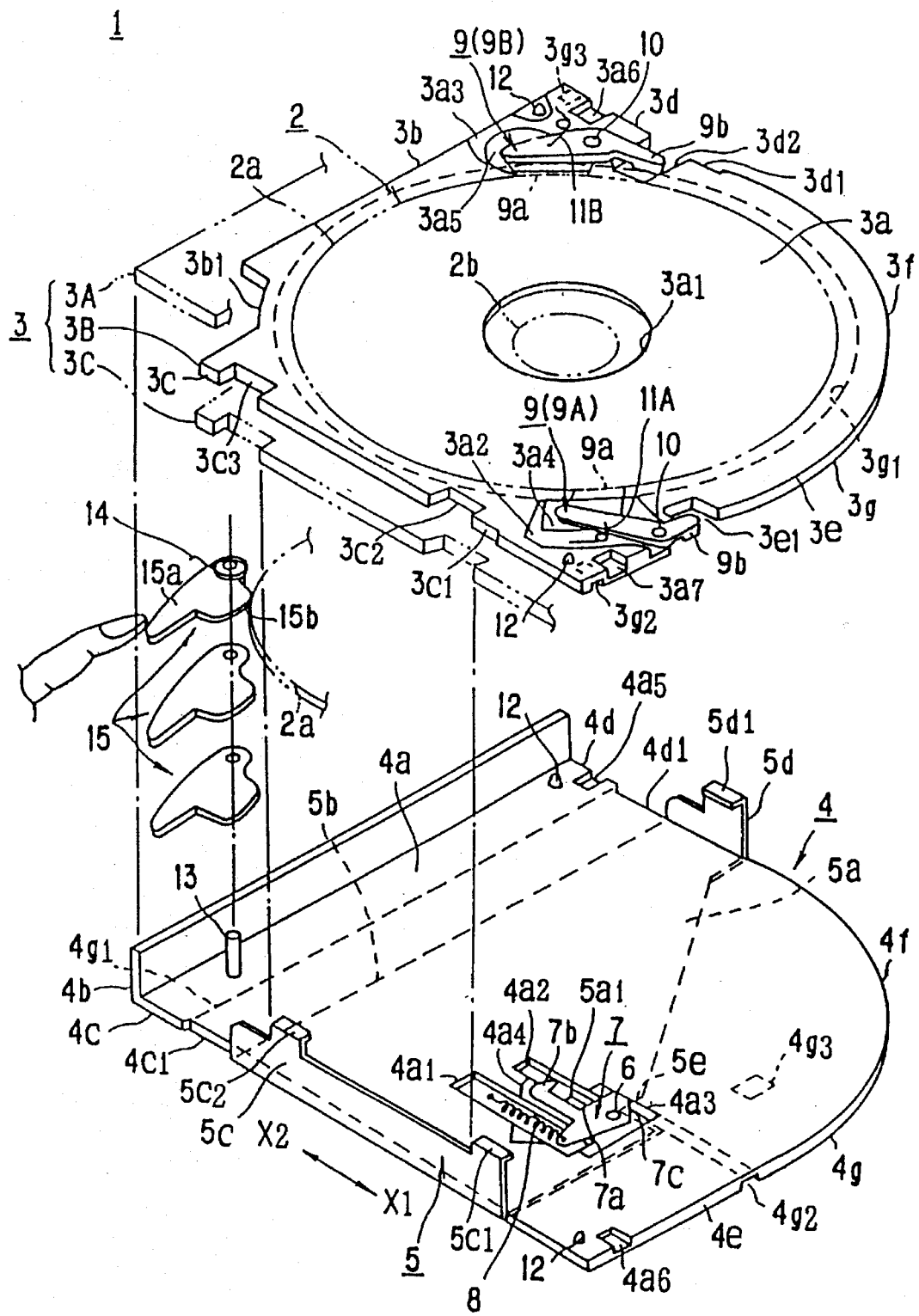
FIG. 3 is an exploded perspective view of the magazine shown in FIG. 2.

A description is given to a construction of a magazine of the first embodiment referring to FIGS. 2 through 3.

FIG. 2 is a perspective view showing a magazine of the first embodiment of the present invention, and FIG. 3 is an exploded perspective view of the magazine shown in FIG. 2.

The magazine 1 is constructed so as to be suited for with the player 20 (FIG. 8) for automatically and selectively playing such a disc (optical disc) 2 as a compact disc (CD).

Figure 4:
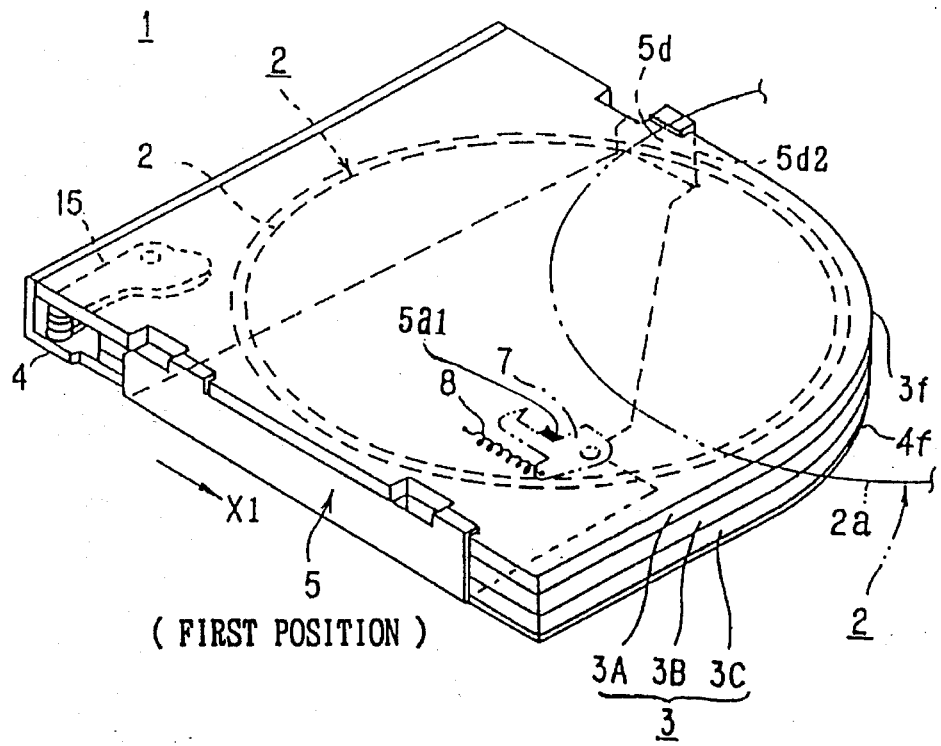
FIGS. 4 through 7 are perspective views showing operations of the magazine of the first embodiment.
Figure 5:
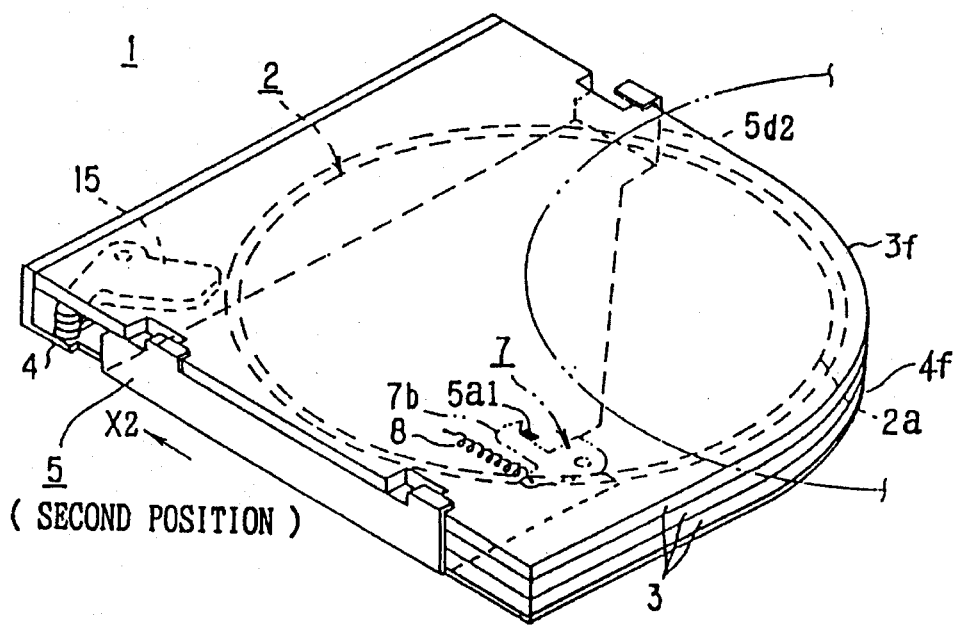
Figure 6:
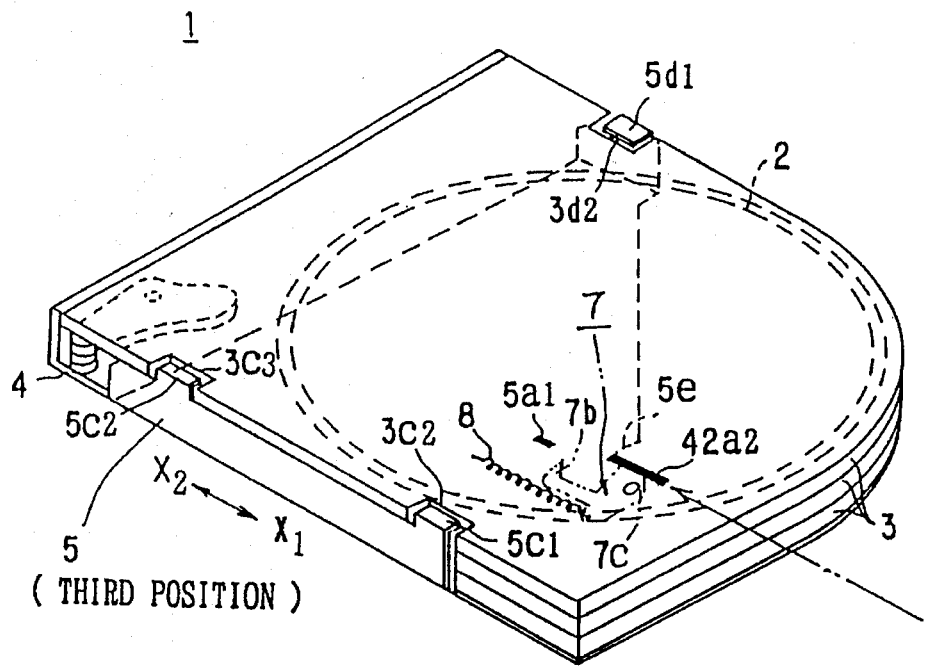

Generally, the magazine 1 comprises a tray base 4 (wafer), a plurality of trays (wafers) 3 (3A, 3B, 3C) stacked on the tray base 4 in a closely stacked manner each for accommodating a disc 2 being supported at peripheral portions thereof by a pair of disc supporting levers 9 (9a, 9b) provided one each of the trays 3, and a magazine slide plate 5 slidably provided under the tray base 4 and a part of trays 3, wherein the magazine slide plate 5 causes the magazine 1 to take three states by changing position thereof, i.e. a first state as shown in FIG. 2 and in FIG. 4, a second state as shown in FIG. 5 and a third state as shown in FIG. 6 as described hereafter.

In the above description, the expression, "in a closely stacked manner" means "being stacked in a directly contacted state without space or spacers between the trays 3 (3A, 3B, 3C) and the tray base 4". Further, it should be noted that in the aforementioned first state, trays 3 with and without the discs 2 can coexist in the magazine 1. Further, for example, when three pieces of ordinary CDs, each having a diameter of 120 mm and a thickness of 1 mm, are mounted in the respective three trays 3A–3C of the magazine 1 in the closely stacked manner, the magazine 1 forms a frame body having an external dimension of 125 mm×125 mm×10 mm, thus, it will be understood that the magazine 1 of the present invention is excellent in portability.

In this embodiment, three sheets of trays 3 are employed in the magazine 1, however, the number can be optionally selected depending on a design of the magazine. In the player 20 shown in FIG. 8, a magazine having five sheets of trays 3 is employed as described hereafter.

Figure 7:
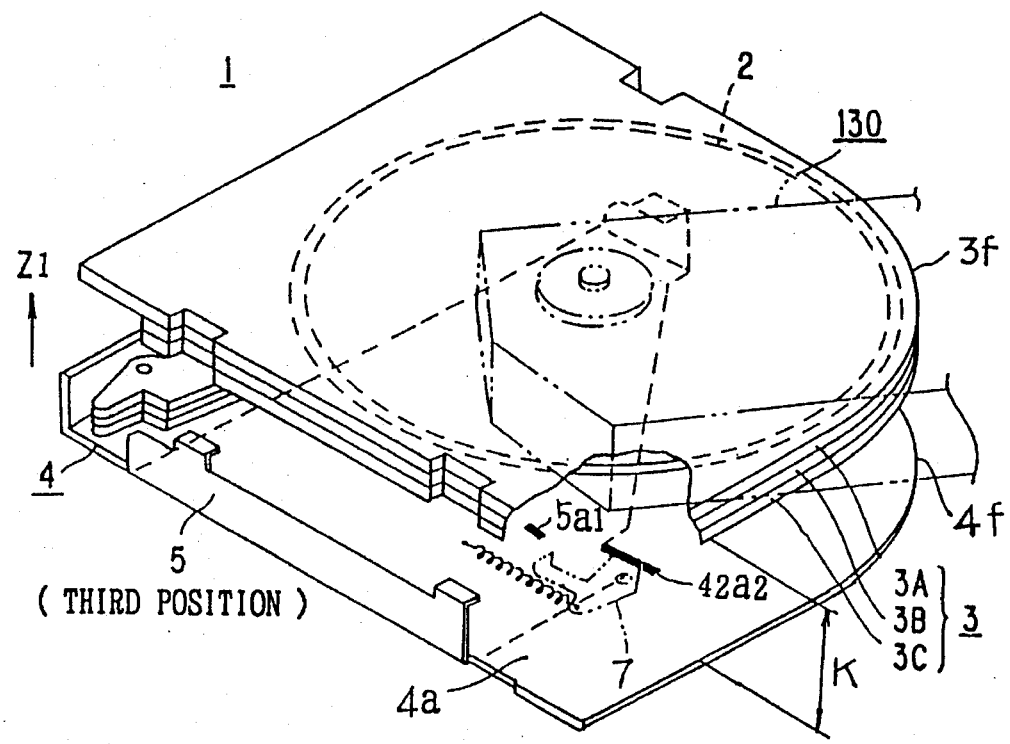

Further, the magazine 1 is constructed so as to allow the three states in operations correspondingly with slide positions of the magazine slide plate 5 i.e. a first slide position as shown in FIG. 4, wherein the magazine 1 is able to be hand-carried with the discs 2, however, the discs 2 are prevented from being inserted thereto or released there from the magazine 1, a second slide position as shown in FIG. 5, wherein the magazine 1 is able to be hand-carried of which the discs 2 are allowed to be inserted to or released from for a disc replacement purpose, and a third slide position as shown in FIG. 6 and FIG. 7, wherein with the magazine 1 being inserted in the player 20 (FIG. 8), a desired tray 3 selected from the trays 3 stacked on a tray base 4 can be displaced away from the tray base 4 in a vertical direction so as to produce a space K under the desired tray, thus, a disc play mechanism 130 (FIG. 9) of the player 20 is allowed to move into the space K to play the selected disc 2.

It should be noted that although FIG. 7 shows the space K provided under the bottom disc 2 of the three discs 2 which are displaced up together, any of the three together with their respective trays 3 located on top or in an intermediate layer can be displaced away or separated from the rest of the disc(s) left underneath so as to produce the space K between the selected disc and the disc(s) left underneath.

Next, a description is given to the components of the magazine 1 in detail referring to FIG. 3.

In FIG. 3, the tray base 4 comprises a thin bottom plate 4a having a rectangular portion together with an R(round)-portion 4f, and a side plate 4b elected upright from one end of the bottom plate 4a, thus, the tray base 4 has an L-shaped configuration made of a resin material. The bottom plate 4a defines a pair of opposed sides 4c, 4d each being perpendicular to the side plate 4b and a side 4e being parallel to the side plate 4b, and further defines the R-portion 4f having a larger radius than that of the disc 2 at a corner formed by the side 4e and the side 4d. Thus, the discs 2 are easily inserted or released into or from the R-portion 4f, which also enables an access of the disc play mechanism 130 to the desired disc 2 with a shortest stroke by a swing motion as described hereafter.

The aforementioned magazine slide plate 5 is integrally formed by using a thin stainless steel sheet. The magazine slide plate 5 comprises a bottom plate 5a having a flat trapezoid configuration, a side edge 5b facing the side plate 4b, a pair of side plates 5c and 5d erected upright at both the sides of the bottom plate 5a, and a pair of bent portions 5c1, 5c2, and a bent portion 5d1 each protrudingly provided inward at both the tops of the side plates 5c, 5d at right angles.

The magazine slide plate 5 is slidably assembled to the tray base 4 in such a manner that the side plates 5c, 5d contact with both the sides 4c, 4d thereof and the bottom plate 5a of the magazine slide plate 5 contacts with the bottom 4g of the tray base 4.

The tray base 4 is provided with a shallow trapezoid recess 4g1 similar to the configuration of the magazine slide plate 5 at the bottom 4g thereof and with a pair of shallow elongated recesses 4c1, 4d1 at both the sides 4c, 4d of the tray base 4. In the trapezoid recess 4g1, the magazine slide plate is allowed to slide in directions shown with arrows X1 and X2. End walls of the recesses 4c1, 4d1 define a range of sliding motion of the magazine slide plate 5 in the directions of the arrows X1 and X2.

The tray base 4 is further provided with rectangular passing holes 4a1–4a3 and a shallow trapezoid recess 4a4 adjacent to the rectangular passing holes 4a–4a3. A hook member 7 is swingably provided at an axle 6 on the bottom plate 4a for restricting the sliding range of the magazine slide plate 5. An extension spring 8 is tensionally provided between an end of the hook member 7 and an upper surface of the magazine slide plate 5 through the rectangular passing hole 4a1. Thus, the hook member 7 is biased in a clockwise direction by the extension spring 8 centering on the axle 6, and the magazine slide plate 5 is also biased in a direction of an arrow X1 (FIG. 4) by the extension spring 8.

On the other hand, a tab 5a1 provided on the upper surface of the magazine slide plate 5 protrudes into the rectangular passing hole 4a2 so as to restrict the rotation of the hook member 7 in the clockwise direction by causing an end portion of the tab 5a1 to abut on a contact part 7a of the hook member 7. The hook member 7 further comprises a hook portion 7b apart from the contact part 7a by a predetermined distance which is longer than the length of the tab 5a1, thus the magazine slide plate 5 is able to be slidden in a predetermined distance in both directions X1 and X2, i.e. the magazine slide plate 5 is able to be slidden from a first position shown in FIG. 4 to a second position shown in FIG. 5 by manipulation.

Furthermore, the hook member 7 comprises an engage release portion 7c which is positioned in the rectangular passing hole 4a3.

A guide groove 4g2 is provided on the bottom 4g of the tray base 4 from a side 4e thereof to the rectangular passing hole 4a3 so as to allow an engagement release member 42a2 of the player 20 (FIG. 10) to engage with the engage release portion 7c of the hook member 7 for releasing the engagement of the hook member 7 from the tab 5e1 by causing the engagement release member 42a2 to rotate the hook member 7 in the counterclockwise direction against the extension spring 8 in cooperation with the insertion operation of the magazine 1 into the player 20 as mentioned hereafter.

Further, a shallow rectangular recess 4g3 is provided on the bottom 4g of the tray base 4 so as to engage with a lug 48b provided on a sliding member 48 (FIG. 10) of the player 20.

Furthermore, separation recesses 4a5, 4a6 are shallowly formed on an upper surface 4a of the tray base 4 from the sides 4d, 4e thereof so that the tray base 4 is pushed down by causing push levers 113B, 113A (FIG. 16) of the player 20 to engage with the separation recesses 4a5, 4a6 when the trays 3 are separated.

Further, positioning pins 12, 12 for positioning the trays 3 at a predetermined position on the tray base 4 or on the tray 3 are respectively provided on the tray base 4 and each of the trays 3, as well as positioning holes (not shown) provided on the bottom 3g of each of the trays 3 in corresponding with the positioning pins 12, 12.

Next, a description is given to a plurality of trays 3 (3A–3C) which are stacked on the tray base 4 in the closely stacked manner. Each of the trays 3 is made of a thin flat resin plate and has approximately the same configuration as the bottom plate 4a of the tray base 4, wherein 3a designates an upper surface, 3b–3e respective sides, 3f an R-portion, 3g a bottom. Except for the upper surface 3a, these numerals or characters are named after those of the tray base 4.

The configuration of the uppermost tray 3A among the plurality of trays 3 is different from those of the other lower trays 3B, 3C, i.e. the uppermost tray 3A is loaded with the disc 2 at the bottom 3g thereof as well as other trays, however, the uppermost tray 3A is not provided with a center hole 3a1 as described hereafter. Thus, the uppermost tray 3A is hermetically formed so as to prevent dust from invading the disc 2, however, components of the uppermost tray 3A are the same as those of the other lower trays 3B, 3C. Therefore, the description is mainly given to the lower trays 3 (3B, 3C) here.

Referring to FIG. 3, the above trays 3 are closely stacked on the tray base 4 in such a manner that the bottom 3g of the tray 3C on which other trays 3B, 3A are stacked in this order, is placed on the bottom plate 4a of the tray base 4 by causing the guide pins 12, 12 to engage with positioning holes (not shown) of the tray 3C, fitting the sides 3c–3e of the trays 3C–3E to the sides 4c–4e of the tray base 4 and the side 3b thereof to the inside of side plate 4b and the R-portion 3f to be aligned with the R-portion 4f of the tray base 4, respectively. In particular, the latter arrangement enables to mount or detach the disc 2 easily on or from the tray 3 at the shortest distance, which also enables the access of a disc play mechanism 180 of the player 20 (FIG. 8, FIG. 9) to the disc 2 at the shortest transferring distance as mentioned in the foregoing. It should be noted that the rectangular portion of the tray 3 prevents the tray 3 from rotating away, and facilitates portability of the tray 3.

Further, elongated first recesses 3c1, 3d1 are shallowly formed at both sides 3c, 3d of the tray 8 for slidingly contacting with the side plates 5c, 5d of the magazine slide plate 5. When the trays 8 are stacked on the tray base 4, these elongated recesses 8c1, 8d1 restrict a motion of the magazine slide plate 5 in the direction of the arrow X1 by causing right walls of the first elongated recesses 3c1, 3d1 to abut on one ends of the magazine slide plate 5 and in the direction of the arrow X2 by causing left walls of the elongated first recesses 3c1, 3d1 to abut on the other ends of the magazine slide plate 5.

Further, second recesses 3c2, 3c3 and 3d2 having configurations larger than those of bent portions 5c1, 5c2 and 5d1 of the magazine slide plate 5 are respectively provided in the elongated first recesses 3c1 and 3d2 of the trays 3. Thus, the second recesses 3c2, 3c3 and 3d2 allow separation of the stacked trays 3 by causing the magazine slide plate 5 to displace to a position where second recesses 3c2, 3c3 and 3d2 are just over the bent portions 5c1, 5c2 and 5d1 of the magazine slide plate 5 as mentioned hereafter.

Further, a center passing hole 3a1 larger than a center hole 2b of the disc 2, and a shallow circular recess 3g1 for holding the disc 2 in position are provided approximately at a center of each of the trays 3 except the uppermost tray 3A which is not provided with the passing hole 3a1 as mentioned in the foregoing. The shallow circular recess 3g1 having a slightly larger diameter than that of the disc 2 is provided coaxially with the center passing hole 3a1 at the bottom 33g of the tray 3.

Further, a thickness of E-portion 3f of the tray 3 is formed thinner than that of the other peripheral portion thereof. Thus, the R-portion 3f together with the same of the adjacent tray 3 forms an inlet (not shown) for allowing the disc 2 to be inserted or to be released into or from the circular recess 3g1 when the plural trays 3 are stacked tightly.

Further, a pair of disc clamp levers 9 (9A, 9B) are installed at opposed corners within shallow recesses 3a2, 3a3 formed at a periphery of the circular recess 3g1 on the upper surface 3a of the tray 3 so as not to protrude the upper surface 3a for clamping the disc 2. These disc clamping levers 9 (9A, 9B) are pivoted on axes 10, 10 with being biased by a torsion springs 11 (11A, 11B) in such manners that the disc clamp lever 9A is biased in a clockwise direction and the disc clamper lever 9B is biased in a counterclockwise direction. Clamp portions 9a, 9a formed at one ends of the disc clamp levers 9, are respectively positioned in passing holes 3a4, 3a5 to clamp the peripheral portions of the disc 2 mounted at the bottom of the tray. On the other hand, contact arms 9b, 9b formed at the other ends of the disc clamp levers 9, are respectively positioned in cutouts 3d2, 3e1, wherein the contact arms 9b, 9b are pushed by disc clamp release levers 121A (FIG. 12) and 121B of the player 20 so that the clamp portion 9a and 9a are displaced to release the disc 2 from the tray 3.

Further, first separation recesses 3a6, 3a7 are shallowly provided on the upper surface 3a from sides 3d, 3e in positions corresponding to the separation recesses 4a5, 4a6 of the tray base 4 to engage with push levers 113B, 113A (FIG. 12) as described hereafter.

Further, second separation recesses 3g2, 3g3 are shallowly provided on the bottom 3g of the tray 3 at opposed corners to engage with nails 111a, 111b of lifters 111A, 111B provided in the player 20 as described hereafter.

On the other hand, on the bottom plate 4a of the tray base 4, a pin 13 is provided nearby the side plate 4b. A plurality of disc discharge levers 15 are pivoted on the pin 13 being biased with torsion springs 14 in such a manner that the disc discharge levers 15 are respectively positioned in a cutout 3b1 connected to the circular recess 3g1 of the tray 3. Thus, each of disc discharge levers 15 is respectively able to be rotated to push the disc 2 out of the inlet formed by the R-portions 3f of the tray 4 against the torsion spring 14 by a finger of an user, even when the disc is clamped by the clamp levers 9A, 9B. As an alternative to the above construction, a single lever which discharges a plurality of discs 2 out of the R-portion 3f at a time is also possible.

Operations of the Magazine 1 of the First Embodiment

FIGS. 4 through 7 are perspective views showing operations of the magazine of the first embodiment.

In the magazine 1 of the first embodiment, it is able to separate a desired tray vertically (stacked direction) at a predetermined distance to allow the player 20 (FIG. 8) to play the desired disc 2 only when the magazine 1 is mounted in the player 20.

A description is given to operations of the magazine 1 together with a brief description of the operation of the player 20 in relation to the magazine 1, a detailed description of the player 20 will be given thereafter.

Generally, the magazine 1 has three states, as described in the foregoing, i.e. the first state the second state and the third state, corresponding to three positions of the magazine slide plate 5, i.e. the first slide position, the second slide position and the third slide position, of the magazine sliding plates 5.

FIG. 4 shows the first state of the magazine corresponding to the first slide position of the magazine sliding plate 5, wherein the trays 3 holding the discs 2 are integrally stacked together on the tray base 4 in the closely stacked manner as previously shown in FIG. 2 with the magazine slide plate 5 being biased in the arrow X1 direction by the spring 8 and restricted at a predetermined position by causing the tab 5a1 to abut on the hook member 7.

In this first state, the magazine 1 is able to be hand-carried, and the discs 2 are prevented from being mounted or discharged on or from the trays 3 through the inlets formed between the R-portions 3f of the trays 3 as the magazine slide plate 5 situated at the first position obstructs a passage of the discs 2. When the disc 2 is intended to be mounted on the tray 3 through the inlet, the disc 2 is prevented from being inserted into the inlet due to a collision of the disc 2 with an end portion 5d2 of the side plate 5 at the periphery of the disc 2. When the disc 2 mounted is intended to be discharged out of the tray 3 by pushing the disc 2 with the disc discharge lever 15, the disc 2 is prevented from being discharged out of the tray 3 due to the end portion 5d2 of the side plate 5d colliding with the periphery of the disc 2.

FIG. 5 shows the second state of the magazine 1 corresponding to the second slide position of the magazine sliding plate 5, wherein the trays 3 holding the discs 2 are integrally stacked together on the tray base 4 in the closely stacked manner, thus, the magazine 1 is able to be hand-carried as well as in the case of the first state.

In this second state, the magazine sliding plate 5 is slidingly displaced in the direction of the arrow X2 by a manual operation and restricted to move by causing the tab 5a1 thereof to abut on the hook portion 7b of the hook member 7. Thus, the end portion 5d2 of the side plate 5d is also displaced or retracted in the direction of the arrow X2, so that the discs 2 are allowed to be mounted or discharged on or from the trays through the inlets formed between the R-portions 3f of the trays 3 without colliding with the end portion 5d2 of the side plate 5d.

FIG. 6 shows the third state of the magazine 1 corresponding to the third slide position of the magazine sliding plate 5, wherein the magazine 1 is mounted in the player 20 (FIG. 8) and is in a separable state of the tray 3. As mentioned in the foregoing, the engagement release member 42a2 provided on a lower plate 42 of the magazine loading mechanism 40 penetrates into the the guide groove 4g2 with the insertion of the magazine 1 in the direction of the arrow X1, so that the engagement release member 42a2 pushes the engagement release portion 7c and releases the engagement of the hook member 7 with the tab 5a1. Further with the insertion of the magazine 1 in the direction of the arrow X1, the engagement release member 42a2 pushes the side portion 5e of the magazine slide plate 5 in the direction of the arrow X2, so that the magazine slide plate 5 is displaced to the third position via the second position.

In this third slide position of the magazine slide plate 5, the bent portions 5c1, 5c2 and 5d1 of the magazine slide plate 5 are in fitting positions with the second recesses 3c2, 3c3 and 3d2 of the trays 3 as shown in FIG. 6, thus the stacked trays 2 are allowed to be moved upward without colliding with the bent portions 5c1, 5c2 and 5d1. FIG. 7 shows the stacked trays 3 detached from the tray base 4 in a direction of an arrow Z1 by a lifter mechanism 100A of the player 20 shown in FIG. 12 to allow an access of a disc playing mechanism 130 to the disc 2. The detailed description of the above mechanisms will be given hereafter.

A Construction and Operations of a First Automatic Disc Player Employing the First Embodiment of the Magazine of the Present Invention A description is given to a construction of a first automatic disc player (referred to as a player hereafter) employing the first embodiment of the magazine of the present invention referring to FIGS. 8 through 25.

Figure 8:
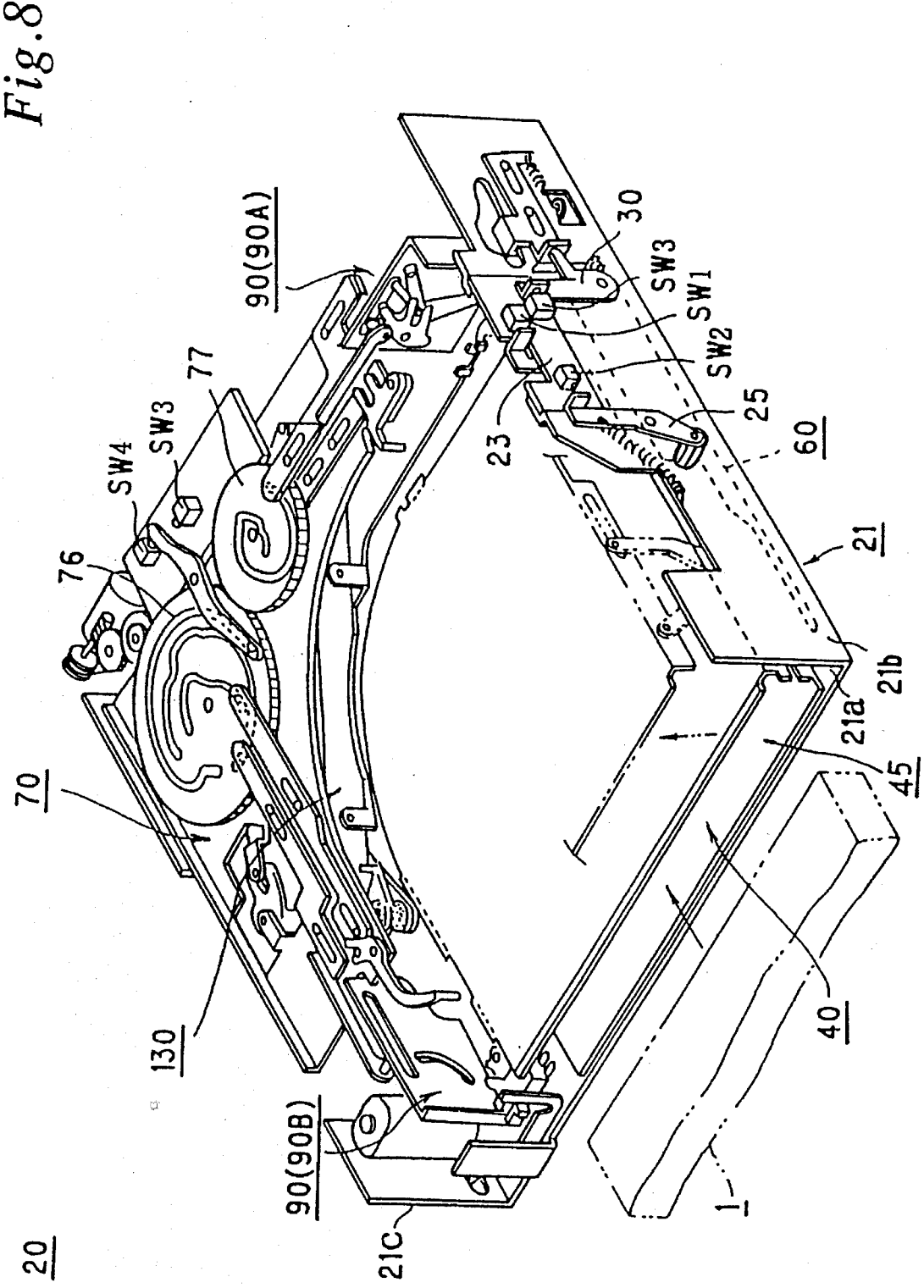
FIG. 8 is a perspective view showing an overall construction of the first embodiment of the player in an initial state.

FIG. 8 is a perspective view showing an overall construction of the first embodiment of the player in an initial state.

Figure 9:
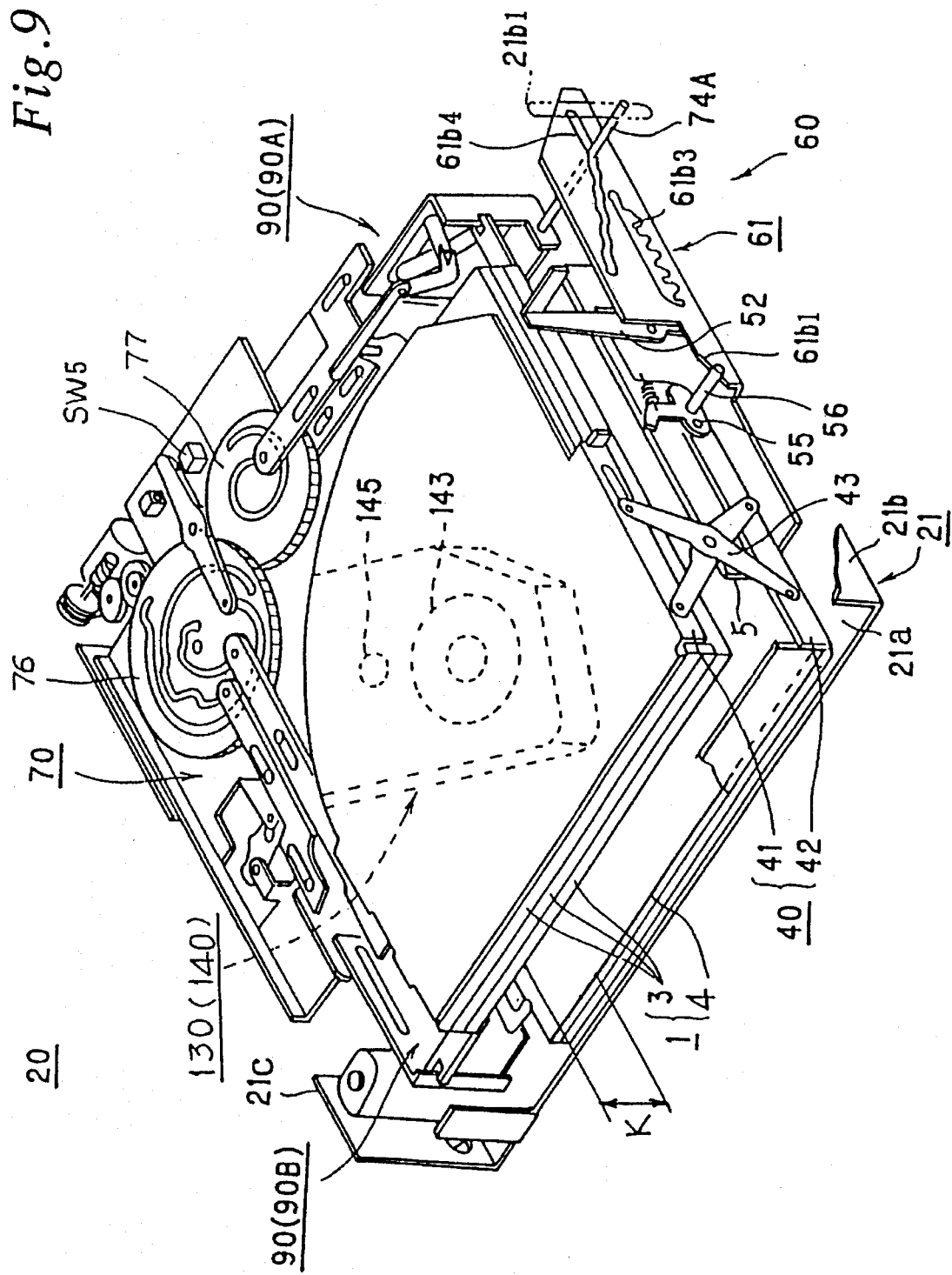
FIG. 9 is a perspective view, with parts partially disassembled, showing a state where trays are detached from the bottom of the magazine in the first embodiment of the player shown in FIG. 8.

FIG. 9 is a perspective view, with parts partially disassembled, showing a state where trays are detached from the bottom of the magazine in the first embodiment of the player shown in FIG. 8.

The player 20 of the first embodiment of the present invention shown in FIGS. 8 and 9 employs the magazine 1 of the first embodiment.

Generally, the magazine 1 is mounted onto a magazine mounting section 45 of a magazine loading mechanism 40 in the player 20. Upon an inserting of the magazine 1, the magazine 1 becomes the third state as shown in FIG. 6 where the trays 3 are detachable. In this state, a desired tray 3 (disc) is selected among the stacked trays 3 and separated from other parts so as to form a space k under the desired tray 3 to allow the access of the disc play mechanism 130 by a tray selection and separation mechanism 90 (90A) as shown in FIG. 9. After that, only the disc is placed on a turntable 143 of the disc play mechanism 130 and is reproduced or played by using an optical pickup 145.

Next, a description is given to an outline of the basic construction of the player 20.

The player 20 generally comprises a main chassis including a frame 21, magazine loading device including a magazine loading mechanism 40 and a slide mechanism 60, tray selection and separation mechanism including the slide mechanism 60, a cam wheel holder 70, and a pair of tray selection and detachment mechanisms 90 (90A, 90B) and disc play device including the cam wheel holder 70 and a disc play mechanism 130, wherein the mechanisms of each means operate in cooperation with each other.

In the above mechanisms, as the magazine loading device, both of the magazine loading mechanism 40 and the slide mechanism 60 are assembled as a unit, and as the tray selection and separation device and the disc play device, both of the tray selection and separation mechanisms 90 and the cam wheel holder 70 are assembled as a unit by being held with the cam wheel holder 70. Both units are disposed in the frame 21 of the main chassis.

Further, in the player 20 employing a thin type magazine 1 containing CDs held by respective trays 3, an external size of the player 20 satisfies the industry standard DIN specification size of 180×150×50 mm (width ×depth×height), thus the player 20 is very compact and is suitable, for instance, for a car use.

Figure 10:
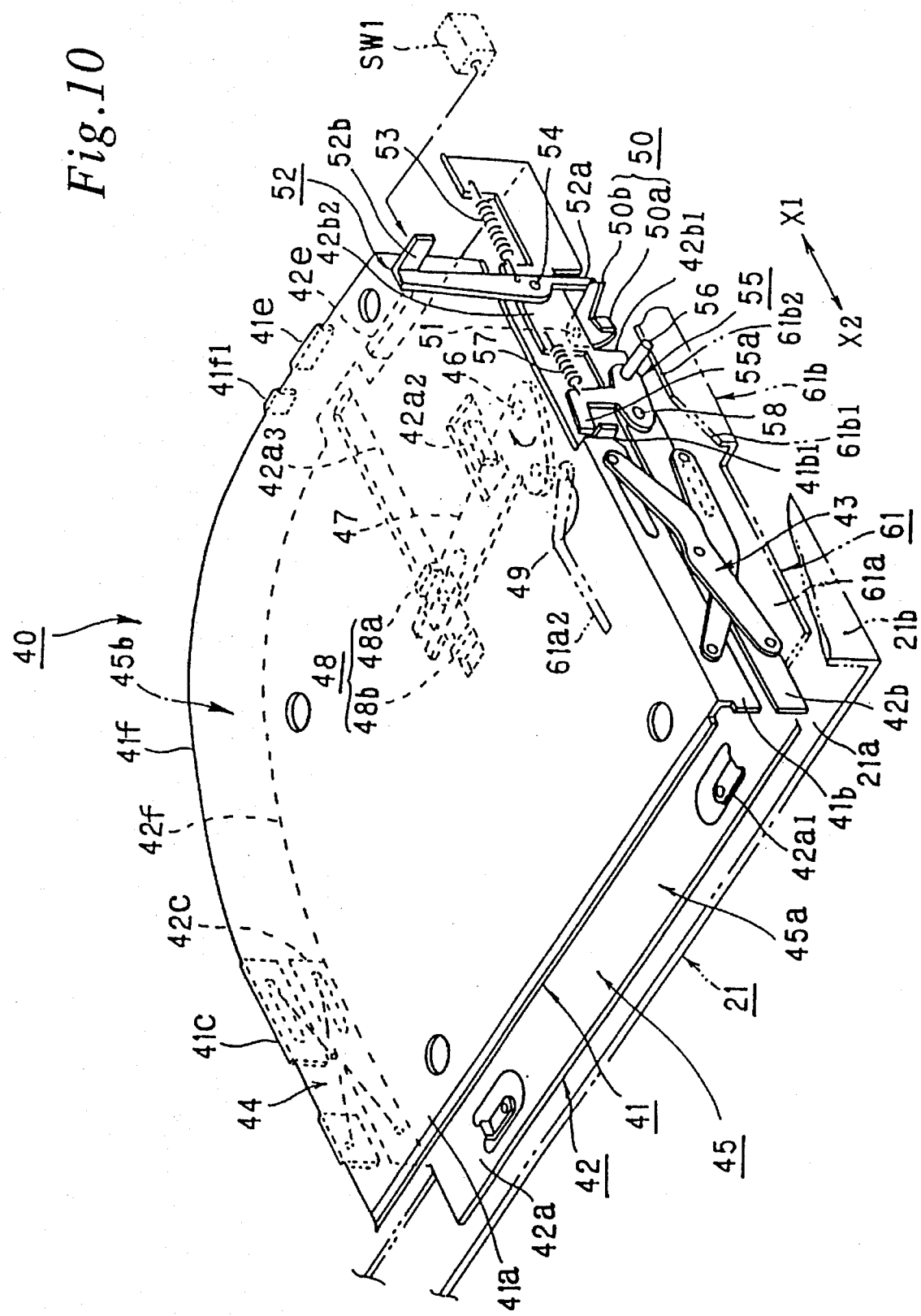
FIG. 10 is an enlarged perspective view of the magazine loading mechanism 40.
Figure 11:
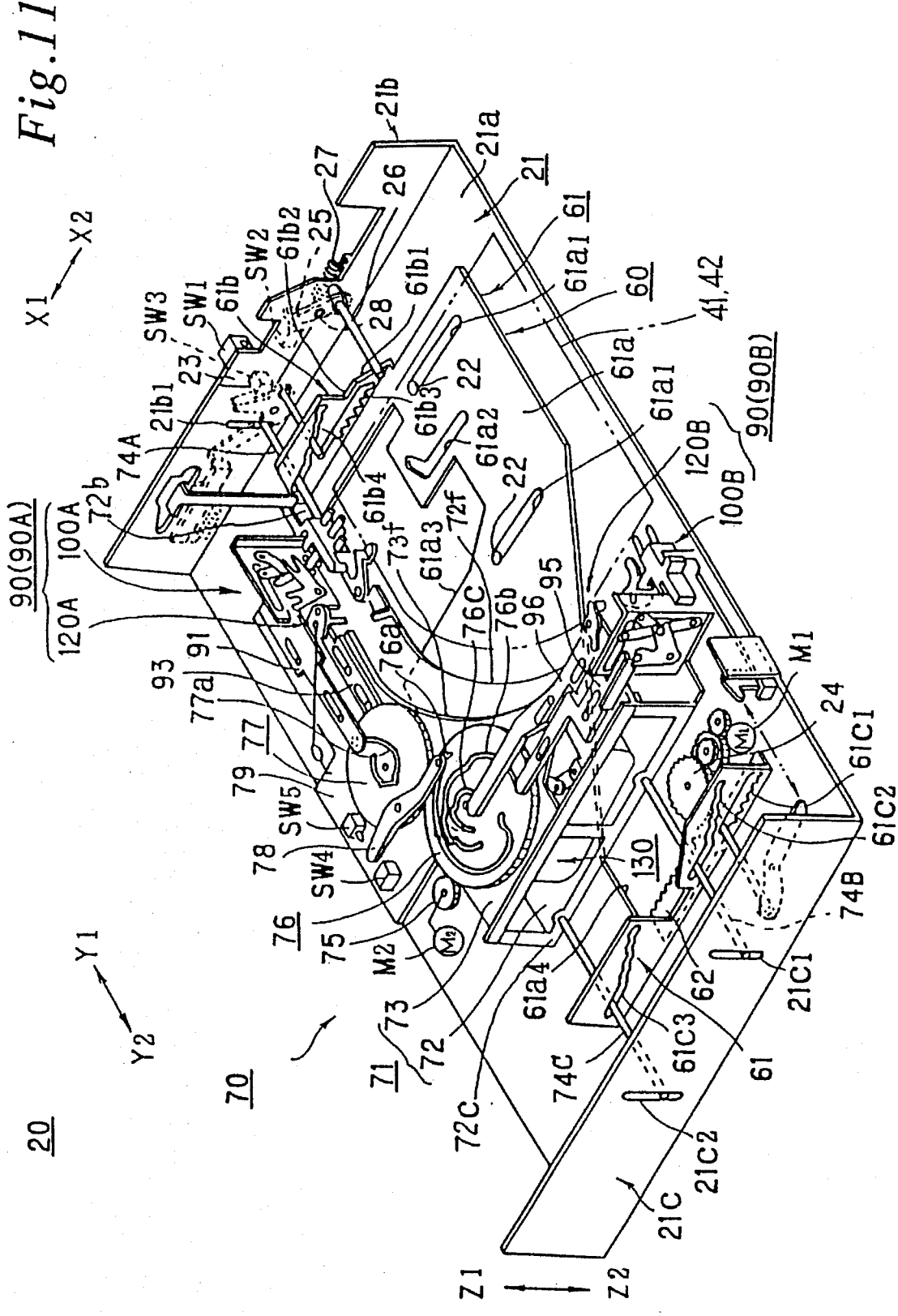
FIG. 11 is a perspective view showing the slide mechanism 60 and a cam wheel holder 70 of the player 20, wherein the magazine loading mechanism 40 shown in FIG. 10 is omitted for the sake of clarity.

Next, a detailed description is given to each component of the player 20 referring to FIGS. 10–11.

The Frame 21

As shown in FIG. 11, the frame 21 as the main chassis comprises a bottom plate 21a and side plates 21b, 21c. The frame 21 generally has a U-shaped configuration in cross-section by folding a plane rectangular metal plate upright at both sides thereof. The external size of frame 21 is formed so compact as to satisfy the DIN specification size.

The Magazine Loading Mechanism 40

Referring to FIGS. 3, 4, 6 and 8–10, a description is given to the magazine loading mechanism 40.

FIG. 10 is an enlarged perspective view of the magazine loading mechanism 40.

The magazine loading mechanism 40 is disposed at a front of the bottom plate 21a, and has many functions such as a function for loading or unloading the player 20 with the magazine 1, a function for releasing the engagement of the magazine slide plate 5 (the first and second slide positions of the slide plate 5 as shown in FIGS. 4 and 5) with the insertion of the magazine 1 and a function for separating the magazine 1 into two parts and holding them thereby.

Referring to FIG. 10, the magazine loading mechanism 40 generally comprises an upper plate 41 comprising a flat portion 41a forming an R-portion 41f at rear corresponding to the R-portions 3f of the trays 3 and a pair of side plate 41b, 41c hanging downward at both side ends of the flat portion 41a, a lower plate 42 comprising a flat portion 42a having an R-portion 42f corresponding to the R-portion 3f and a pair of side plates 42b, 42c elected upward at both side ends of the flat portion 42a and a pair of cross-arms 43, 44 each provided between the side plates 41b and 42b, 41c and 42c for movably connecting the upper and lower plates 41, 42 in a vertical direction, thus, making a frame construction.

The above pair of cross-arms 43, 44 form a well known pantograph mechanism, which can move only the upper plate 41 upward and downward.

The upper and lower plates 41 and 42 are disposed to face each other so as to form an inlet 45a open to the front and therebetween to allow an insertion of the magazine 1 in the first state (FIG. 4) when the upper plate 41 is displaced to the lowest position by the pantograph mechanisms of the cross-arms 43, 44, and so as to form an opening 45b open to the rear approximately between the R-portions 41f, 42f of the upper and lower plates 41, 42 to allow the access of the disc play mechanism 130 for playing the desired disc 2.

Further, the lower plate 42 is provided with lugs 42a1 protrudingly formed downward from the flat portion 42a by stamping, by which lugs 42a1 the lower plate 42 is fixed on a bottom plate 21a of the frame 21 leaving a narrow space between the bottom plate 21a and the lower plate 42 to allow a displacement of a slide plate 61 of the slide mechanism 60 in directions of arrows X1, X2 as described hereafter.

Further, the lower plate 42 is provided with an engagement release member 42a2 protrudingly formed upward from the flat portion 42a by stamping for releasing an engagement of the magazine slide plate 5 with the hook member 7. Thus, when the magazine 1 in the first state (FIG. 4) is inserted from the inlet 45a into the magazine loading mechanism 40, the engagement release member 42a enters the guide groove 4g2 (FIG. 3) and releases the engagement of the magazine slide plate 5 with the hook member 7, so that the magazine slide plate 5 is pushed in the direction of the arrow X2 by the engagement release member 42a2 and is displaced to the third slide position.

Further, the lower plate 42 is provided with a sliding slot 42a3 on the flat portion 42a and with a lever 47 pivoted at a shaft 46 below the flat portion 42a, wherein a sliding member 48 provided at an end of the lever 47 is engaged with the sliding slot 42a3. The above sliding member 48 further comprises a front restricting member 48a protrudingly provided upward through the the sliding slot 42a3 for restricting the front position of the tray base 4 and a protruding member 48b movably provided upward and downward on a leaf spring (not shown) for allowing an engagement with the rectangular recess 4g3 (FIG. 3) through the sliding slot 42a3, when the magazine 1 is inserted into the magazine loading mechanism 40 by user. After the front portion of the tray base 4 abuts on the front restricting member 48a and the protruding member 48b engages with the rectangular recess 4g3, the sliding member 48 is displaced in the direction of the arrow X1, which causes the lever 47 to rotate in the clockwise direction centerring on the shaft 46. At that time, as a pin 49 protrudingly provided downward on the lever 47 is engaged with a dogleg-like slot 61a2 having a slant portion and a straight portion formed on the slide plate 61, the magazine 1 held by the sliding member 48 is automatically displaced in the direction of the arrow X1 along the sliding slot 42a3 by causing the slant portion of the dogleg-like slot 61a2 to push the pin 49 of the lever 47 when the slide plate 61 is displaced in the direction of the arrow X1 by being driven by a motor M1 (FIG. 11), wherein the straight portion of the dogleg-like slot 61a2 does not move the pin 49.

When the magazine 1 is further advanced deeper along the sliding slot 42a3, the front portion of the magazine 1 abuts on stopper 41e, 41f, and 42e, 42f respectively provided downward and upward at distal ends of the upper and lower plates 41, 42, so that the magazine 1 is positioned in a predetermined position.

Further, a cutout 42b1 is formed in the right side plate 42b downward and a protruding member 42b2 is provided over the cutout 42b1. An insertion detective lever 50 having a contacting part 50a and a pushing part 50b is pivoted at an axle 51 on the flat portion 42a of the lower plate 42. A detection switch-lever 52 is pivoted at an axle 54 on the protruding member 42b2 of the right side plate 42b by being biased in a clockwise direction with a spring 53.

Figure 25:
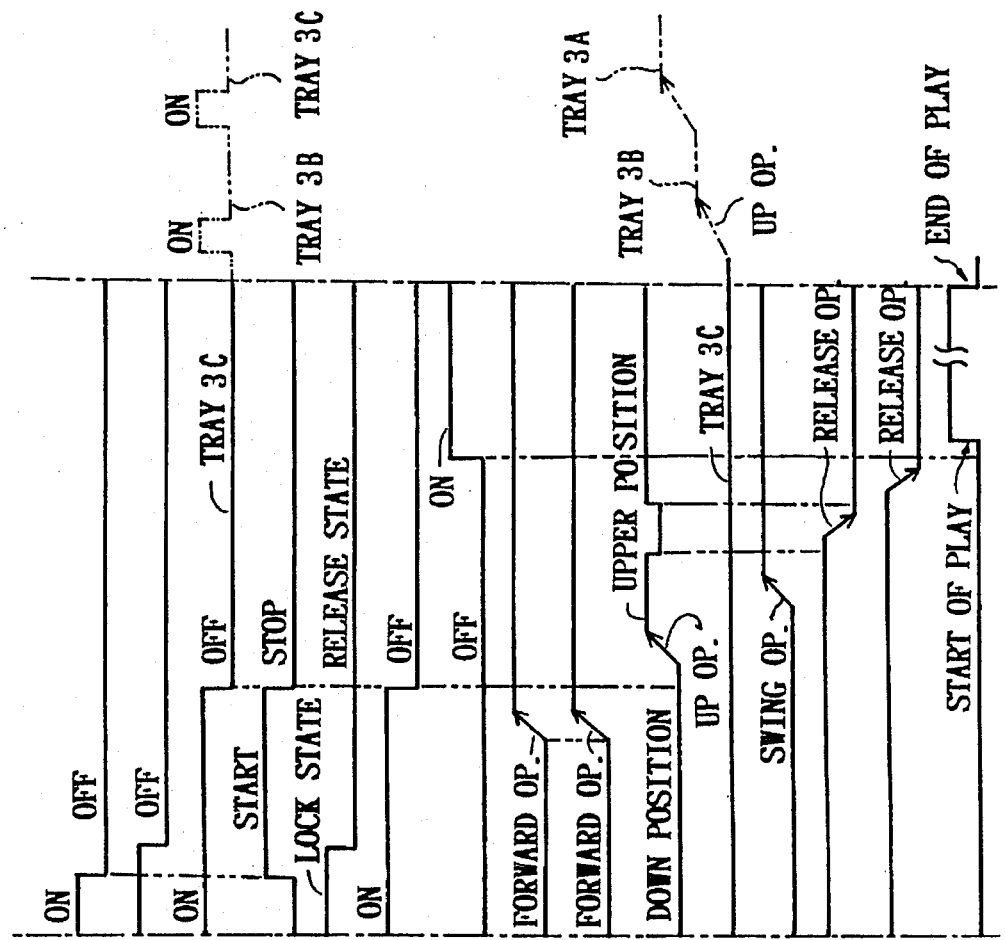
FIG. 25 is a timing chart of operations of main components in the disc player.

When the magazine 1 is inserted in the magazine mounting section 45, a front corner of the tray base 4 contacts and pushes the contacting part 50a of the insertion detective lever 50, so that the insertion detective lever 50 is rotated in a counterclockwise direction. As a result, the detection switch-lever 52 is rotated in a counter-clockwise direction being pushed at an end 52a thereof by the pushing part 50b of the insertion detective lever 50 against the spring 53, so that a switch SW1 provided on a printed circuit board 23 (FIG. 8) detects an insertion of the magazine 1 because an actuating member 52b provided at an distal end of the detection switch-lever 52, is disengaged from an actuator of the switch SW1. The operation timing of the switch SW1 is shown in FIG. 25 as described thereafter.

On the right side plate 42b of the lower plate, an engaging lever 55 having a hook member 55a at an end and a pin 56 fixed at the other end is rotatably provided at a shaft 58 by being biased in a clockwise direction with a tension spring 57. The engaging lever 55 is constructed so as to prevent the upper plate 41 from moving upward when the upper plate 41 is positioned in the most downward position by causing the hook member 55a thereof to engage with a bent portion 41b1 provided on the right side plate 41b of the upper plate 41 and by causing the pin 56 to engage with a flat surface 61b2 formed on the periphery of a right side plate 61b of the slide plate 61, i.e. the engaging lever 55 is in a mechanical locking position.

When the slide plate 61 is displaced in the direction of the arrow X1, the pin 56 abuts on a slant surface 61b1 moved from the flat surface 61b2 of the slide plate 61. Thus, the hook member 55a disengages from the bent portion 41b1 of the right side plate 41b due to the engaging lever 55 being rotated in a clockwise direction by the tension spring 57, so that the upper plate 41 becomes free to move upward. An operation timing of the mechanical locking is shown in FIG. 25.

The Slide Mechanism 60

A description is given to the slide mechanism 60 referring to FIGS. 8 through 11.

FIG. 11 is a perspective view showing the slide mechanism 60 and a cam wheel holder 70 of the player 20, wherein the magazine loading mechanism 40 shown in FIG. 10 is omitted for the sake of clarity.

As mentioned in the foregoing, the slide plate 61 of the above slide mechanism 60 is slidably provided between the bottom plate 21a of the frame 21 and the lower plate 42. The slide mechanism 60 has functions such as a function for automatically transferring the magazine 1 inserted into the magazine loading mechanism 40 to a predetermined position, a function for displacing a desired disc held by a tray to select and to separate from the magazine 1 and a function for supporting and moving a cam wheel holder 70 upward and downward in a stepped manner.

Referring to FIG. 11, the slide mechanism 60 includes the slide plate 61 having a U-shape configuration in cross section formed by bending both sides of a metal sheet upright, wherein 61a denotes a flat plate facing to the bottom plate 21a of the frame 21, 61b, 61c the pair of left and right side plates erected from the both distal ends of the flat surface 61a, each facing to the side plates 21b, 21c of the frame 21.

In the flat plate 61a, a pair of guide slots 61a1, 61a1 are provided for respectively engaging with a pair of guide pins 22, 22 fixed on the bottom plate 21a of the frame 21 to allow sliding of the slide plate 61 in the directions of arrows X1, X2, together with the aforementioned dogleg-like slot 61a2, and cutouts 61a3, 61a4 for allowing installation of other components.

A rack plate 62 provided at the left side plate 61c is connected to the motor M1 through reduction gears 24. When the insertion of the magazine 1 into the magazine mounting section 45 is detected by the switch SW1, the slide plate 61 is displaced in the direction of the arrow X1 by the reduction gears 24 driven by the motor M1, so that the magazine 1 together with the slide plate 61 is automatically transferred to a predetermined position. The operation timing of the slide plate 61 is shown in FIG. 25.

On the right slide plate 61b of the slide plate 61, a wave-like cam groove 61b3 and a stepwise cam groove 61b4 are formed in addition to the aforementioned flat surface 61b2 and slant surface 61b1.

On the other hand, a wave-like cam groove 61c1 and a pair of stepwise cam grooves 61c2, 61c3 each having the same configuration as that of the wave-like cam groove 61b3 or that of the stepwise cam groove 61b4 are formed on the left side plate 61c of the slide plate 61.

Pins 74A–74C respectively fixed at a bottom plate 72 of the cam wheel holder 70, are inserted respectively into vertical slots 21b1, 21c1, 21c2 formed on the side plate 21b, 21c of the frame 21 through the stepwise cam grooves 61b4, 61c2, 61c3. Because of this arrangement, when the slide plate 61 moves in the X1–X2 direction, the stepwise cam grooves 61b4, 61c2, 61c3 thereof drive respectively the pins 74A–74C vertically and stepwise as the pins 74A–74C are guided in the vertical slots 21b1, 21c1, 21c2. As a result the cam wheel holder 70 is displaced in a stepped manner vertically along the vertical slots 21b1, 21c1, 21c2. Note that the vertical slots 21b1, 21c1, 21c2 prevent the cam wheel holder 70 from displacing in the directions of the arrows X1, X2.

As described in the foregoing referred to FIG. 10, the pin 56 fixed on the engaging lever 55 (FIG. 10) resides on the slant surface 61b1 and flat surface 61b2. Furthermore, a pin 26 fixed on an initial state detecting lever 25 for pushing a switch SW2 resides on the slant surface 61b1.

The initial state detecting lever 25 is pivoted at an axle 28 on the right side plate 21b of the frame 21 by being biased with a tension spring 27, wherein it shows the initial state when the pin 26 abuts on the slant surface 61b1. The operation timing of the SW2 is shown in FIG. 25.

The Cam Wheel Holder 70

A description is given to the cam wheel holder 70 referring to FIGS. 8 through 15.

Figure 12:
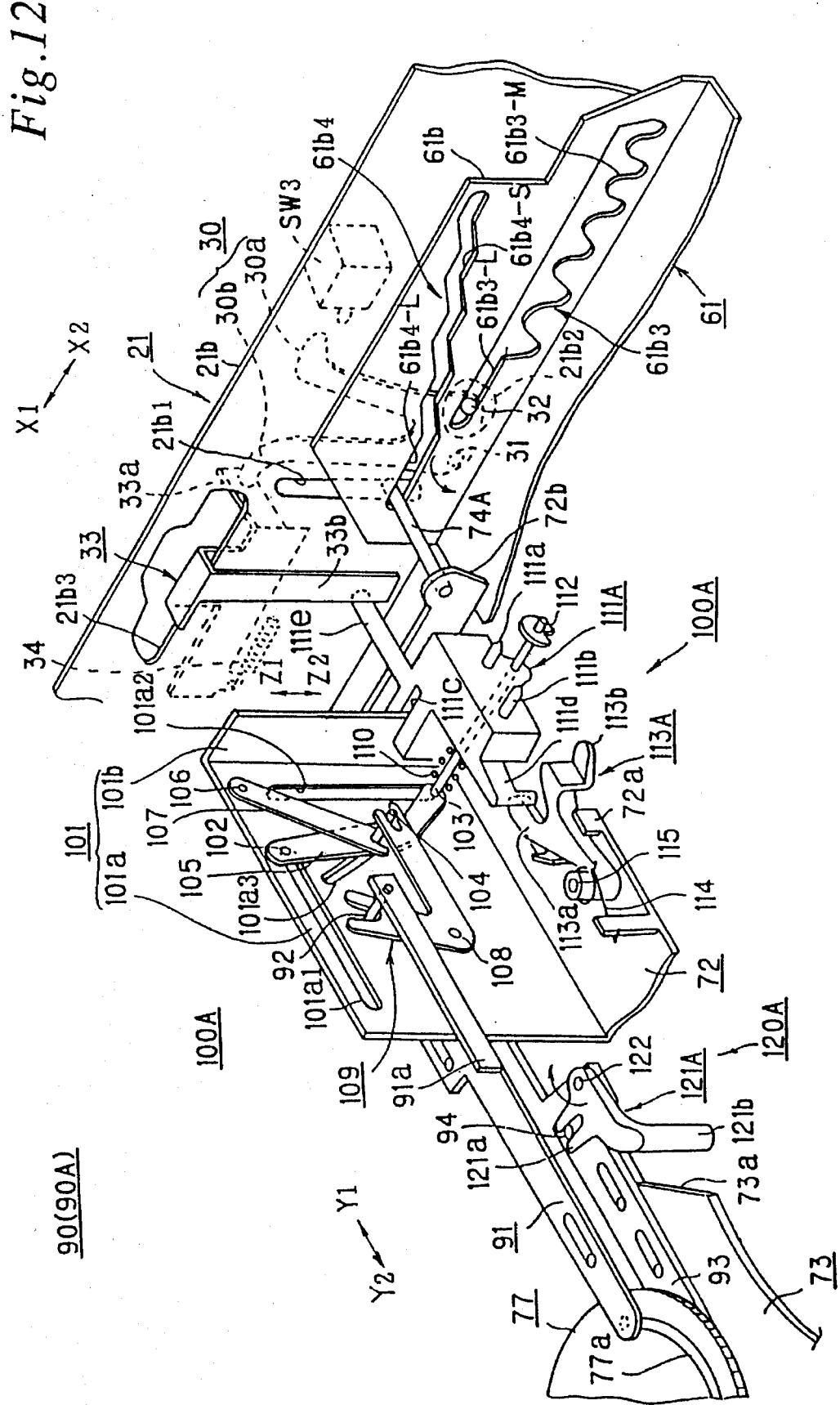
FIGS. 12 through 14 are enlarged perspective views respectively showing an operation of a tray selection and separation mechanism of the cam wheel holder 70.
Figure 13:
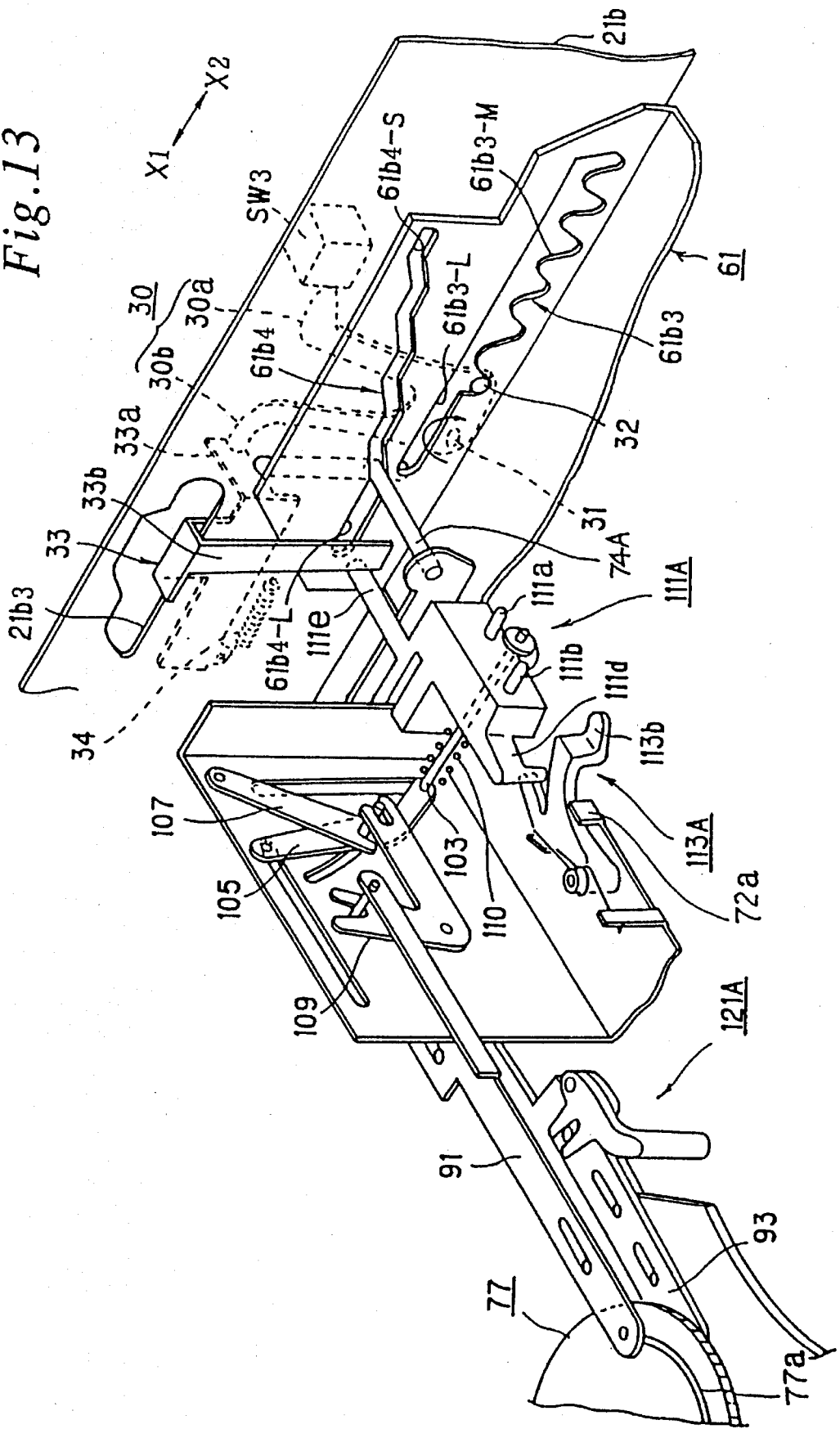
Figure 14:
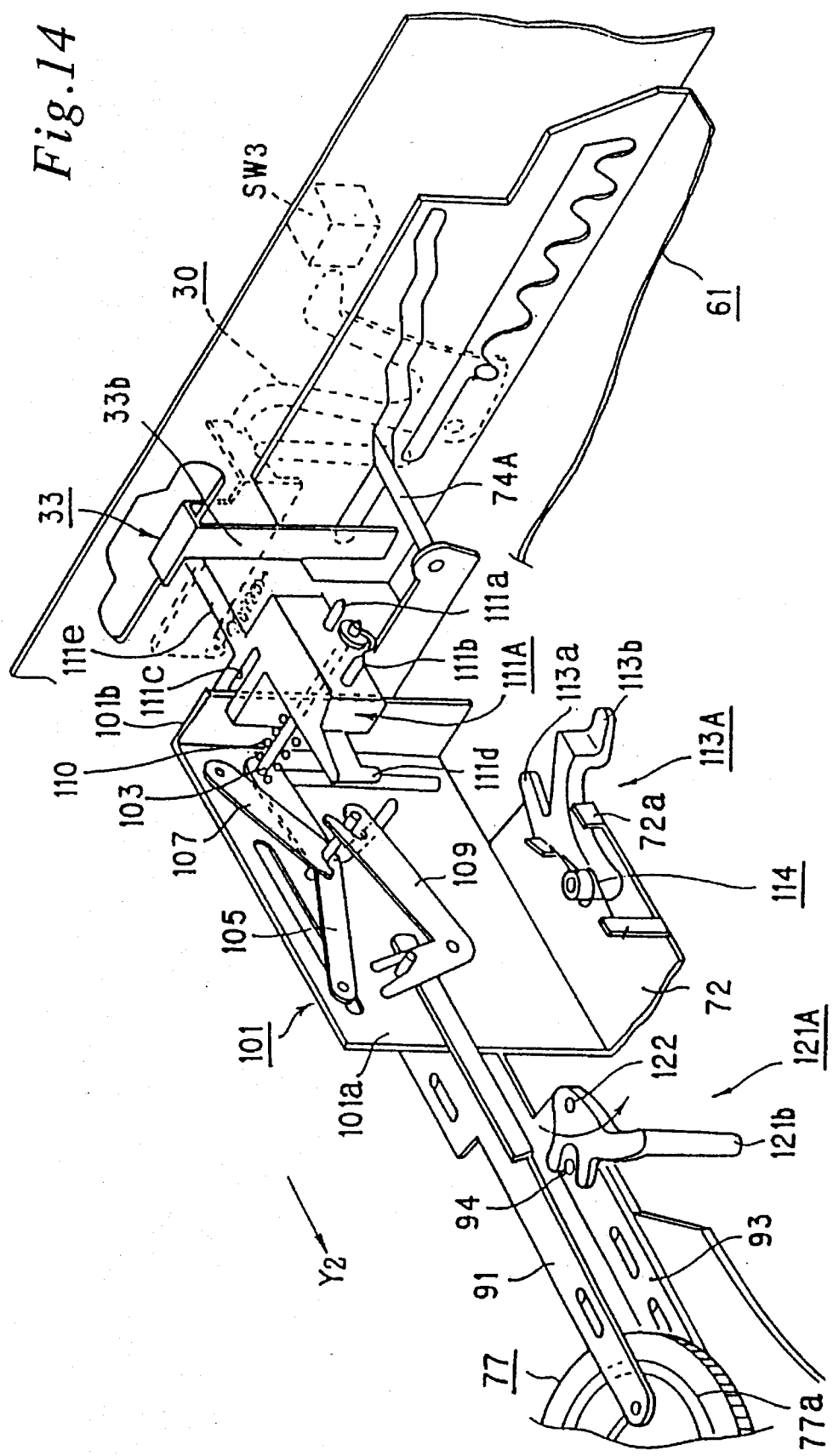

FIGS. 12 through 14 are enlarged perspective views respectively showing an operation of a tray selection and separation mechanism of the cam wheel holder 70.

Figure 15:
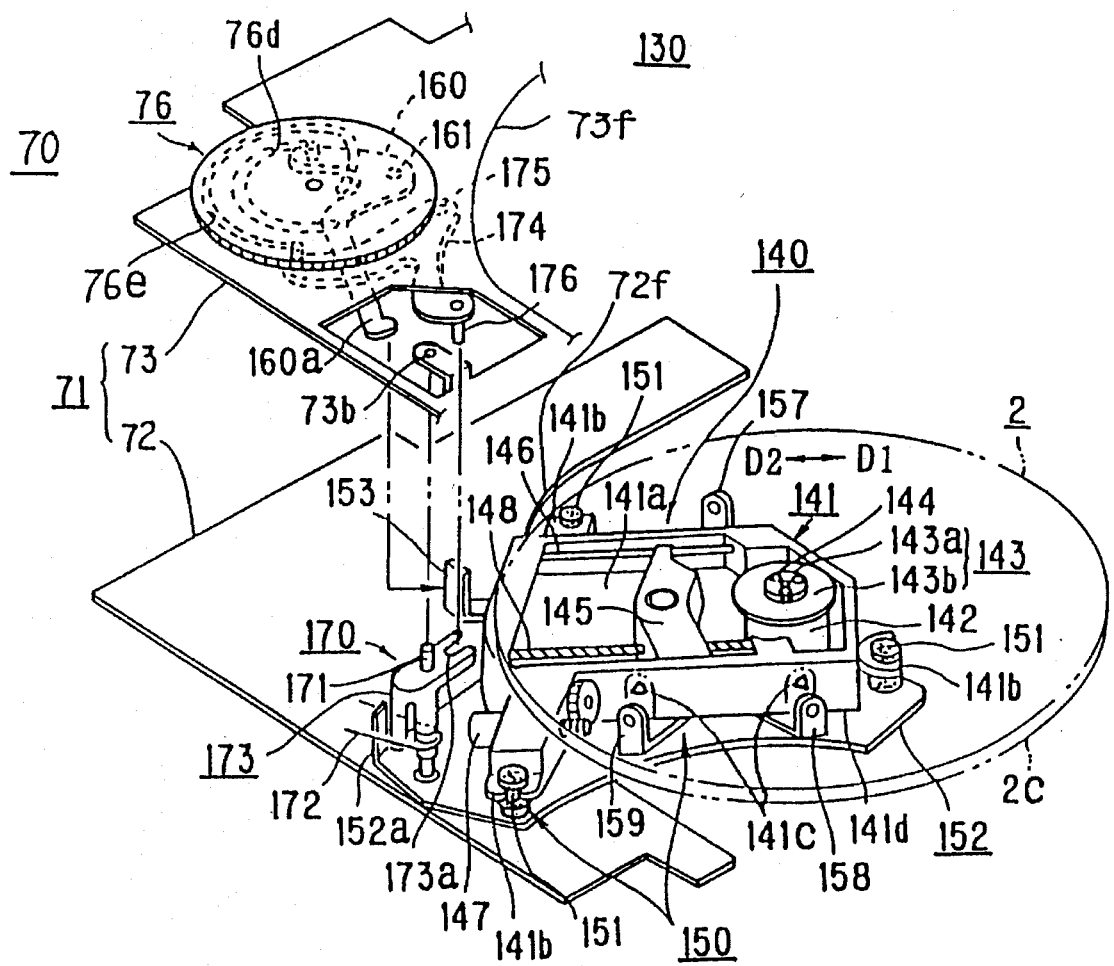
FIG. 15 is an enlarged view showing an operation of a disc play mechanism provided in the cam wheel holder 70.
Figure 16:
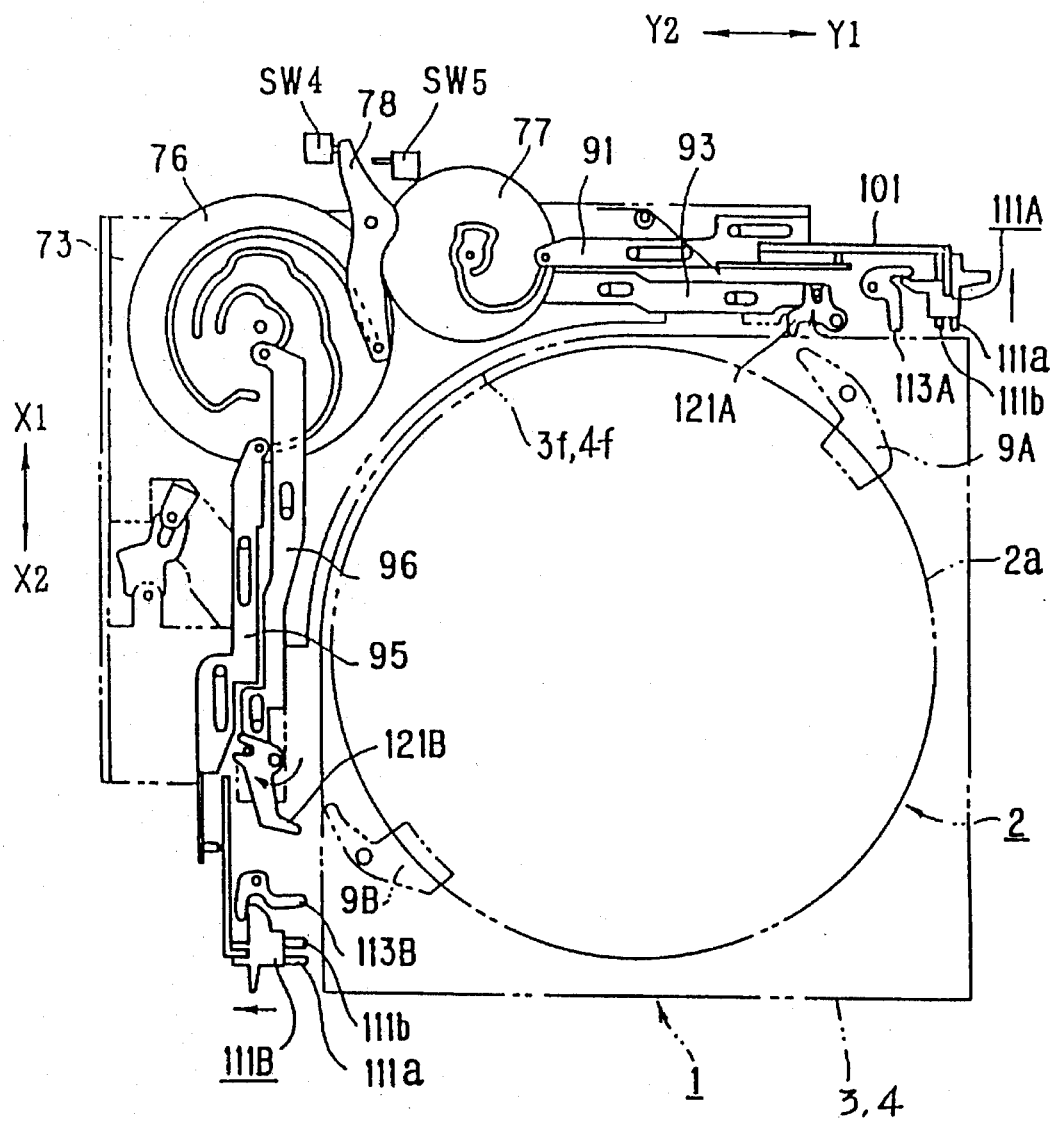
FIGS. 16(A) and 16(B) are explanatory views of the operation of the disk player 20 with (A) and (B) representing a plan view and a front elevation respectively.
Figure 16:
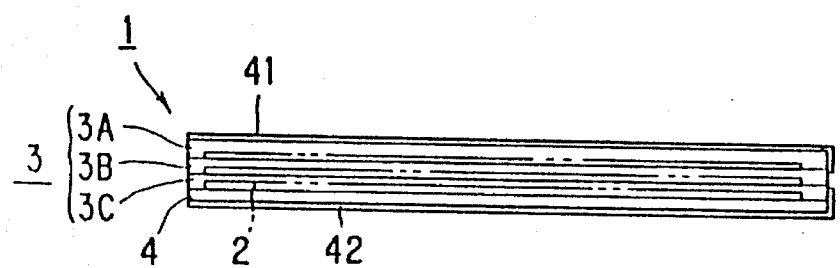

FIG. 15 is an enlarged view showing an operation of a disc play mechanism provided in the cam wheel holder 70.

Referring to FIG. 11, the cam wheel holder 70 generally comprises a frame 71 comprising a bottom plate 72 having an R-portion 72f and an upper plate 73 having an R-portion 73f supported by L shaped angles on the bottom plate 72, a pair of tray selection and separation mechanisms 90 (90B, 90A), each comprising a first cam wheel 76 and a second cam wheel 77, provided on the upper plate 73 for selecting a desired disc 2 held by a tray 3 from tightly stacked trays 3 (the magazine 1) which are transferred to the predetermined position by the slide plate 61 and for separating the desired disc 2 vertically from the magazine 1 so as to form the space K beneath the desired disc 2 by causing the first and second cam wheels 76, 77 to be driven by a motor M2 through a reduction gear 75, and a disc play mechanism 130 (FIG. 15) comprising an optical pickup 145 provided on the frame 71 for playing the desired disc 2 by causing the first cam wheel 76 to be driven under the desired disc 2.

The R-portions 73f, 72f respectively provided on the upper and bottom plates 73, 72 are formed to face the R-portions 3f and 4f of the trays 3 and the tray base 4 to allow the installation of the disc play mechanism 130 easily between the upper plate 73 and the bottom plate 72 nearby the R-portions 72f, 73f when the magazine 1 is mounted on the magazine mounting section 45.

The aforementioned pins 74A–74C are respectively fixed at the sides 72b, 72c of the bottom plate 72 and are inserted into the stepwise cam grooves 61b4, 61c2, 61c3 provided on the slide plate 61 and the vertical slots 21b1, 21c1, 21c2 provided in the frame 21 as described in the foregoing.

On the upper plate 73, the second cam wheel 77 engaged with the first cam wheel 76 is rotatably provided and is driven by the motor M2 through the reduction gear 75.

A plurality of cam grooves are formed on the upper and lower surfaces of the first and second cam wheel 76, 77. Among these cam grooves, a cam groove 76a formed on the first cam wheel 76 is engaged with an end of a switch lever 78 of which the other end actuates either of switches SW4, SW5 by pushing the actuators thereof to control the motor M2. The operation timings of the switches SW4, SW5 is shown in FIG. 5.

Further, on the upper plate 73, the tray selection and separation mechanism 90A driven by the second cam wheel 77 through the first cam wheel 76 and the tray selection and separation mechanism 90B driven directly by the second cam wheel 76 are respectively provided, wherein the both mechanisms 90A, 90B have approximately the same construction and are synchronouly driven together by causing the both cam wheels to engage each other.

Referring to FIG. 12, each of the tray selection and separation mechanisms 90A, (90B) respectively comprises a lifter section 100A, (100B) and a disc clamp release section 120A, (120B). The lifter section 100A is driven by a sliding of a connection plate 91 in directions of arrows Y1, Y2 by causing an end of the connection plate 91 to engage with the cam groove 77a formed on the second cam wheel 77, and the disc clamp release section 120A is driven in directions of arrows Y1, Y2 by a sliding of a connection plate 93 by causing an end of the connection plate 93 to engage with the cam groove (not shown) formed on the bottom of the second cam wheel 77.

On the other hand, the lifter section 100B (FIG. 11) is driven by a sliding of a connection plate 95 in directions of arrows X1, X2 by causing an end of the connection plate 95 to engage with the cam groove 76b formed on the first cam wheel 76, and the disc clamp release section 120B is driven in directions of arrows X1, X2 by a sliding of a connection plate 96 by causing an end of the connection plate 96 to engage with the cam groove 76c formed on the bottom of the first cam wheel 76.

Next, a description is given to the tray selection and separation mechanism 90A referring to FIGS. 12 through 14, however, the description of the tray selection and separation mechanism 90B which operates in synchronizing with the tray selection and separation mechanism 90A is omitted for simplicity.

FIG. 12 is an enlarged perspective view of the tray selection and separation mechanism 90 (90A) in an initial state where the magazine 1 is not mounted on the slide plate 61.

In the lifter section 100A shown in FIGS. 12 through 14, 101 designates a bracket having first and second vertical plates 101a, 101b formed upright on the bottom plate 72 of the cam wheel holder 70 by causing a part of the the bottom plate 72 to be bent.

In the first vertical plate 101a, there formed a horizontal slot 101a1, a bow-like slot 101a3 and a vertical slot 101a2.

A V-shaped lever 105 having three pins 102, 103, 104 is slaidably provided on the first vertical plate 101a by causing the pins 102, 104 and 103 respectively to engage with the horizontal slot 101a, the vow-like slot 101a3 and the vertical slot 101a2, wherein respective ends of the pins 104, 103 protrude forward except for the pin 102.

A lever 107 is rotatably provided above the vertical slot 101a2 on the first vertical plate 101a by causing one end thereof to be pivoted on the axle 106 and causing the other end thereof to engage with the pin 104.

An L-shaped lever 109 is pivoted on an axle 108 on the first vertical plate 101a by causing one end thereof to engage with the pin 104 and causing the other end thereof to engage with a pin 92 fixed to a bent portion 91a of the connection plate 91.

The above levers 105, 107, 109 construct a linkage which operates by a sliding of the connection plate 91 in the directions of the arrows Y1, Y2 driven by the second cam wheel 77.

A lifter 111A for displacing the trays 3 vertically is slidably provided on the pin 103 through a compression spring 110 between the V-shaped lever 105 and the lifter 111A, wherein a numeral 112 designates an U-washer for preventing the lifter 111A from being slipped off the pin 103 by the spring 110.

The above lifter 111A is provided with a pair of nails 111a, 111b on the front surface thereof for displacing the trays 3 vertically together with the upper plate 41 of the magazine mounting section 45 (FIG. 10), and with a guide groove 111c for engaging with the second vertical plate 101b at a rear portion thereof, and with an arm member 111d at the left side thereof and with a pin member 111e at the right side thereof, which lifter 111A is integrally formed by molding.

A pushing down lever 113A having a lug 113b for preventing the trays 3 and/or the tray base 4 (FIG. 3) from displacing upward by causing the lug 113b to engage with the separation recesses 4a6, and the first separation recess 3a7 of the tray 3 when the magazine 1 is separated, is pivoted at an axle 115 on the bottom plate 72 by being biased with a torsion spring 114 in a clockwise direction. A numeral 72a is a stopper for preventing the lug 113b from displacing forward.

A back and forth displacement of the lug 113b of the lifter 111A is coordinated with those of the nails 111a, 111b as an arm 113a formed at a back portion thereof is engaged with the arm member 111d of the lifter 111A.

As mentioned in the foregoing, the pin 74A provided on the side 72b of the bottom plate 72 is inserted into the stepwise cam groove 61b4 and into the vertical slot 21b1 provided on the frame 21 in this order. In the stepwise cam groove 61b4, characters 61b4L, 61b4S respectively designate the lowest step and the highest step.

A bifurcated arms 30 having a first arm 30a and a second arm 30b is pivoted by a shaft 31 on the right side plate 21b of the frame 21 so that the first arm 30a abuts on a switch SW3 and the second arm 30b abuts on a slide bracket 33 as described hereafter.

The bifurcated arms 30 is further provided with a pin 32 at a bottom thereof in such manner that the pin 32 engages with the wave-like cam groove 61b3 formed in the slide plate 61 through a hole 21b2 formed on the right side plate 21b. The wave-like cam groove 61b3 comprises a straight portion 61b3-L corresponding to a position of the pin 32 in an initial state and a wave-like portion 61b3-M connected to the straight portion 61b3-L corresponding to a position of the pin 32 being on one of steps of the stepwise slot 61b4 from the lower step to the highest step.

The slide bracket 33 comprises a bent portion 33a bent outward at a right angle and a lever portion 33b provided protrudingly downward. The slide bracket 33 is slidably mounted on a wall of an elliptical hole 21b3 formed in the right side plate 21b of the frame 21, which is biased in the direction of the arrow X2 with a spring 34. Thus, the bent portion 33a pushes the second arm 30b by abutting thereon. On the other hand, the pin 111e of the lifter 111a abuts on the lever portion 33b by being pushed with the spring 110.

Next, a description is given to operations of the lifter 111A and the pushing down lever 113A.

Referring to FIG. 12, in the initial state where the magazine 1 is not inserted in the magazine mounting section 45, the connection plate 91 connected to the cam groove 77a of the second cam wheel 77 is displaced in the direction of the arrow Y1, thus, each of the levers 105, 107, 109 operating in cooperation with each other is situated in a position as shown in FIG. 12. In this state, the pin 103 fixed on the V-shaped lever 105 is positioned in the bottom of the vertical slot 101a2, and the lifter 111a engaged with the pin 103 is at its lowest position.

Further, the pin 32 fixed on the bifurcated arm 30 is positioned in that straight portion 61b3-L of the wave-like cam groove 61b3, thus, the bifurcated arm 30 is displaced or rotated in a counterclockwise direction, so that the first arm 30a of the bifurcated arm 30 is separated from the switch SW3, and the second arm 30b pushes the slide bracket 33 in the direction of the arrow X1 against the spring 34. Thus, the nails 111a, 111b of the lifer 111A is retracted in the direction of the arrow X1 by causing the lifer 111A to be pushed with the lever portion 33b against the spring 110. The lug 113b of the pushing down lever 113A is also retracted by causing the pushing down lever 113A to be rotated with the arm member 111d as the lifter 111A retracts, this allows the insertion of the magazine 1 into the magazine mounting section 45.

FIG. 13 is an enlarged perspective view of the tray selection and separation mechanism 90 (90A) in a state where the magazine 1 is mounted on the slide plate 61 and the lowest tray 3C is selected as a desired tray.

Referring to FIG. 13, when the magazine 1 (not shown) is inserted, the insertion of it is detected as mentioned in the foregoing. Subsequently after the slide plate 61 is displaced in the direction of the arrow X1, the front portion of the magazine 1 abuts on the stopper 41e, 41f1, and 42e, 42f (FIG. 10) respectively provided downward and upward at distal ends of the upper and lower plates 41, 42, so that the magazine 1 is positioned in a predetermined position.

After that, only the slide plate 61 is further displaced in the direction of the arrow X1, whereby a desired disc 2 is previously selected by tray selection means (not shown) which determines amount of the displacement of the magazine 1 according to the stacked order of the desired tray 3, i.e. transfers the pin 74A on one of the steps of the stepwise cam groove 61b4 and transfers the pin, 32 on one of the wave bottoms of the wave-like cam groove 61b3.

In FIG. 13, the lowest tray 3C is selected as the desired tray 3, wherein the second cam wheel 77 is positioned in the same state as in FIG. 12, and the slide plate 61 only is further displaced in the direction of the arrow X1. Thus, the pin 32 is displaced and fitted in the bottom of the first wave of the wave-like cam groove 61b3 corresponding to the lowest tray 3C, so that the bifurcated arm 30 is rotated in a clockwise direction and abuts on the switch SW3. The displacement of the slide plate 61 is stopped according to a detection signal from the switch SW3. At the same time, the pin 74A is positioned in the lowest step of the stepwise cam groove 61b4.

As will be understood from FIG. 13, an operation state of the switch SW3 is changed every time when the pin 32 climbs over the top of the wave of the wave-like cam groove 61b3 because the bifurcated arm 30 alternately rotates in a counterclockwise direction activating the switch SW3 to generate a series of pulses. Thus, the stacked number of the desired tray 3 is detected by counting the number of the pulses. The operation timing of the switch SW3 is shown in FIG. 25.

On the other hand, when the bifurcated arm 30 is rotated in a clockwise direction, the slide bracket 33 is displaced in the direction of the arrow X2 by the spring 34 by causing the bent portion 33a thereof to be released from the second arm 30b of the bifurcated arm 30. Thus, both of the nail 111a and the nail 111b which is slightly higher in position than the nail 111a, are displaced forward (direction X2) and the lug 113b of the pushing down lever 113A is also displaced forward in the direction of the arrow X2. As a result, the nails 111a and 111b are inserted into the second separation recesses 3g2, 3g2 of the respective lowest tray 3C and the upper tray 3B next to the lowest tray 3B, and the lug 113b into the separation recess 4a6 of the tray base 4.

It should be noted that when the upper tray (3B or 3A) is selected as the desired tray 3, the nails 111a, 111b respectively go into the second separation recesses 3g2 of the selected trays 3, and the tray 3 above the selected tray 3 and lug 113b penetrates into the first separation recess 3a7 of the lower tray 3 below the selected tray 3 to push the lower tray 3 together with the tray base 4.

FIG. 14 is in enlarged perspective view of the tray selection and separation mechanism 90 (90A) in a state where the magazine 1 is mounted on the slide plate 61 and the lowest tray together with upper trays is vertically lifted upward.

Referring to FIG. 14, when the displacement of the slide plate 61 is stopped as shown in FIG. 13, the connection plate 91 is displaced in the direction of the arrow Y2 by causing the second cam wheel 77 to rotate in a clockwise direction. Thus, each of the levers 105, 107 and 109 comes to a state as shown in FIG. 14, wherein the pin 103 provided on the V-shaped lever 105 is displaced upward along the vertical slot 101a2 causing the lifter 111A to go up with its slot 111c guided by the second vertical slot 101b, as the pin 111e thereof slides on the lever portion 33b of the slide bracket 33.

In this state, as the slide plate 61 is stopped, the lowest tray 3C is vertically moved upward by causing the respective second separation recesses 3g2, 3g2 of the lowest tray 3C and the upper tray 3B above the lowest tray 3C to be engaged with the nails 111a, 111b of the lifter 111A, and the upper plate 41 of the magazine mounting section 45 (FIG. 10), is lifted together with the lowest tray 3C.

On the other hand, the pushing down lever 113A is disengaged form the lifer 111A, however, the lug 113b thereof engages with the separation recess 4a6 because the pushing down lever 113A is rotated in a clockwise direction by the torsion spring 114. Thus, it is able to provide the predetermined space K between the tray base 4 and the lowest tray 3C to allow the disc play mechanism 130 (FIG. 13) to play the desired disc 2.

Next, a description is given to the disc clamp release section 120A (B) of the tray selection and separation mechanism 90A shown in FIGS. 12 through 14, the section 120A (B) is provided to release the engagement of the clamp lever 9A (9B) from the disc 2. Hereafter, the disc clamp release section 12A will be described as an example.

As shown in FIG. 12, the disc clamp release section 120A comprises a disc clamp release lever 121A having a Y-shaped member 121a and a hanging member 121b protrudingly provided downward, the disc clamp release lever 121A is pivoted on an axle 122 on the upper plate 73 by causing the Y-shaped member to engage with a pin 94 fixed on a connecting lever 93.

When the second cam wheel 77 is positioned in the initial state as shown in FIG. 12, the connection plate 93 causing one end thereof to engage with a cam groove (not shown) provided on the bottom of the second cam wheel 77 is displaced in the direction of the arrow Y1, so that the disc clamp release lever 121A is retracted or rotated in a clockwise direction, which allows the magazine 1 to be inserted.

On the other hand, as shown in FIG. 14, when the connection plate 93 is displaced in the direction of Y2, the disc clamp release lever 121A is advanced forward or rotated in a direction of a counterclockwise direction, thus, the disc clamp release lever 121A can release the engagement of the disc clamp lever 9A from the disc 2 by causing the hanging member 121b to abut on the contact arm 9b, as described in detail referring to FIGS. 19(A) and (B) hereafter.

A Disc Play Mechanism

Next, a description is given to the disc play mechanism 130 rotatably provided on the cam wheel holder 70 referring to FIG. 15.

FIG. 15 is a perspective view showing the disc play mechanism.

The disc play mechanism 130 is moved up and down together with the cam wheel holder 70 and generally comprises a disc play section 140, a vibration isolating supporter 150 for supporting the disc play section 140 and a swing supporter 170 for displacing the disc play section 140 into the space K formed under the desired tray 2 in cooperation with the first cam wheel 76.

Referring to the FIG. 15, the turntable 143 fixed on an axle of a motor 142 is rotatably provided in an inner portion 141a of a box 141. The turntable 143 comprises a disc mounting section 143b, a spindle 143a erected upright from the disc mounting section 143b for engaging with the center hole 2b (FIG. 3) of the disc 2, and nails 144 made of such elastic material as rubber provided in a movable manner radially back and forth at three positions around the periphery of the spindle 143a.

Further, an optical pickup 145 is slidably provided on a guide rail 146 formed in the box 141 by causing one end thereof to engage with a guide rail 46 and another end thereof to engage with a feed screw 148 driven by a motor 147 so that the optical pickup 145 slides along the guide rail 146 in a radial direction of the disc (directions of arrows D1, D2).

Further, the vibration isolating supporter 150 for supporting the disc play section 140 comprises three first supporting members 141b provided along the outer periphery of the box 141 and three rubber vibration isolators 151 respectively fitted into the first supporting members 141b for supporting the box 141 in a floated manner. The bottoms of the three rubber vibration isolators 151 are respectively fixed on a chassis 152 so as to support the box 141 through the isolators 151 at three positions in consideration of a weight balance of the disc play section 140.

Further, the vibration isolating supporter 150 comprises three second supporting member 141c protrudingly provided as cone-shaped pivots around a periphery of the box 141, and comprises box supporting members 157–159 rotatably connected to each other provided between the box 141 and the chassis 152 for detachably engaging with the three second supporting members 141c in such a manner that the box supporting members 157–159 are disengaged or engaged from or with the second supported members 141c depending on an operational status of the disc play section 140. A floating lever 160 engaged with a cam groove 76d formed on the bottom of the first cam wheel 76 is pivoted on an axle 161 under the first cam wheel 76. A pushing arm 160a is formed at one end of the floating lever 160 to detachably engage with the box supporting members 157–159. Upon playing of the disc 2, the box supporting members 157–159 are detached from the second supported members 141c by being pushed by the pushing arm 160a through the first cam wheel 76 rotates, thus, the disc play section 140 is supported by the three rubber vibration isolators 151, which allows the disc play section 140 in a floated condition so that outer vibration is isolated. The swing supporter 170 has a function for swingably supporting the the disc player located between the bottom plate 73 and the upper plate 72 in the floated condition.

The swing supporter 170 comprises an arm 173 having a bifurcated arm 173a pivoted on an axle 171 fixed on the chassis 152 by being biased with a torsion spring 172 in a counterclockwise direction, wherein the lower end of the axle 171 is rotatably supported on the bottom plate 72 and the upper end of the axle 171 is rotatably supported on the upper plate 73. Thus, the arm 173 is rotated or biased in a counterclockwise direction so as to retract the chassis 152 together with the disc play section 140 located between the bottom plate 72 and the upper plate 73 by causing the one end of the torsion spring 172 to engage with a bent portion 152a formed on the chassis 152.

On the other hand, a swing lever 174 having a pin 176 at one end thereof is pivoted on an axle 175 on the bottom of the upper plate 73 in such a manner that the other end of the swing lever 174 is engaged with a cam groove 76e of the first cam wheel 76 and the pin 176 is engaged with the bifurcated arm 173a of the arm 173.

When the first cam wheel 76 is rotated in a clockwise direction, the arm 173 is rotated in a clockwise direction against the torsion spring 172 by means of the swing lever 174, thus, the disc play section 140 on the chassis 152 connected to the arm 173 is also rotated in a clockwise direction, so that disc play section 140 can be displaced with the shortest stroke to a position where the disc 2 is played as shown in FIG. 15.

Overall Operation of the Disc Player 20

Next, a description is given briefly to overall operation of the disc player 20 in order.

FIGS. 16 through 24 are explanatory views for overall operation of the disc player 20 in order, wherein (A) and (B) respectively indicate a plan view and a front elevation view which is viewed from the side of insertion of the magazine 1.

FIG. 25 is a timing chart of operations of main components in the disc player.

Respective operations of components shown in FIGS. 16 through 24 is omitted here for simplicity and the magazine slide plate 5 of the magazine 1 is assumed to be in the third state in an initial state as shown in FIG. 6.

Referring to FIGS. 16(A), (B), the magazine 1 containing discs 2 held by trays 3(3A, 3B, 3C) is inserted between the lower plate 42 and the upper plate 41, wherein each of the discs 2 is held by the pair of the disc clamp levers 9A, 9B.

On the other hand, the first and second cam wheels 76, 77 are in an initial state because the switch lever 78 engaged with the cam groove of the first cam wheel 76 abuts on the SW4. In this state, each of the connection plates 91, 93, 95, 96 is engaged with cam wheels 76, 77 as indicated in the figure in such a manner that the connection levers 91, 93 displaced in the direction of the arrow Y1, and the connection levers 95, 96 are displaced in the direction of the arrow X2, and in the direction of the arrow X1 respectively. Further, lifters 111A, 111B are displaced in their lowest positions, and the nails 111a, 111b of the lifters 111A, 111B, the pushing lever 113A, 113B and the disc clamp release levers 121A, 121B are respectively retracted from the trays 3. The disc play mechanism 130 is also retracted under the upper plate 73 of the frame 71, though it is not shown in FIG. 16.

Figure 17A:
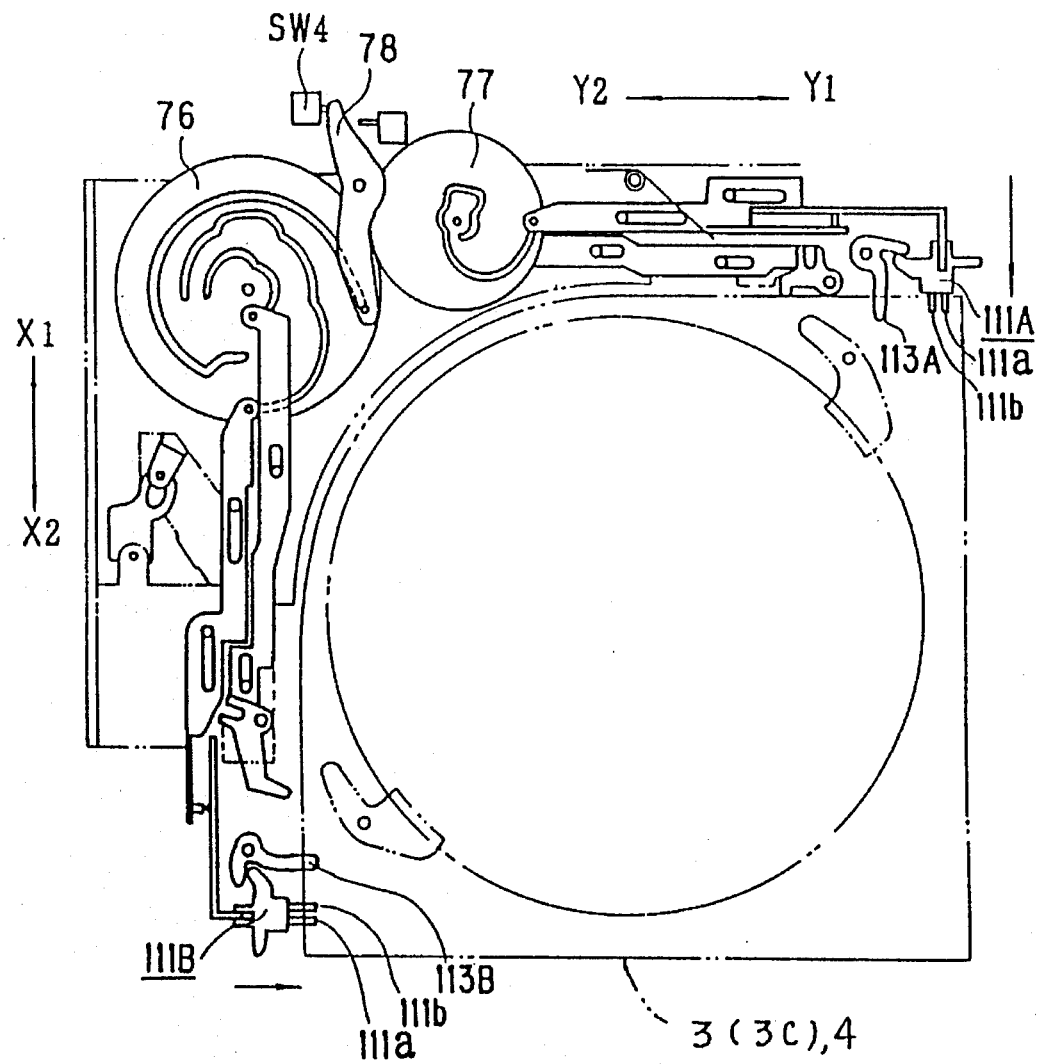
FIGS. 17(A) and 17(B) are explanatory views of the operation of the disk player 20 with (A) and (B) representing a plan view and a front elevation respectively.
Figure 17B:
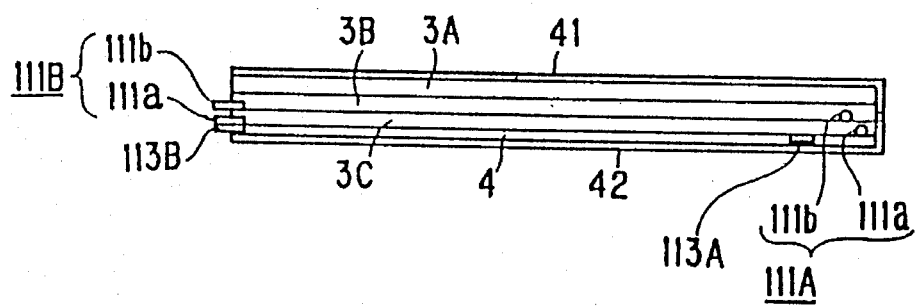

Next, referring to FIGS. 17 (A), (B), the first and second cam wheels 76, 77 are positioned in the initial state. When the lowest tray 3C, for instance, is selected, as described referring to FIG. 12, the nails 111a, 111b of the lifters 111A, 111B respectively engages with the trays 3C, 3B and the pushing down lever 113A is displaced over the tray base 4.

Figure 18A:
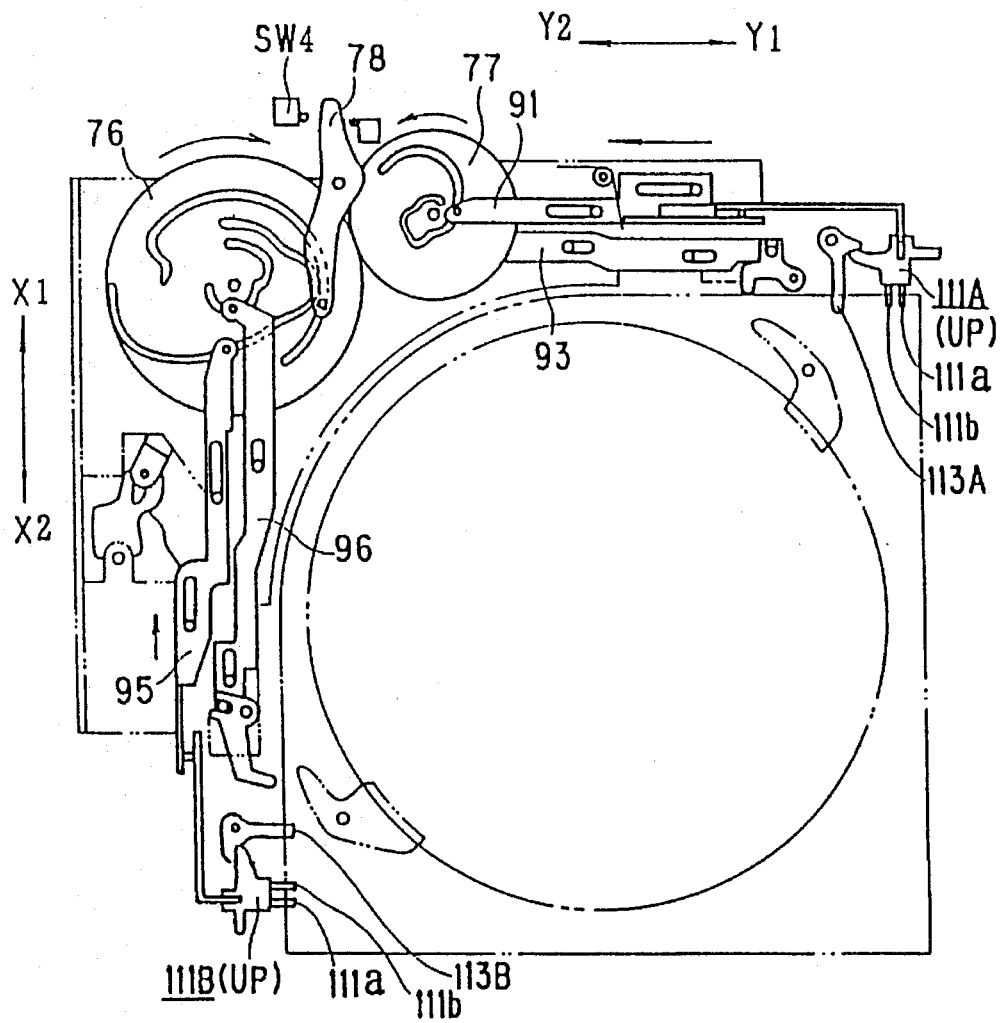
FIGS. 18(A) and 18(B) are explanatory views of the operation of the disk player 20 with (A) and (B) representing a plan view and a front elevation respectively and with the cam wheels rotated in a clockwise and counterclockwise direction respectively.
Figure 18B:
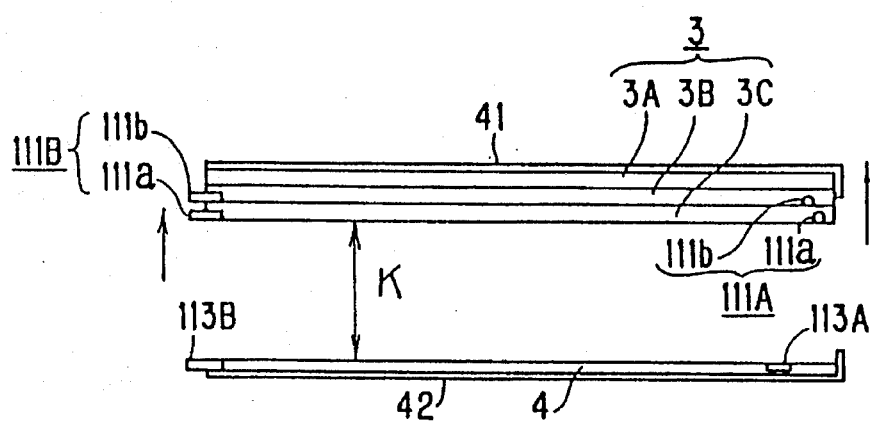

Next, referring to FIGS. 18 (A), (B), when the first and second cam wheels 76, 77 are respectively rotated in a clockwise direction and a counterclockwise direction as shown with arrows according to direction signals from a computer (not shown), the connection plates 91, 95 are respectively displaced in the directions of the arrows Y2, X1, so that the lifters 111A, 111B are displaced upward, thus, trays 3C, 3B, 3A closely stacked each other are lifted by the nails 111a, 111b of the lifters 111A, 111B together with the upper plate 41 of the magazine mounting section 45. At that time, the tray base 4 is held downward by the pushing down levers 113A, 113B, thus, the space K is formed between the tray 3C and the tray base 4.

Figure 19:
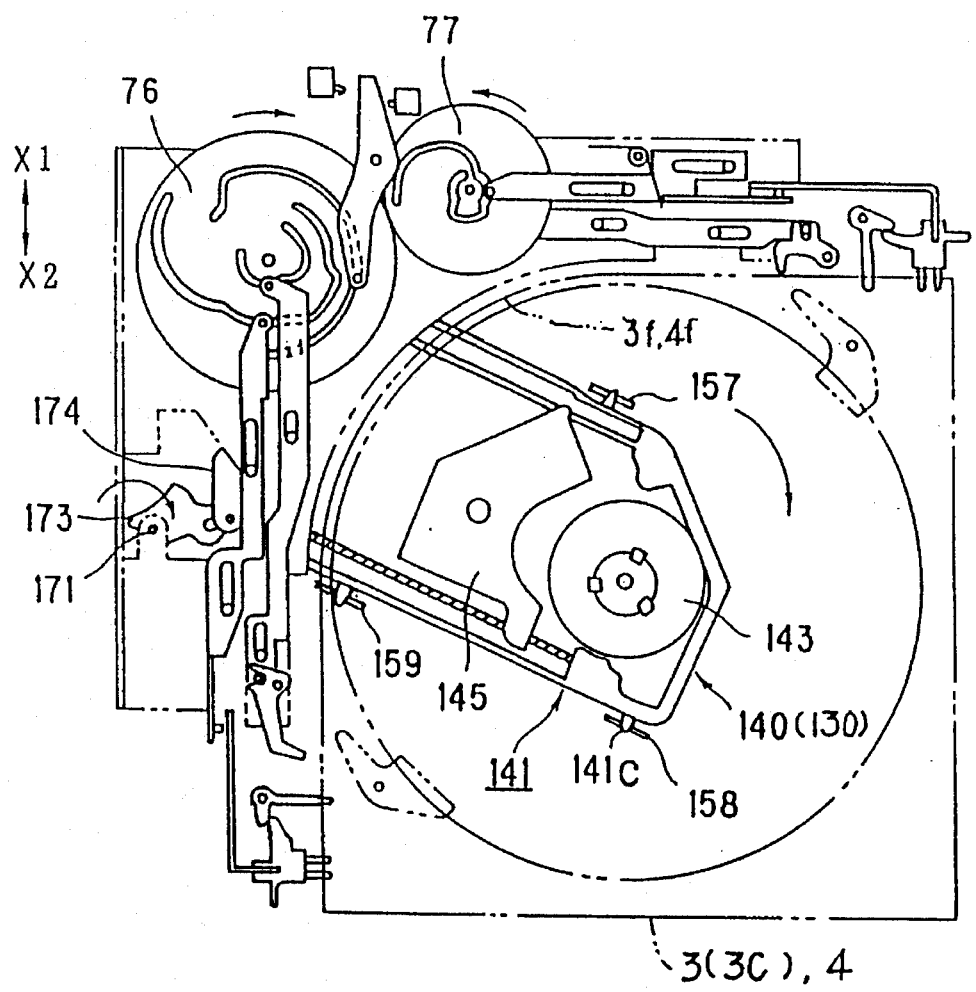
FIGS. 19(A) and 19(B) are explanatory views of the operation of the disk player 20 with (A) and (B) representing a plan view and a front elevation respectively and with the cam wheels rotated in a clockwise and counterclockwise direction respectively.
Figure 19:
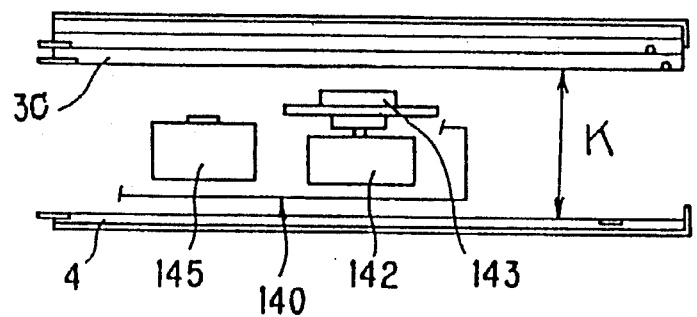

Next, referring to FIGS. 19 (A), (B), when the first and second cam wheels 76, 77 are further rotated in a clockwise direction and a counterclockwise direction respectively as shown with arrows, the arm 173 is rotated in a clockwise direction centerring on the axle 171 by means of the swing lever 174 of which one end is engaged with the cam groove 76e formed on the bottom of the first cam wheel 76, thus, the disc play mechanism 130 enters into the space K, wherein the box 141 for supporting the disc play section 140 is tightly supported on the chassis 152 (FIG. 15) by the box supporting members 157–159.

Figure 20A:
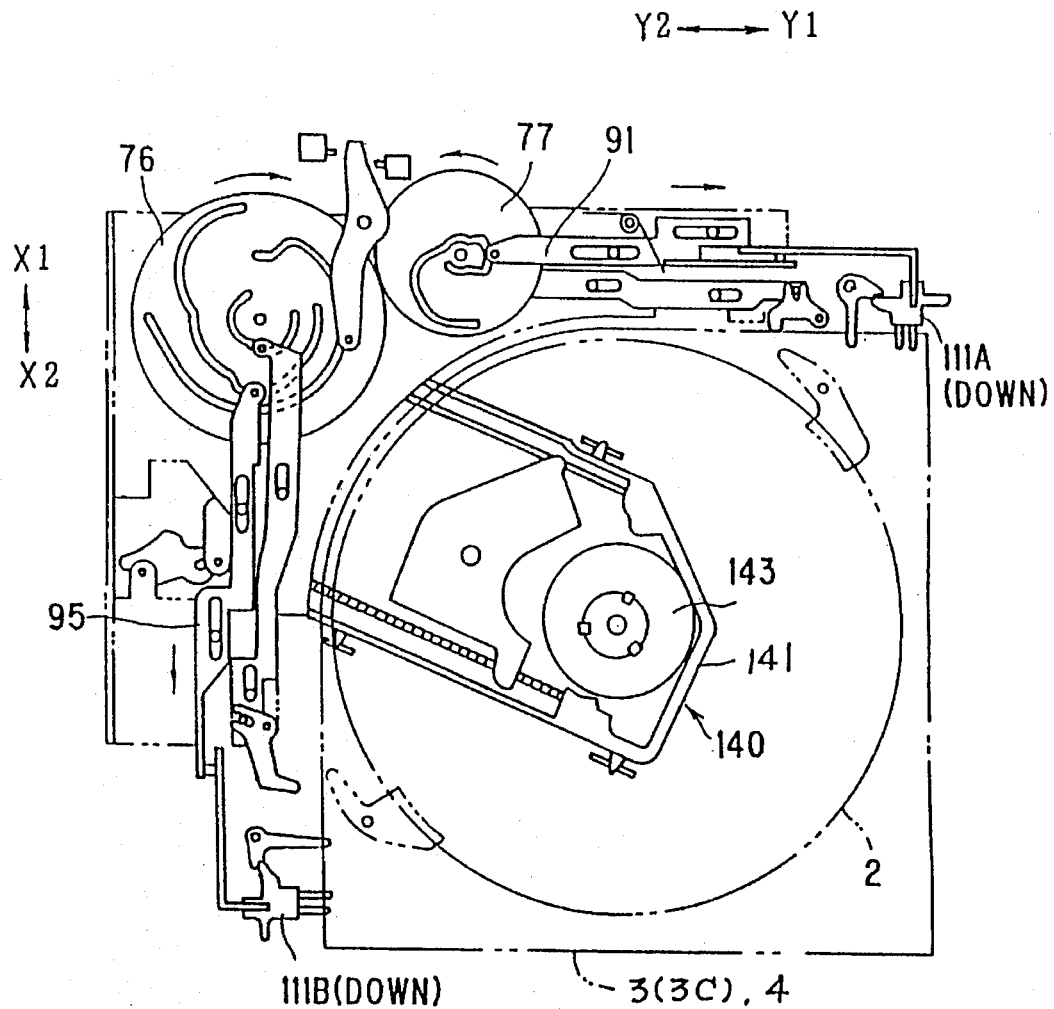
FIGS. 20(A) and 20(B) are explanatory views of the operation of the disk player 20 with (A) and (B) representing a plan view and a front elevation respectively and with the cam wheels rotated in a clockwise and counterclockwise direction respectively.
Figure 20B:
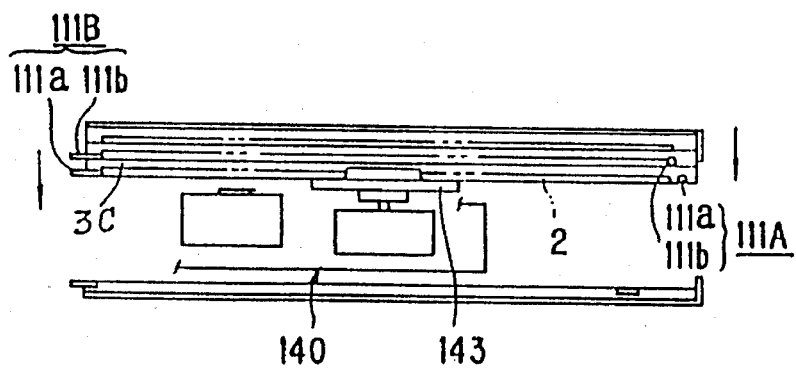

Next, referring to FIGS. 20 (A), (B), when the first and second cam wheels 76, 77 are further rotated in a clockwise direction and a counterclockwise direction respectively as shown with arrows, the connection plates 91, 95 are slightly displaced in the directions of arrows Y1 and X2 respectively, thus, the lifters 111A, 111B are slightly displaced downward, wherein the disc 2 selected is placed and clutched on the turntable section 143 in such a manner that the disc 2 is kept clamped by the disc clamp levers 9A, 9B, thus the disc 2 is securely placed and clutched on the turntable section 143.

Figure 21A:
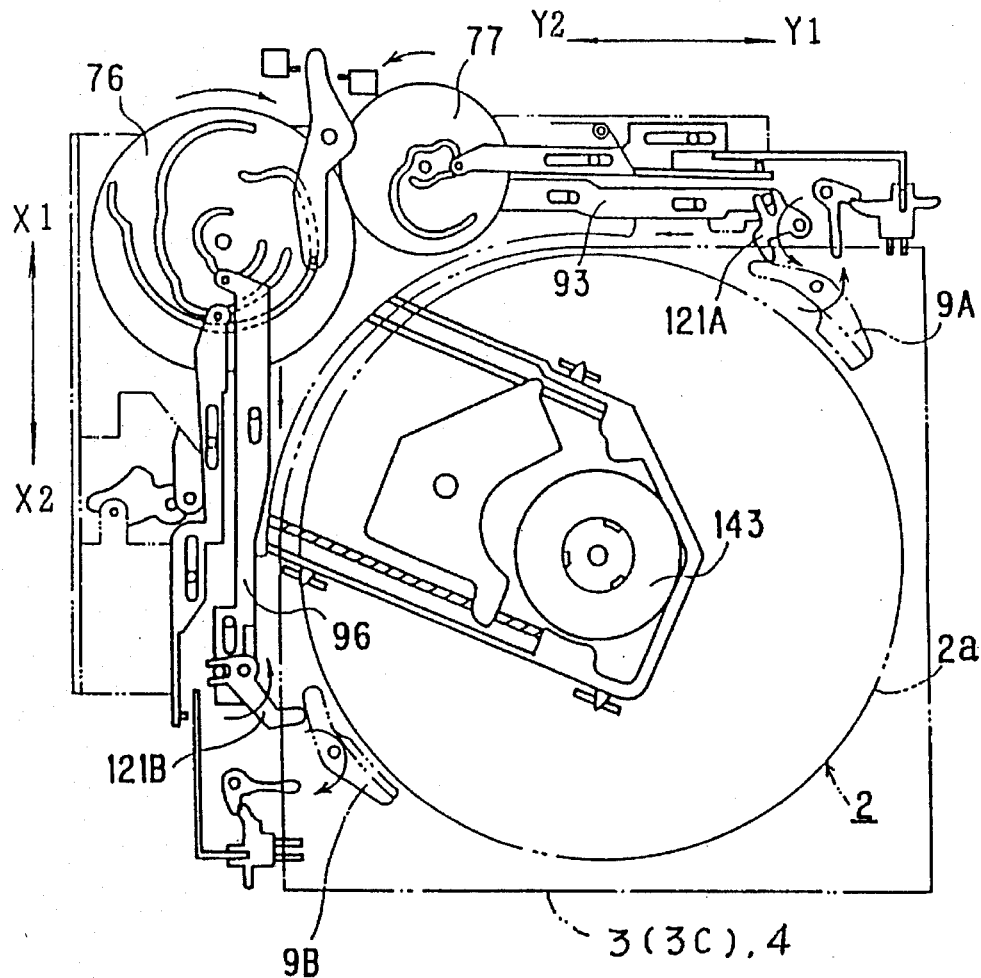
FIGS. 21(A) and 21(B) are explanatory views of the operation of the disk player 20 with (A) and (B) representing a plan view and a front elevation respectively and with the cam wheels rotated in a clockwise and counterclockwise direction respectively.
Figure 21B:
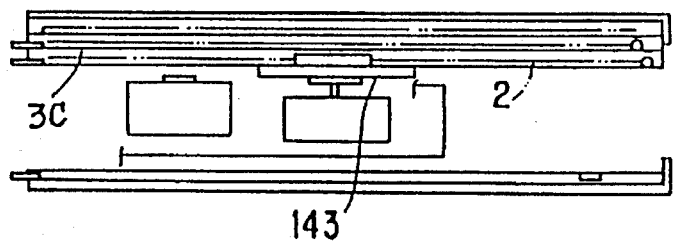

Next, referring to FIGS. 21 (A), (B), when the first and second cam wheels 76, 77 are further rotated in a clockwise direction and a counterclockwise direction respectively as shown with arrows, the connection plates 93, 96 are displaced in the directions of arrows Y2 and X2 respectively, thus, the disc clamp release levers 121A, 121B are displaced to push the disc clamp levers 9A, 9B, so that the disc 2 clutched on the turntable 143 is released from the tray 3C.

Figure 22:
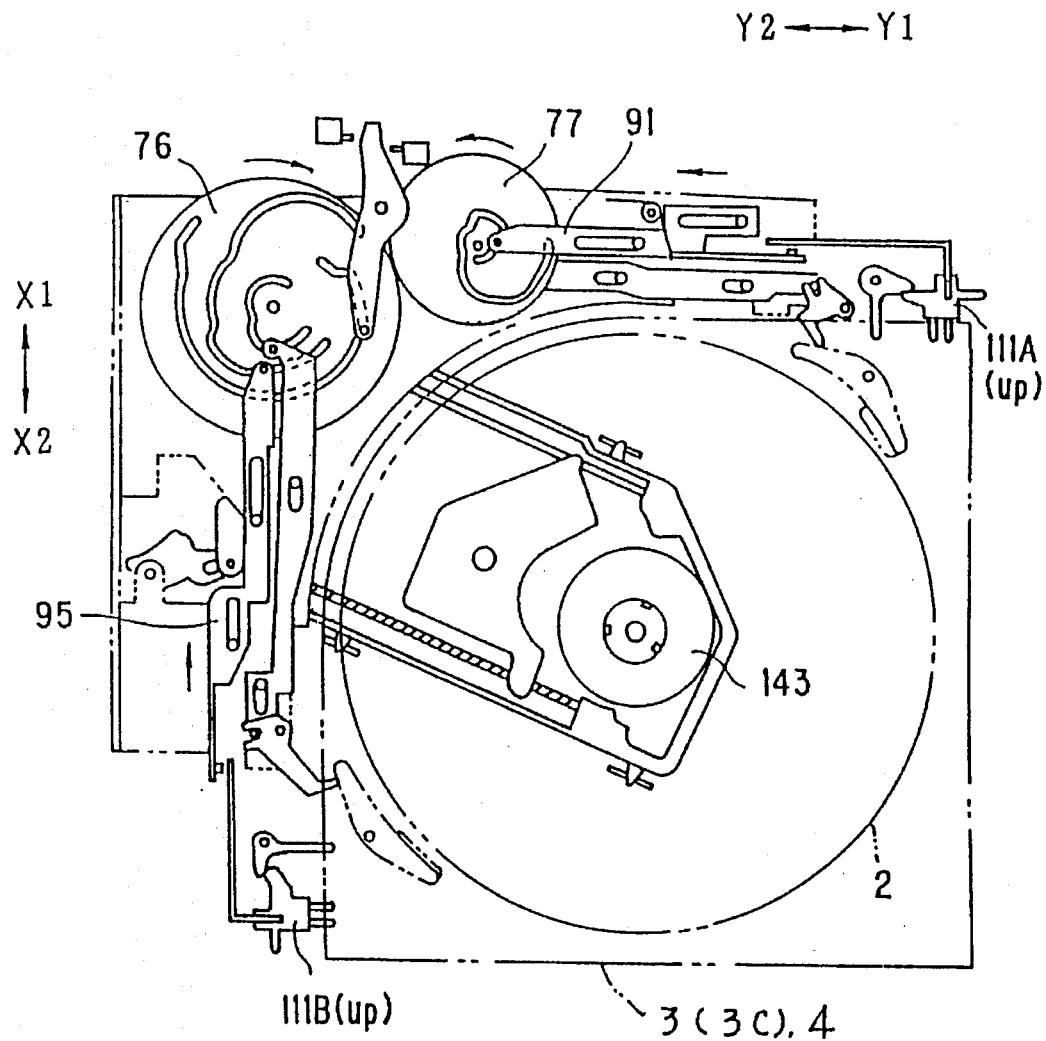
FIGS. 22(A) and 22(B) are explanatory views of the operation of the disk player 20 with (A) and (B) representing a plan view and a front elevation respectively and with the cam wheels rotated in a clockwise and counterclockwise direction respectively.
Figure 22:
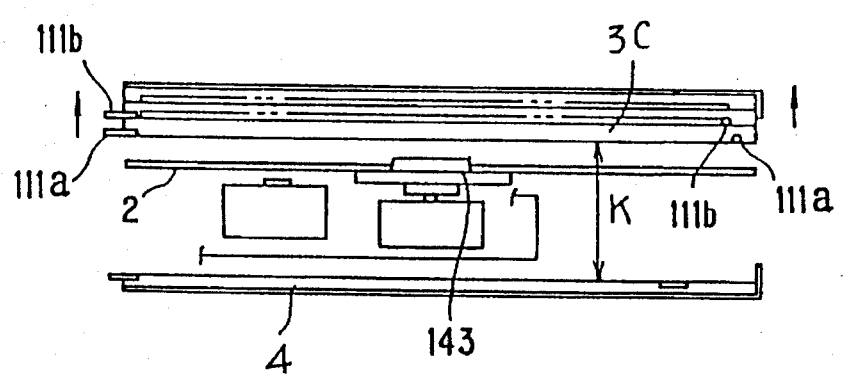

Next, referring to FIGS. 22 (A), (B), when the first and second cam wheels 76, 77 are further rotated in a clockwise direction and a counterclockwise direction respectively as shown with arrows, the connection plates 91, 95 are slightly displaced in the directions of arrows Y2 and X1 respectively, thus, the lifters 111A, 111B are slightly displaced upward from the turntable 143. As a result, only the disc 2 is clutched on the turntable 143, and the predetermined space K is formed again between the tray base 4 and the tray 3C selected.

Figure 23:
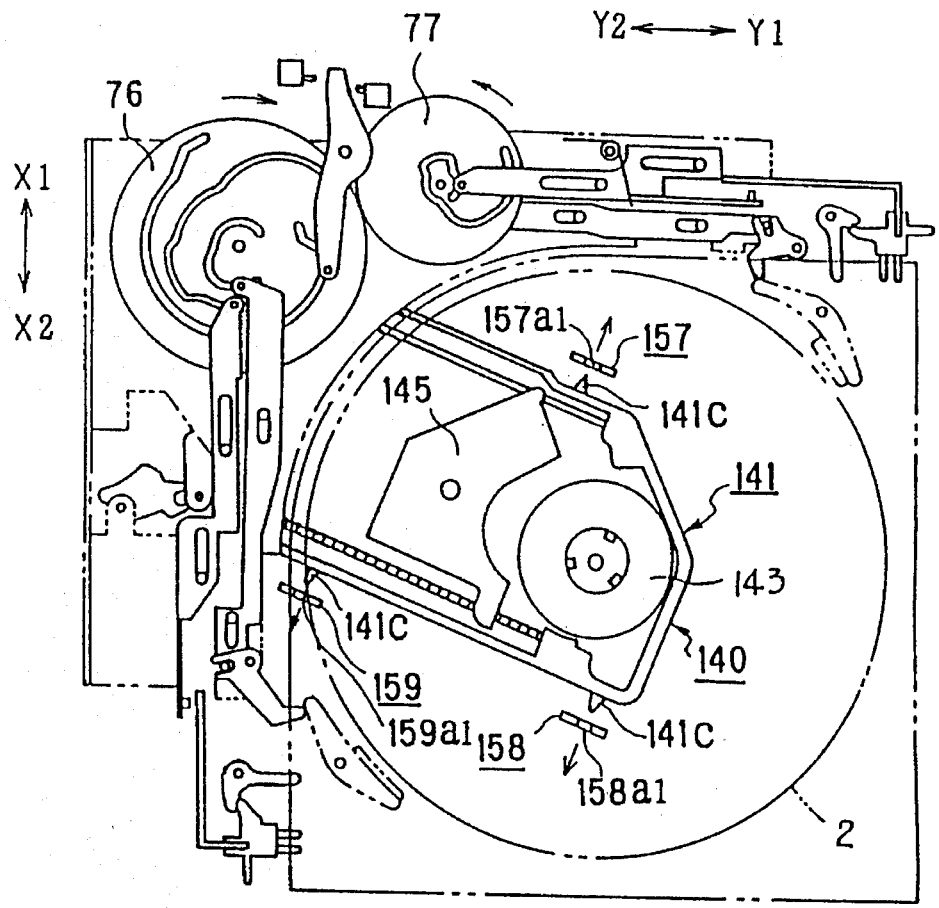
FIGS. 23 (A) and 23 (B) are explanatory views of the operation of the disk player 20 with (A) and (B) representing a plan view and a front elevation respectively and with the cam wheels rotated in a clockwise and counterclockwise direction respectively.
Figure 23:
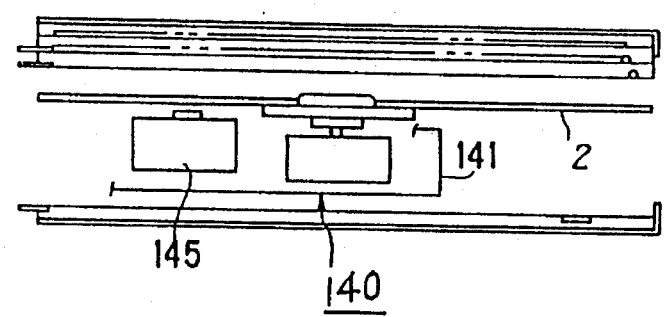

Next, referring to FIGS. 23 (A), (B), when the first and second cam wheels 76, 77 are further rotated in a clockwise direction and a counterclockwise direction respectively as shown with arrows, the box supporting members 157–159 are detached form the second supporting members 141c by the floating lever 160 of which one end is engaged with the cam groove 76d formed on the bottom of the first cam wheel 76, thus, the box 141 is supported by the rubber vibration isolators 151.

Figure 24A:
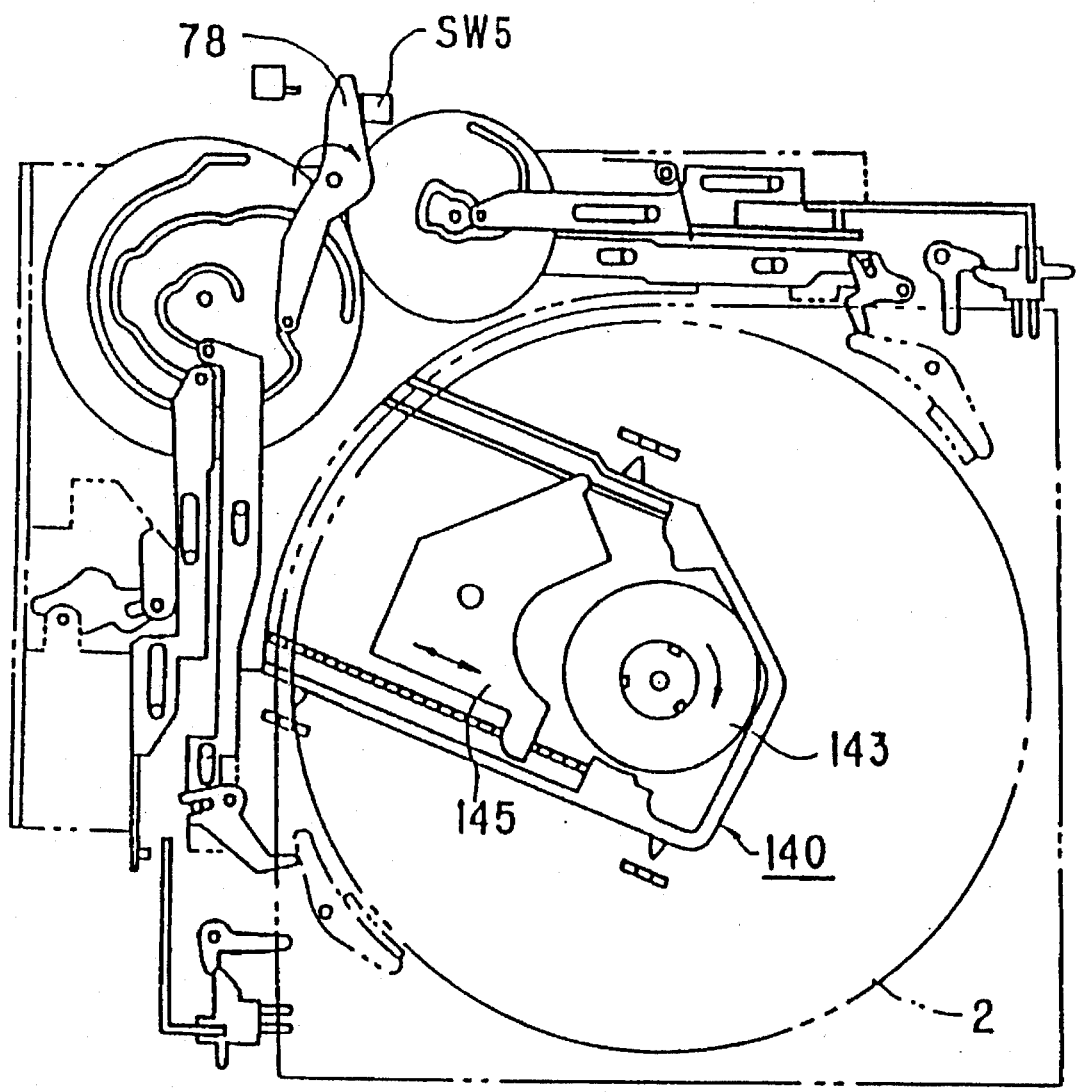
FIGS. 24(A), 24(B) and 24(C) are explanatory views of the operation of the disk player 20 with (A) and (B) representing a plan view and a front elevation respectively.
Figure 24:
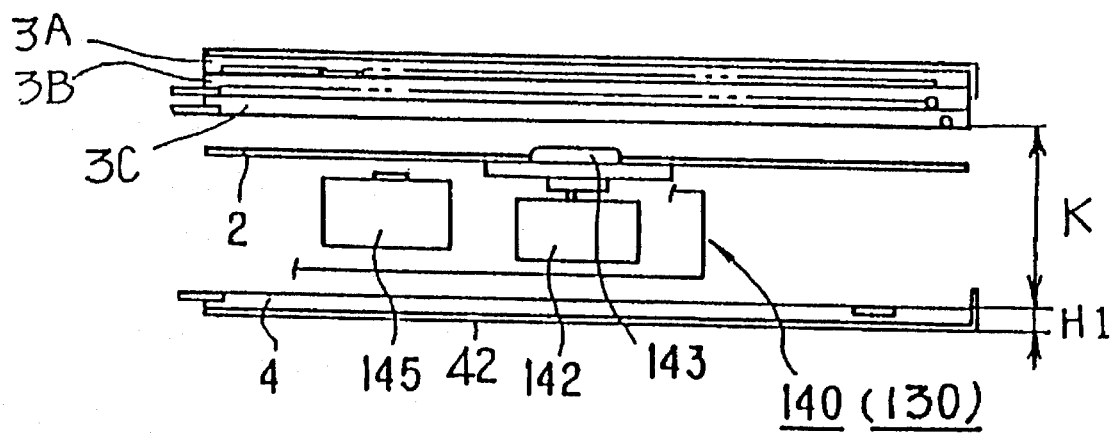
Figure 24:
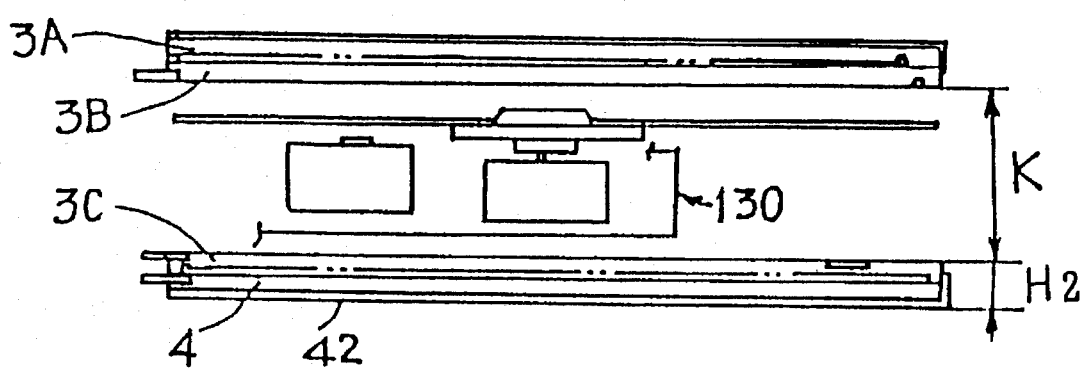

Next, referring to FIGS. 24 (A), (B), when the switch lever 78 abut on the switch SW5, the first and second cam wheels 76, 77 are stopped to rotate. In this state, the turntable 143 is rotated, and the disc 2 thereon is played by the optical pickup 145 in such a manner that the optical pickup is displaced in the radial direction of the disc 2.

As shown in FIG. 24 (C), when the middle tray 3B is selected, for instance, the predetermined space K is formed between the bottom of the middle tray 3B and the upper surface of the lowest tray 3C. Thus, in this case, the predetermined space K is formed in a higher position than in the case of the lowest tray 3C being selected as shown in FIG. 24B by a thickness of the tray 3C, i.e. H2–H1.

On the other hand, as described in the foregoing, the disc play mechanism 130 is vertically displaced in a stepped manner according to the height of the predetermined space K together with the cam wheel holder 70 to play the selected disc 2.

A reverse operation for stacking the separated trays 3 tightly again is performed in reverse order regarding the operation order mentioned in the foregoing, thus, the description is omitted.

2. A Second Embodiment

A Construction of a Magazine of the Second Embodiment

A description is given to a second embodiment of the magazine of the present invention referring to FIGS. 26 through 43(B).

Figure 26:
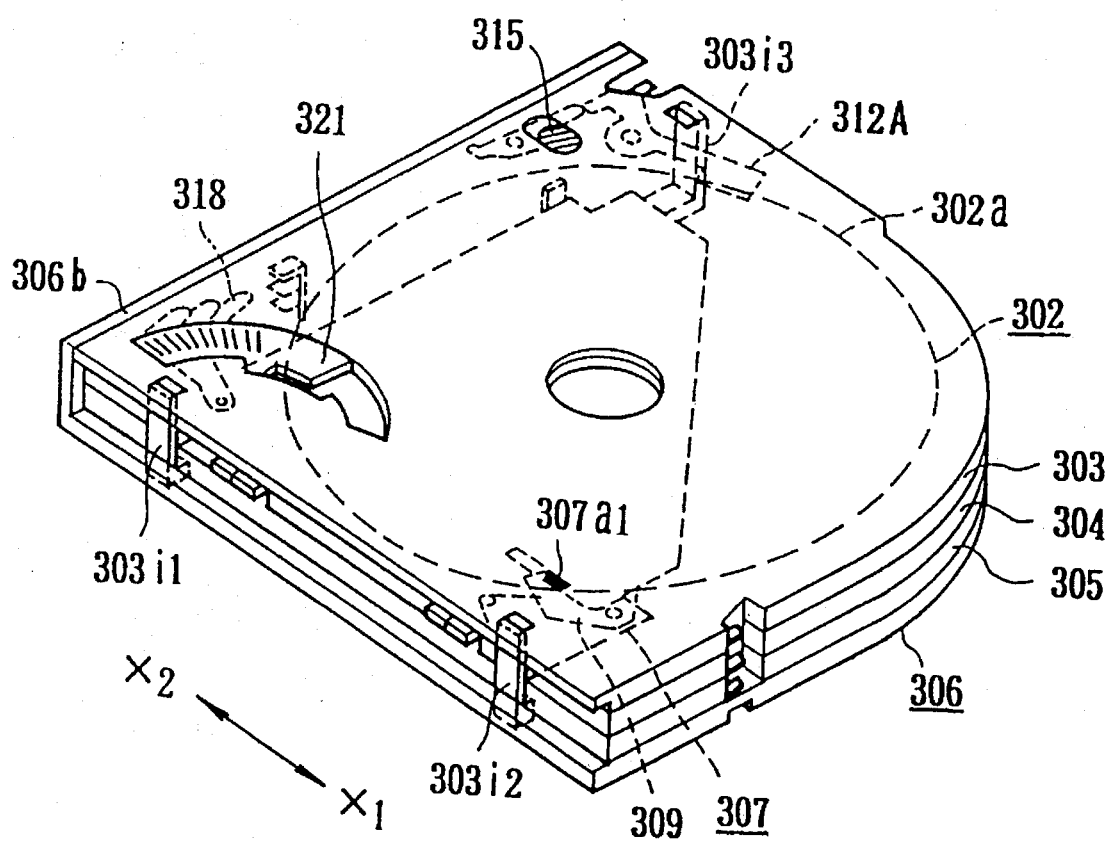
FIG. 26 is a perspective view showing the second embodiment of the magazine.
Figure 27:
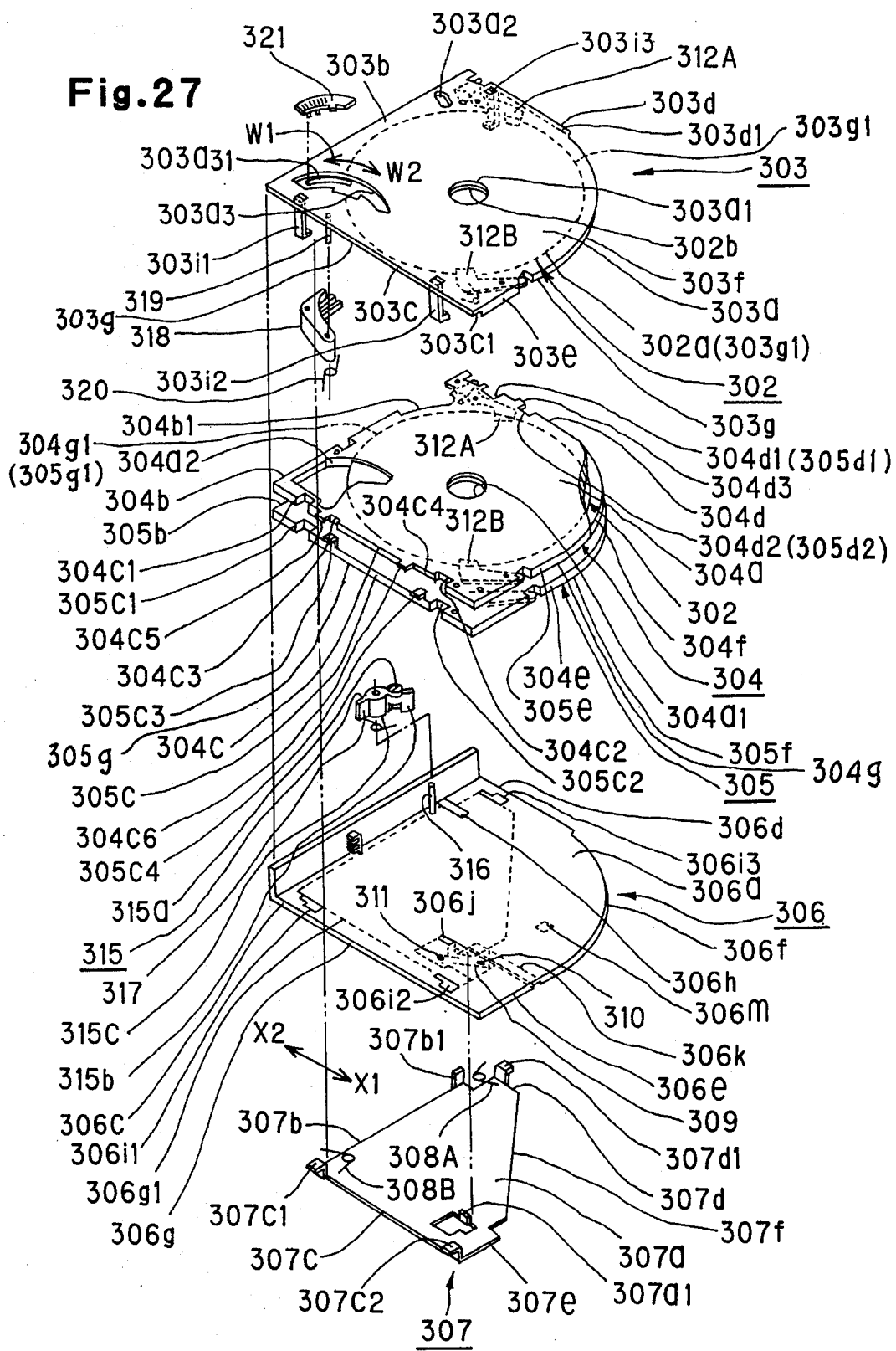
FIG. 27 is an exploded perspective view of the magazine shown in FIG. 26.
Figure 28:
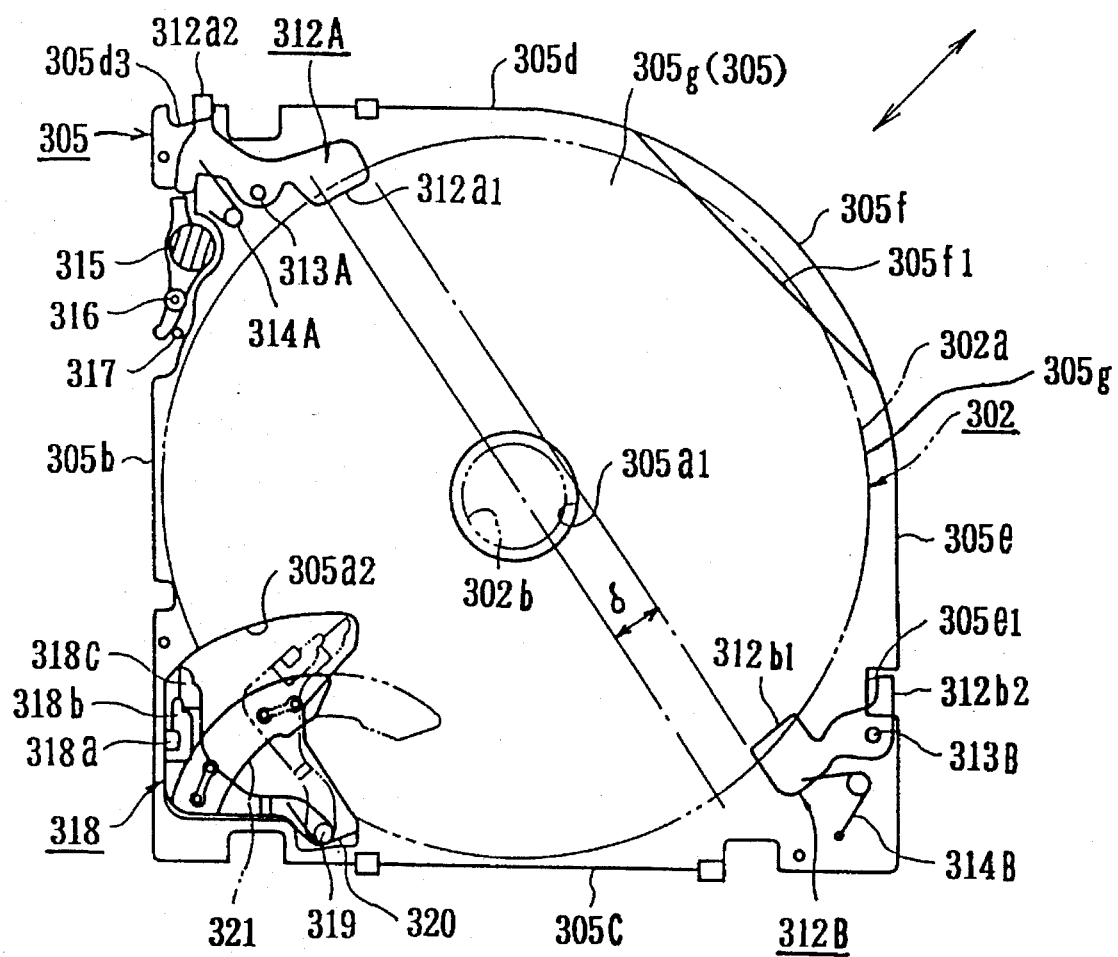
FIG. 28 is a plan views showing an exemplary lower tray.

FIG. 26 is a perspective view showing the second embodiment of the magazine, and FIG. 27 is an exploded perspective view of the magazine shown in FIG. 26, FIG. 28 is a plan views showing an exemplary lower tray, FIGS. 29 (A), (B) are plan view respectively showing a disc clamp lever and a lock lever, and FIGS. 30 (A) through (c) are plan views for explaining the disc clamp release lever.

A magazine 301 of the second embodiment as shown in FIG. 26 is constructed so as to be compatible with a player 330 of a second embodiment for playing, for instance, CDs (compact disc) as described thereafter. The magazine 301 contains a plurality of discs 302 held respectively by a plurality of trays (wafers) 303–305 at peripheries of the discs 302. In an initial state where the magazine 301 can be hand-carried as shown in FIG. 26, an upper tray 303, a middle tray 304 and a lower tray 305 are closely stacked on a tray base (wafer) 306 provided as a base of the magazine 301 so as to form a frame structure by a magazine slide plate 807 provided to slide in directions of arrows X1, X2 under the tray base 306 and a part of trays 803–305.

Figure 32:
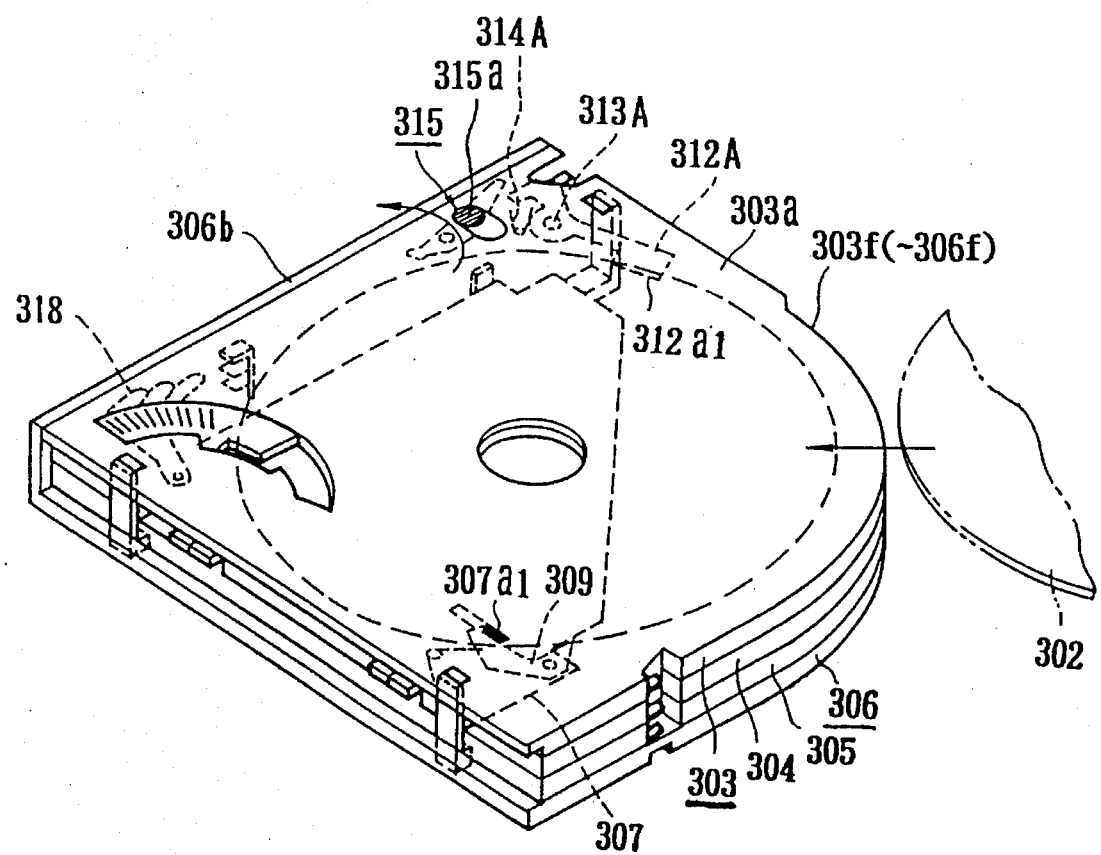
FIG. 32 is a perspective view showing a state where a disc 302 is inserted in one of trays 303–305 from one of the round portions (hereinafter identified throughout the specification as "R-portions") 303f–305f thereof in the first state of the magazine 301, wherein the magazine slide plate 307 is positioned in the first slide position.
Figure 33:
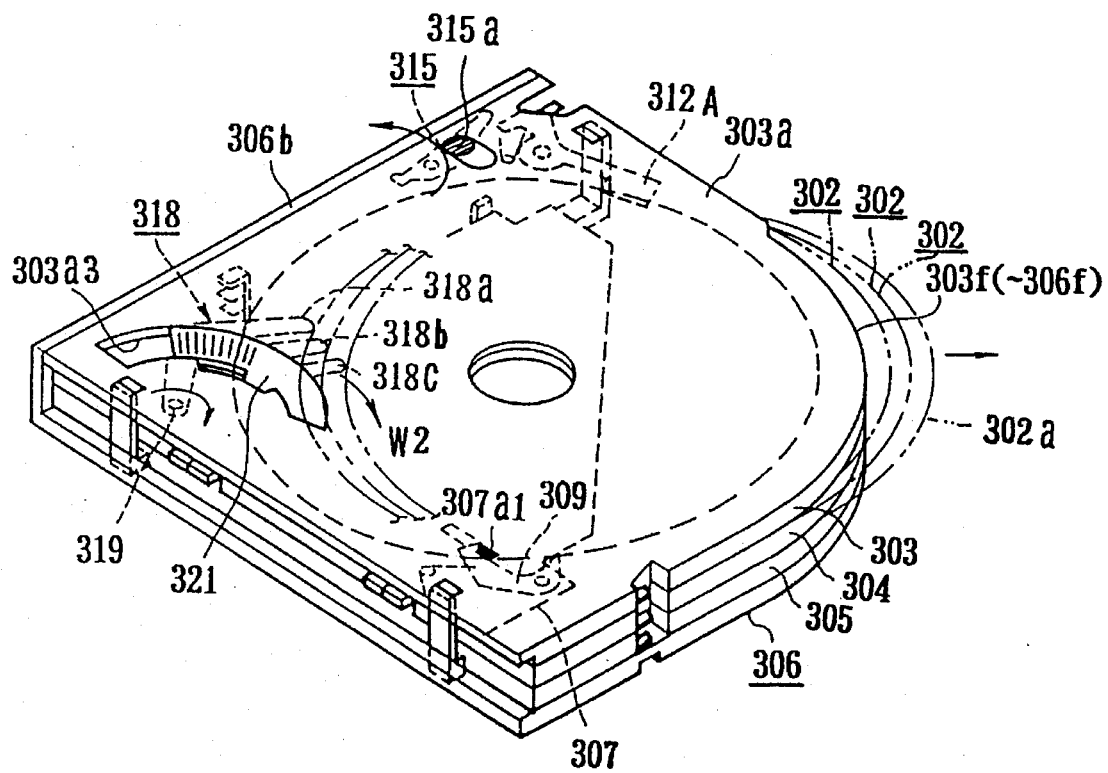
FIG. 33 is a perspective view showing a state where a disc is-being discharged from one of the R-portions 303f–305f of one of the trays 303–305 in the first state of the magazine 301, wherein the magazine slide plate 307 is positioned in the first slide position and the lock lever 315 is disengaged from the disc clamp lever 312A.
Figure 34:
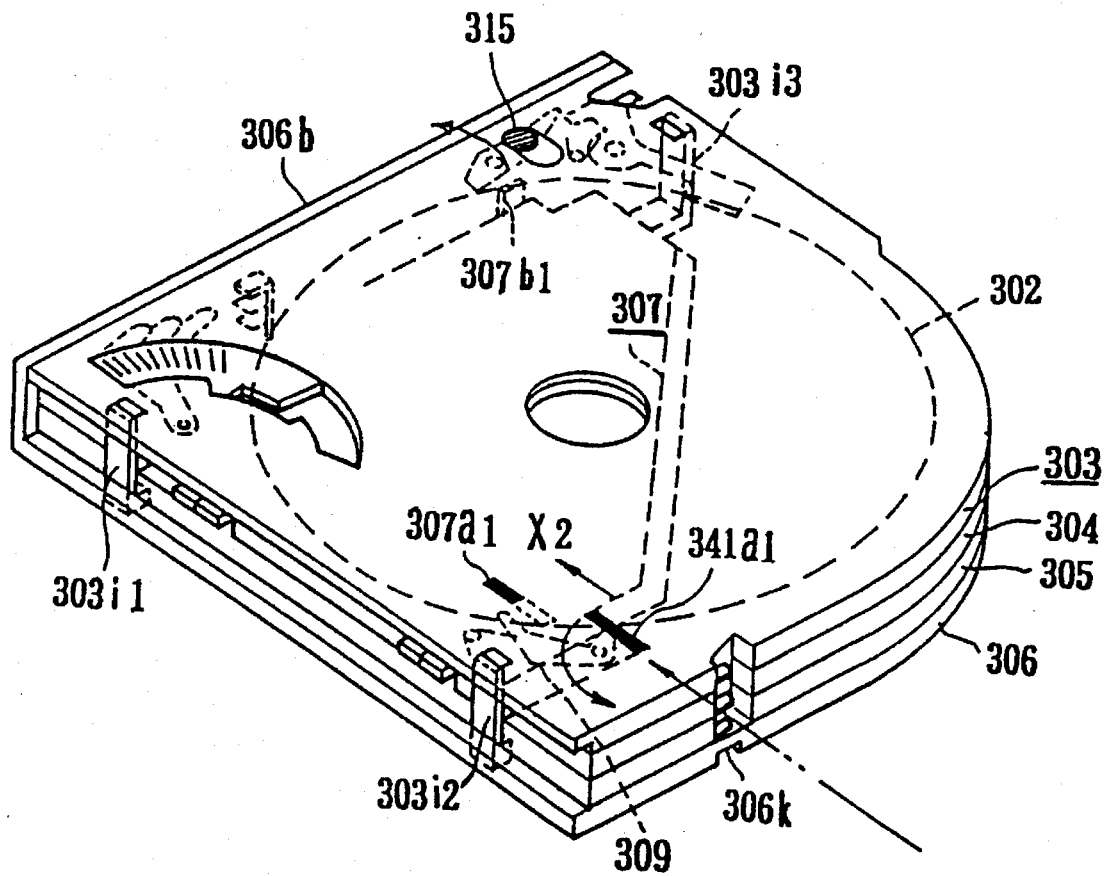
FIGS. 34(A)–34(C) show the second state of the magazine 301, wherein the magazine slide plate 307 is displaced to the second slide position upon an insertion of the magazine 301 into the disc player 330 (FIE. 36), and the trays 303–305 holding the discs 302 are separable.
Figure 34:
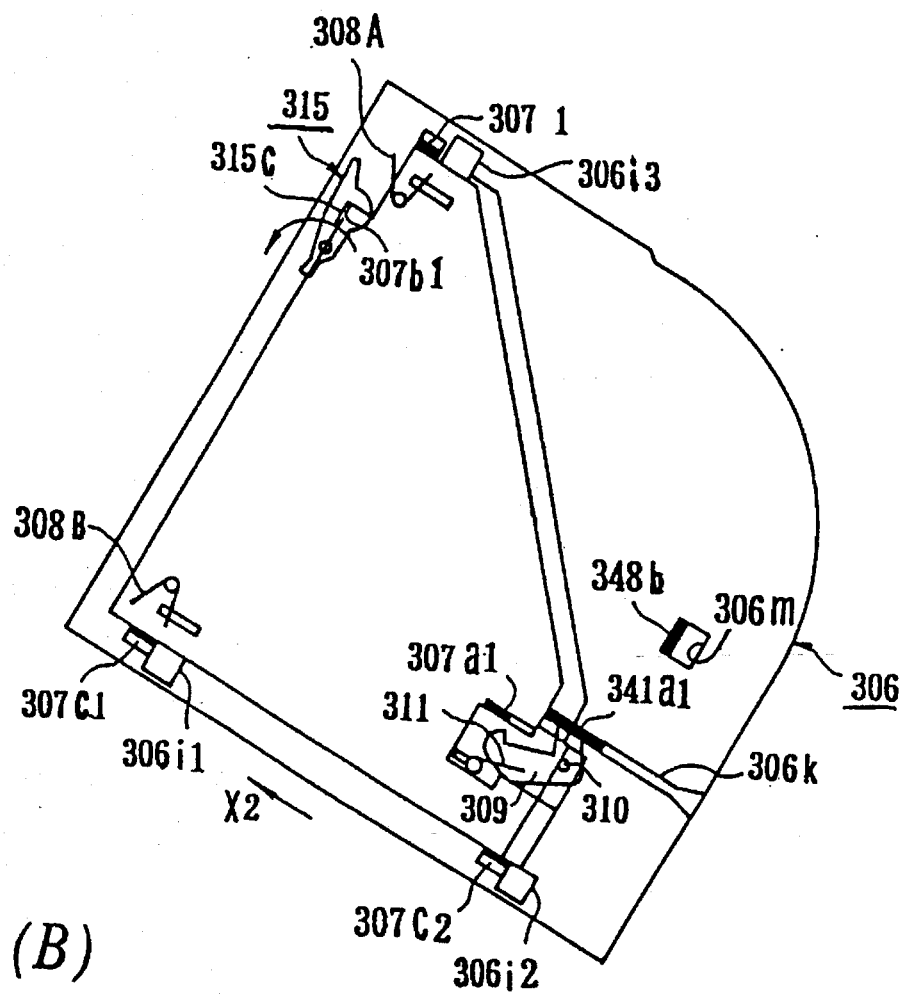
Figure 34:
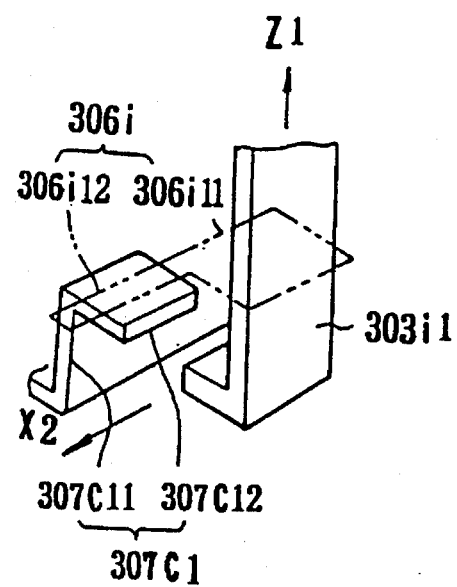

Further, the magazine 301 is constructed to take two states according to a position of the magazine slide plate 307, i.e. a first state where the magazine slide plate 307 is positioned at a first slide position being displaced in the direction of the arrow X1 as shown in FIG. 26 and FIGS. 31–36, and a second state where the magazine slide plate 307 is positioned at a second slide position being displaced in the direction of the arrow X2 upon an insertion of the magazine 301 into the player 380 as shown in FIG. 34.

In the first state, the magazine 301 can be hand-carried, wherein the discs 302 are allowed to be detached from or inserted to the trays 305–303 freely, which is different from the first state of embodiment 1 as mentioned in the foregoing.

In the second state, the trays (303–305) are separable, wherein a desired tray is selected from the stacked trays (303–305) and is separated so as to form a predetermined space K thereunder into which the disc play mechanism 360 is enters to play a desired disc held by the selected tray, which is equivalent to the third state of the embodiment 1.

It should be noted that in the aforementioned first state, the size of the magazine 301 containing three pieces of ordinary CDs, for instance, becomes approximately the same as that of the first embodiment (FIG. 1).

Next, a description is given to each of components of the magazine 301 referring to FIG. 27.

The tray base 306 made of resin material for tightly stacking trays 303–305 comprises an upper surface 306a having partly a rectangular portion together with an R(round)-portion 306f and a side plate 306b erected upright from the one end of the rectangular portion, thus the tray base 306 generally has an L-shaped configuration. The bottom plate 306 defines a pair of opposed sides 306c, 306d each being perpendicular to the side plate 306b, a side 306e being parallel to the side plate 306b and the R-portion 306f having larger radius than that of the disc 302 at the corner formed by the both sides 306d, 306e to allow an easy insertion or a release of the lower tray 305 and an access of the disc play mechanism 360 (FIGS. 35–37) with a shortest stroke by its swing motion as described hereafter.

Figure 37:
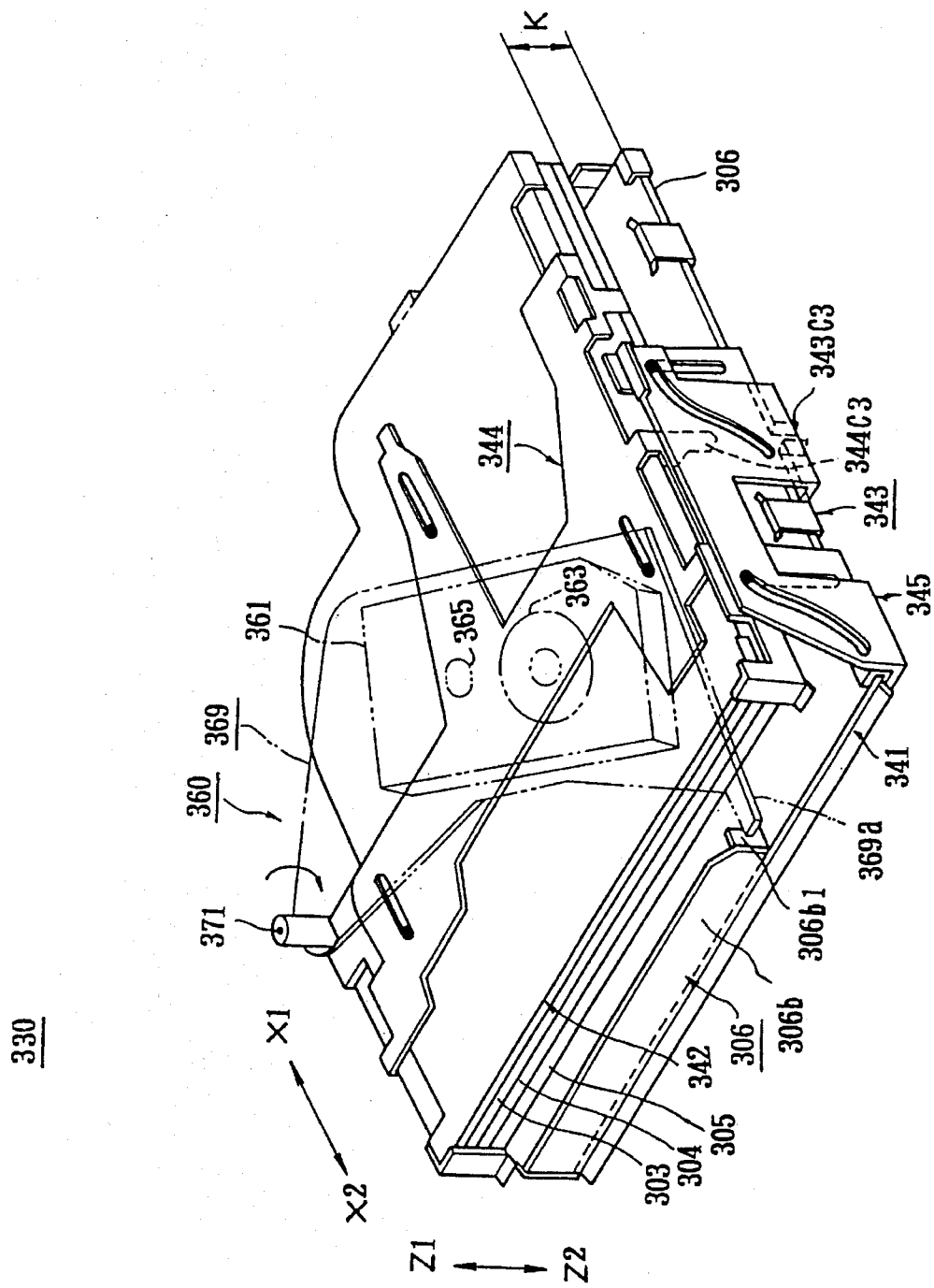
FIG. 37 is a perspective view, with parts partially disassembled, showing a state where trays 303–305 are separated from the tray base 306 of the magazine 301 in the disc player 330 shown within FIG. 36.

Further, an engage section 306b1 is provided on the inner surface of the, side plate 306b. The engage section 306b1 has plural steps each having a width approximately corresponding to a thickness of each tray (303–305). As shown in FIGS. 34(A) and 37, an engaging portion 369a of an arm 369 of the disc play mechanism 360 engages with the engage section 306b1 when the disc play mechanism 360 enters below the selected tray, this enable a center hole 302b of the selected disc 302 to be positioned to fit on a turntable 363 of a disc play mechanism 360. The disc play mechanism 360 is provided with a box 361 holding the turn table 363 and an optical pickup 365.

Further, the tray base 306 is provided with a shallow trapezoid recess 306g1 similar to a configuration of a magazine slide plate 307 described hereafter at the bottom 306g thereof so as to slidingly guide the magazine slide plate 307 in directions of arrows X1, X2, wherein end walls of the trapezoid recess 306g1 define a range of sliding motion of the magazine slide plate 307, and restricts the magazine slide plate 307 to a first position in the direction of the arrow X1, and to a second position in the direction of the arrow X2.

Furthermore, the tray base 306 is provided with a slot 306h connected to the trapezoid recess 306g1 at a foot of the side plate 306b, with L-shaped slots 306i1–306i3 connected to the trapezoid recess 306g1 at sides thereof and with a small slot 306j in the trapezoid recess 306g1.

Next a description is given to the magazine slide plate 307 which is integrally made of a thin stainless steel sheet.

The magazine slide plate 307 comprises a bottom plate 307a having a flat trapezoid configuration, i.e. side edges 307b–307e respectively corresponding to the side plate 306b and the sides 306c–306e of the tray base 306, and a slant edge 307f corresponding to the R-portion 306f of the tray base 306, a contacting lug 307b1 bent upright at the edge 307b thereof, bent portions 307c1, 307c2, 307d1 having hooks protruding outward at the edges 307c, 307d thereof corresponding to the L-shaped slots 306i1–306i3, and a lug 307a1 bent upright in the bottom plate 7a.

The contacting lug 307b1 of the magazine slide plate 307 has a function for releasing a lock of a lock lever 315 provided on the tray base 306 (FIG. 27) as described thereafter.

The bent portions 307c1, 307c2, 307d1 have a function for integrally assembling the tray base 306 and trays 303–305 to the magazine by causing the hooks thereof to engage with L-shaped hang members 303i1–303i3 provided downward from the upper tray 303, and the lug 307a1 has a function for restricting the magazine slide plate 307 within the first position by causing a hook member 309 described hereafter to engage therewith.

The magazine slide plate 307 is slidably assembled in the trapezoid recess 306g1 of the tray base 306 being biased in the direction of the arrow X1 with torsion springs 308A, 308B provided at the sides of the magazine side plate 307b in such a manner that each of the contacting lug 307b1, the bent portions 307c1, 307c2, 307d1 and the lug 307a1 respectively penetrates upward into the slot 306h, the L-shaped slots 306i1–306i3 and the small slot 306j from the bottom 306g of the tray base 306.

The aforementioned hook member 309 is pivoted at an axle 310 on the trapezoid recess 306g1 formed on the bottom 306g of the tray base 306 being biased with a torsion spring 311 in a clockwise direction. The hook member 309 restricts the magazine slide plate 307 to the first position by causing one end thereof to engage with the contacting lug 307a1 penetrating into the small slot 306j. Thus, the contacting lug 307b1, the hook member 309 together with the torsion spring 311 form a displacement restrict device of the magazine slide plate 307.

On the bottom 306g of the tray base 306 from the edge 306e, a guide groove 306k is formed and connected to the trapezoid recess 306g1, to which an engage release member 341a1 formed on a magazine mounting base 341 of a magazine loading mechanism 340 provided in the disc player 330 (FIGS. 34, 36 and 38) enters to push the hook member 309 upon an insertion of the magazine 301 to the disc player 330. Thus, the hook member 309 is rotated in a counterclockwise direction against the torsion spring 311, so that the hook member 309 is disengaged from the lug 307a1, and the magazine slide plate 307 is displaced to the second position by being further pushed by the engage release member 341a1.

Further on the bottom 306g of the tray base 306, a magazine positioning hole 306m is shallowly formed for positioning the magazine 301 on the disc player 330 by causing the hole 306m to be engaged with a tab 348b of the sliding member 348 thereof as described thereafter.

Next, a description is given to the trays 303–305 tightly stacked on the tray base 306.

The each of trays 303–305 is made of a thin plate made of resin material and has approximately the same configuration as the upper surface 306a of the tray base 306, wherein characters 303a–305a denote upper surfaces of the tray 303–305; 303b–303e, 304b–304e, 305b–305e edges of the tray 303–305; 303g–305g bottom surfaces of the tray 303–305, and 303f–305f g-portion of the tray 303–305 each having a slightly larger radius than that of the disc 301, which are named alter the parts of the upper surface 306a of the tray base 306.

In this embodiment, the magazine 301 comprises three trays, i.e. the upper tray 303, the middle tray 304, and the lower tray 305 and the configuration of the upper tray 303 is different in part, from those of the others.

The upper tray 303 has stepped portions 303c1, 303d1 on the bottom surface 303g along the both edges 303c, 303d to allow an upper tray supporter 342c1, 342c2, 342d1 formed on an upper plate 342 (FIGS. 35, 38) of a magazine loading mechanism 340 to engage therewith.

Further, the upper tray 303 is provided with L-shaped hang members 303i1–303i3 at inside positions of the stepped portions 303c1, 303d1 on the bottom surface 303g thereof, each of which one end is bent inside at right angles. The L-shaped hang members 303i1–303i3 extended along a stroke of the middle and lower trays 304, 305 and reach to the bottom of the tray base 306 without projecting beyond the tray base 306 and enter into the L-shaped slot 306i1–306i3 of the tray base 306 when assembled, wherein the upper tray 303 together with the middle and lower trays 304, 305 is positioned at a predetermined position on the tray base 306.

As described hereafter, when the L-shaped hang members 303i1–303i3 enter the L-shaped slot 306i1–306i3 of the tray base 306 and the magazine slide plate 307 is displaced to the first state, the L-shaped hang members 303i1–303i3 are engaged with the bent portions 307c1, 307c2, 307d1 to hold the trays 303–305 on the tray base 306, thus the L-shaped hang members 303i1–303i31 can not be released upward. On the other hand, the magazine slide base 306 is displaced to the second position, the L-shaped hang members 303i1–303i3 are disengaged from the bent portions 307c1, 307c2, 307d1, thus, the L-shaped hang members 303i1–303i3 can be released upward.

Figure 38:
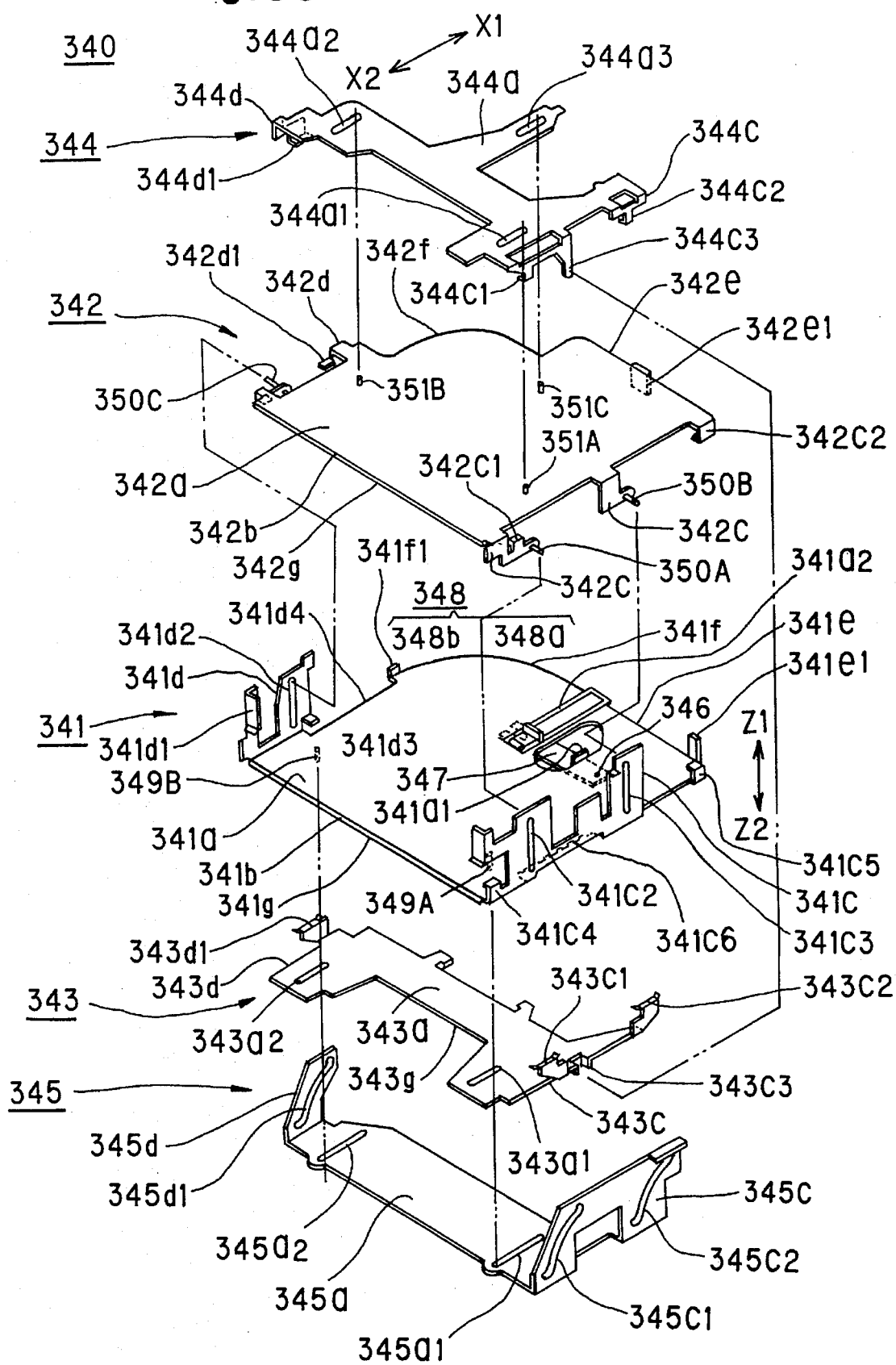
FIG. 38 is an exploded perspective view of a magazine mounting section in the disc player.

Next, a description is given to the middle tray 104. The middle tray 104 is provided with recesses 304c1, 304c2, 304d2 on the edges 304c, 304d respectively for relieving the L-shaped hang members 303i1–303i3, with recesses 304c3, 304c4, 304d2 on the edges 304c, 304d for relieving bent portions 305c3, 305c4, 305d2 provided on the lower tray 305, and with tabs 304c5, 304c6, 304d3 having the same lengths as those of the bent portions 305c3, 305c4, 305d2 protruding outward from the edges 304c, 304d. The tabs 304c5, 304c6, 304d3 are selectively engaged with selection members 343c1, 343c2, 343d1 of a first tray selection plate 343 (FIG. 38) and selection members 344c1, 344c2, 344d1 of a second tray selection plate 344 (FIG. 38).

Next, a description is given to the lower tray 105.

The lower tray 105 is provided with recesses 305c1, 305c2, 305d1 on the edges 305c, 305d for relieving the L-shaped hang members 303i1–303i3 and with the aforementioned bent portions 305c3, 305c4, 305d2 having the same lengths and the same height as those of the tabs 304c5, 304c6, 304d3 protruding outward from the edges 305c, 305d when assembled in a stacked manner. The bent portions 305c3, 305c4, 305d2, are also selectively engaged with selection members 343c1, 343c2, 343d1 of a first tray selection plate 343 (FIG. 38) and selection members 344c1, 344c2, 344d1 of a second tray selection plate 344 (FIG. 38).

There are provided on the trays 303–305 center passing holes 303a1–305a1 having diameters slightly larger than that of the disc 302 and shallow circular recesses 303g1–305g1 having diameters slightly larger than that of the disc 302 on the bottom surface 303g–305g with depths as large as the thickness of the disc 302, approximately at a center of the trays. Thicknesses of the R-portions 303f–305f being flush with the circular recesses 303g1–305g1 are formed thinner than those of the other peripheral portions thereof. Thus, the R-portions 303f–305f form inlets (not shown) for easy insertion or extraction to or from the circular recesses 303g1–305g1 when the trays 303–305 are stacked tightly.

Figure 29A:
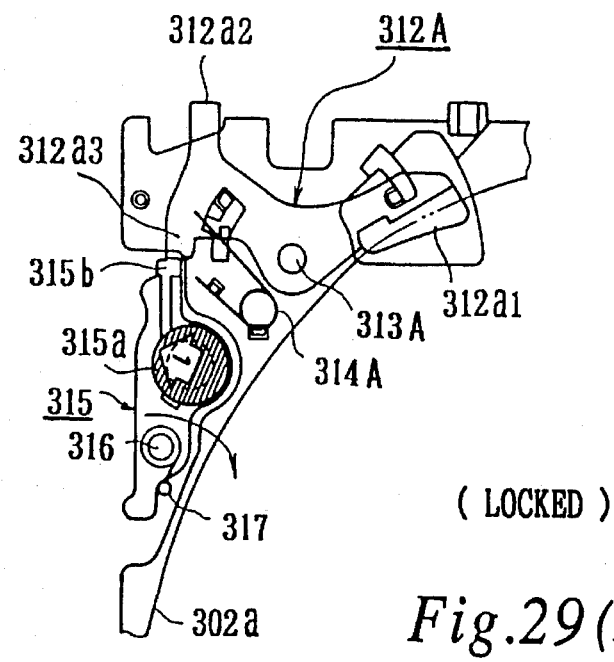
FIGS. 29 (A), (B) are plan view respectively showing a disc clamp lever and a lock lever.
Figure 29B:
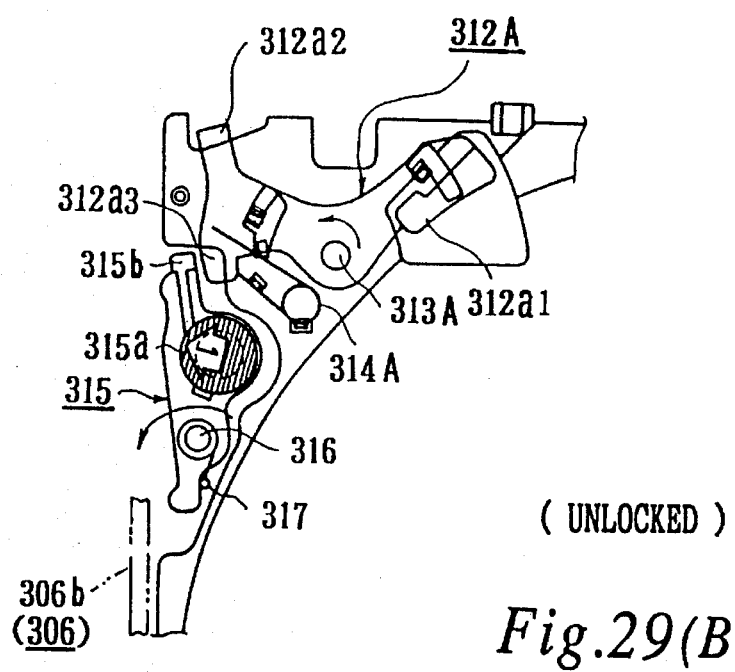

Further, there provided a pair of disc clamp levers 312A, 312B for clamping the periphery 302a of the disc 302 on the bottom surface of each of the trays 303–305. The disc clamp levers 312A, 312B of the lower tray 105 are shown as an example in FIG. 28, and the disc clamp lever 312A thereof is shown in FIGS. 29(A), 29(B) as an enlarged view.

Referring to FIG. 28, the disc clamp levers 312A, 312B are respectively provided nearby corners formed by the edges 305b, 305d and the edges 305c, 305e of the lower tray 105, in such a manner that the former 312A is pivoted on an axle 313A being biased with a torsion spring 314A in a clockwise direction (viewed from the top) and the latter 312B is pivoted on an axle 313B being biased with a torsion spring 314B in a clockwise direction to clamp the disc 2, wherein disc clamp portion 312a1, 312b1 formed at one end of each of the disc clamp levers 312A, 312B respectively clamp the periphery 302a of the disc 302 and contact arms 312a2, 312g2 formed at the other end of each of the disc clamp lever 312A, 312B are respectively positioned in cutouts 305d3, 305e1 so as to be pushed by disc clamp release lever 380A, 380B of the disc player 330 (FIG. 42).

The disc clamp portions 312a1, 312b1 are located at positions where the periphery 302a intersect a line which is parallel with and is offset by a small distance "δ" from a diameter line approximately perpendicular to a direction of disc releasing, and passing a center of the center passing hole 305a1. In other words, the disc clamp portions 312a1, 312b1 confront each other across the center passing hole 305a1, at a periphery of the shallow circular recess 305g1 and are offset slightly toward the E-portion 305f from the diametric line. Thus, when the disc 302 is inserted into the tray 305 from the inlet formed at the E-portion 305f against biasing forces of the disc clamp levers 312A, 312B generated by the torsion springs 314A, 314B, the disc clamp lever 312A, 312B develop a toggle action to the disc 302 into the tray 305 after the disc 302 passes a certain point, so that the disc clamp levers 312A, 312B prevent the disc 302 from being slipped out therefrom, thus, the disc is securely held in the circular recess 305g1. The disc clamp levers 312A, 312B of the other trays 303, 304 are constructed in the same manner.

Referring to FIG. 27, on the tray base 306 nearby the side plate 306b thereof, the lock lever 315 is pivoted on an axle 316 being biased with a torsion spring 317 in a clockwise direction for locking the disc clamp levers 312A pivotally provided on the trays 303–305.

The lock lever 315 has functions for preventing the trays 303–305 from being inserted or released with the discs 302 by locking the disc clamp levers 312A and for allowing insertions or releases of the discs into the trays 303–305 by disengaging with the disc clamp lever 312A.

A manipulation button 315a of the lock lever 315 is positioned in an ellipse hole 303a2 of the upper tray 303 through cutouts 305b1, 304b1 formed on the lower tray 305 and the middle tray 304.

A description is given to operations of the lock lever 315.

FIG. 29 (A) is an enlarged plan view of the lock lever in a locked position.

Referring to FIG. 29(A), in this state, an engage member 315b formed on an end of the lock lever 315 is rotated nearby the engaging portion 312a3 of the disc clamp lever 312A in a clockwise direction by being biased with the torsion spring 317, so that the disc clamp lever 312A is prevented from being rotated by an abutment of the engaging portion 312a3 thereof on the engage member 315b of the lock lever 315 even when a contacting part 312a2 of the disc clamp lever 312A is pushed by user to rotate the disc clamp lever 312A in a counterclockwise direction, wherein the engage member 315b of the lock lever 315 locks the plural disc clamp levers 312A of the trays 303–305 at the same time, which increases the reliability of function of the disc clam lever 312A. Further, it should be noted that the discs 302 are not damaged thereby because the disc clamp levers 312A are indirectly locked by the lock lever 315, i.e. the periphery 302a of the disc 302 is subject only to a force of the torsion spring 314A.

FIG. 29(B) is an enlarged plan view of the lock lever in an unlocked position.

Referring to FIG. 29(B), in order to disengage the lock lever 315 from the disc clamp levers 312A of the trays 303–305, the manipulation button 315a of the lock lever 315 is manually pushed in an arrow direction, so that the lock lever 315 is rotated in a counterclockwise direction against the torsion spring 317 and the engage member 315b thereof is moved apart from the engaging portion 312a3 of the disc clamp levers 312A. Thus, the disc clamp levers 312A can release the discs 302 when the discs 302 are discharged from the magazine 301 with an aid of a discharge lever 318 explained later.

As mentioned in the above, since the manipulation button 315a is exposed flash with the upper surface 303a of the upper tray 303, it facilitates the manipulation thereof.

On the other hand, when the magazine 301 is inserted in the disc player 330 (FIG. 36), the magazine slide plate 307 is displaced to the second position, wherein the contacting lug 307b1 of the magazine slide plate 307 abuts on an engaging portion 315c of the lock lever 315 (FIG. 27) through a rectangular hole 306h formed on the tray base 306, and causing the lock lever 315 to rotate in a counterclockwise direction against the torsion spring 317 as the magazine slide plate 307 is displaced to the direction of X2. Thus, the disc clamp levers 312A can be released from the peripheries of the discs 302.

Referring to FIG. 27 again, a disc discharge lever 318 pivoted on an axle 319 on the bottom surface of the upper tray 303, is retracted from the peripheries of the discs 302 by being biased with a torsion spring 320 in a counterclockwise direction. Further, a sectorial recess 303a3 having a sectorial slot 303a1 therein is formed on the upper surface 303a of the upper tray 303, wherein a sectorial lever 321 connected to the disc discharge lever 318 through the sectorial slot 303a1 is slidably provided in the sectorial recess 303a3 to allow the disc discharge lever 318 to rotate in directions of arrows W1, W2.

As mentioned in the above, the sectorial lever 321 connect to the disc discharge lever 318 is flat and provided on the upper surface 303a of the upper tray 303, which facilitates the manipulation thereof.

Further, as shown in FIG. 28 and FIGS. 30 (A)–(C) as enlarged views, three disc contacting members 318a, 318b, 318c are provided at one end of the disc discharge lever 318 in such a stepped manner that heights of the disc contacting member 318a, 318b, 318c are different from each other corresponding to heights of the trays 303–305 stacked tightly and lengths L1–L3 of the disc contacting members 318a, 318b, 318c are different from each other so as to allow a periphery of each of the discs 302 to be exposed sequentially for facilitating a selection of a desired disc 302 when the discs 302 are discharged from the R-portions of the trays 303–305 by being pushed with the disc discharge lever 318 against the torsion springs 314A, 314B.

It should be noted that the disc contacting members 318a, 318b, 318c thereof are kept retracted from the peripheries of the discs 302 except for the case of discharging the discs 302.

Operation of the Magazine of the Second Embodiment

FIGS. 31 through 35 are perspective views showing operations of the magazine 301 of the second embodiment.

A description is given to operations of the magazine 301 together with a brief description of the operation of the disc player 330 in relation to the magazine 301, a detailed description of the disc player 330 will be given thereafter.

Generally, the magazine 301 takes two states, as described in the foregoing, i.e. the first state and the second state, corresponding to two positions of the magazine slide plate 307, i.e. the first slide position and the second slide position of the magazine slide plate 307.

Figure 31:
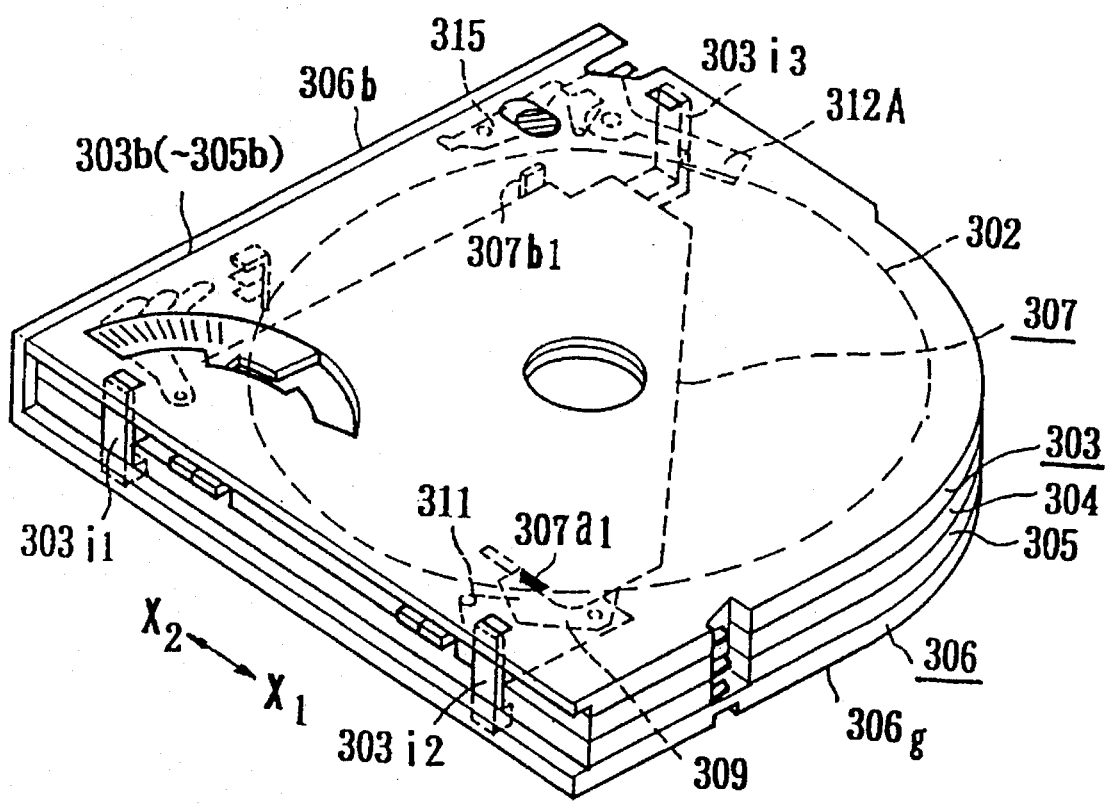
FIGS. 31(A)–31(C) show the first state of the magazine 301, wherein the trays 303–305 holding the discs 302 are integrally stacked together on the tray base 306 with the magazine slide plate 307 situated in the first slide position as previously shown in FIG. 26, and the magazine 301 can be hand-carried.
Figure 31B:
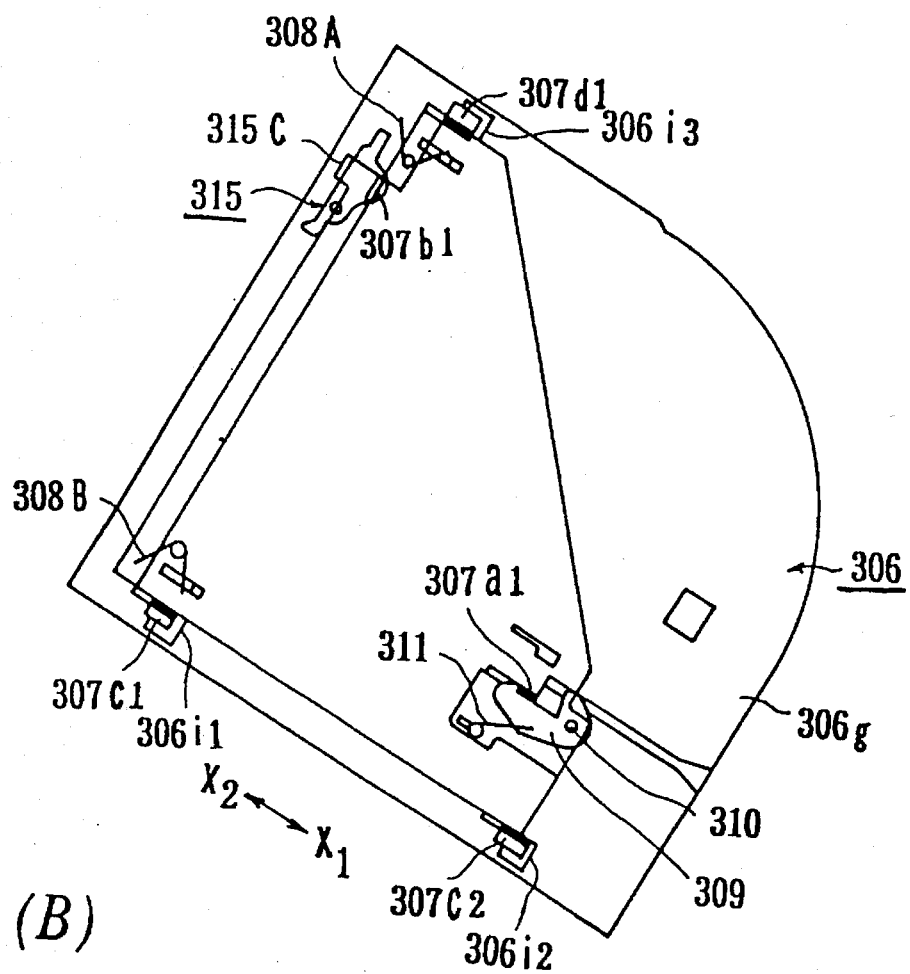
Figure 31C:
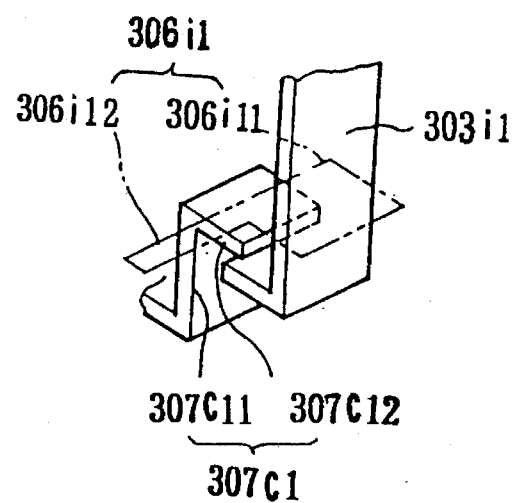

FIGS. 31(A)–31(C) show the first state of the magazine 301, wherein the trays 303–305 holding the discs 302 are integrally stacked together on the tray base 306 with the magazine slide plate 307 situated in the first slide position as previously shown in FIG. 26, and the magazine 301 can be hand-carried.

Upon an assembly of the magazine 301 in the first state, the bent portions 307c1, 307c2 and 307d1 of the magazine slide plate 307 are respectively inserted into the L-shaped slots 306i1–306i3 from the bottom 6g of the tray base 306, and the magazine slide plate 307 is displaced in the second slide position by causing the magazine slide plate 301 to slide in the direction of the arrow X2 against the torsion springs 308A, 308B. After that, the tray 303–305 are tightly stacked on the tray base 306 in such a manner that the edges 303b–305b of the trays 303–305 are aligned in a line and the L-shaped hang members 303i1–303i3 of the upper tray 303 are inserted into the L-shaped slots 306i1–306i3. In this state, when the magazine slide plate 307 is displaced in the direction of the arrow X1 and positioned in the first slide position by the resilient forces of the torsion springs 308A, 308B, the hook member 309 is rotated in a clockwise direction by the resilient force of the torsion spring 311 to engage with the lug 307a1 of the magazine slide plate 307, thus, the magazine slide plate 307 is positioned in the first slide position.

Further, referring to FIG. 31 (C) as an enlarged view, when the magazine slide plate 307 is displaced in the direction of the arrow X1 and positioned in the first slide position, bent plates 307c12, (307c22, 307d12) of the bent portions 307c1, (307c2, 307d1) are displaced to engage with the L-shaped hang members 303i1(–303i3) of the upper tray 303 which are entered in a large rectangular holes 306i1 of the b-shaped slots 306i1(–306i3) of the tray base 306, so that the L-shaped hang members 303i1(–303i3) can not be separated upward.

FIG. 32 is a perspective view showing a state where a disc 302 is inserted in one of trays 303–305 from one of the R-portions 303f–305f thereof in the first state of the magazine 301, wherein the magazine slide plate 307 is positioned in the first slide position.

Referring to FIG. 32, at first, the manipulation button 315a of the lock lever, 315 is manually shifted in a direction of an arrow to disengage the lock lever 315 from the disc clamp lever 312A. Then, the disc 302 is inserted into one of the trays 303–305 from one of the R-portions 303f–305f against resilient forces of the torsion springs 314A, 314B biasing the tray clamp levers 314A, 314B to a position where the disc 302 is pulled into and securely held by the tray clamp levers 312A, 312B of which positions of the disc clamp portions 312a1, 312b1 are displaced to a disc inlet side (R-portion side) by amount of δ as mentioned in the foregoing.

FIG. 33 is a perspective view showing a state where a disc is being discharged from one of the R-portions 303f–305f of one of the trays 303–305 in the first state of the magazine 301, wherein the magazine slide plate 307 is positioned in the first slide position and the lock lever 315 is disengaged from the disc clamp lever 312A.

Referring to FIG. 33, when the sectorial lever 321 connected to the disc discharge lever 318 is manually shifted in a direction of an arrow W2, the disc contacting members 318a, 318b, 318c of the disc discharge lever 318 are also rotated in the direction of the arrow W2 centerring to the axle 319, thus all the discs 302 are discharged out of trays 305–303 by being pushed with the disc contacting members 318a, 318b, 318c of the disc discharge lever 318, wherein the discs 302 are discharged one after another because the disc contacting members 318a, 318b, 318c of the disc discharged lever 318 have different arm height and length each other as mentioned in the foregoing. It should be noted that when the disc clamp lever 312A is locked with the lock lever 315, the insertion and discharge of the disc 302 are prohibited and the discs 302 are securely held in the trays 303–305 without slipping off.

FIGS. 34(A)–34(C) show the second state of the magazine 301, wherein the magazine slide plate 307 is displaced to the second slide position upon an insertion of the magazine 301 into the disc player 330 (FIG. 36), and the trays 303–305 holding the discs 302 are separable.

Referring to the FIGS. 34(A)–36(C), upon an insertion of the magazine 301 into the disc player 330, the tab 348b provided on the sliding member 348 of the disc player 330 enters the magazine positioning hole 306m formed on the tray base 306, then, the magazine 303 is transferred and secured to a predetermined position in the disc player 330 together with the tab 348b of the slide member 348.

Further, with the insertion of the magazine 301 into the disc player 330, the engage release member 341a1 provided on the magazine mounting base 341 (FIG. 36) enters the guide groove 306k in a direction of an arrow X2, as mentioned in the foregoing, so that the engage release member 341a1 releases the engagement of the hook member 309 with a tab 307a1 of the magazine slide plate 307 by abutting on the hook member 309 and displaces the magazine slide plate 307 to the second slide position from the first slide position by pushing the magazine slide plate 307.

Further, referring to FIG. 31 (C) as an enlarged view, when the magazine slide plate 307 is displaced in the direction of the arrow X2 and positioned in the second slide position, the bent plates 307c12 (307c22, 307d12) of the bent portions 307c1, (307c2, 307d1) are displaced to disengage with the L-shaped hang members 303i1(–303i3) which are entered in the large rectangular holes 306i11 (–306i31), so that the L-shaped hang members 303i1(–303i3) because movable upward thus the trays 305–303 become separable from the tray base 306.

Figure 35A:
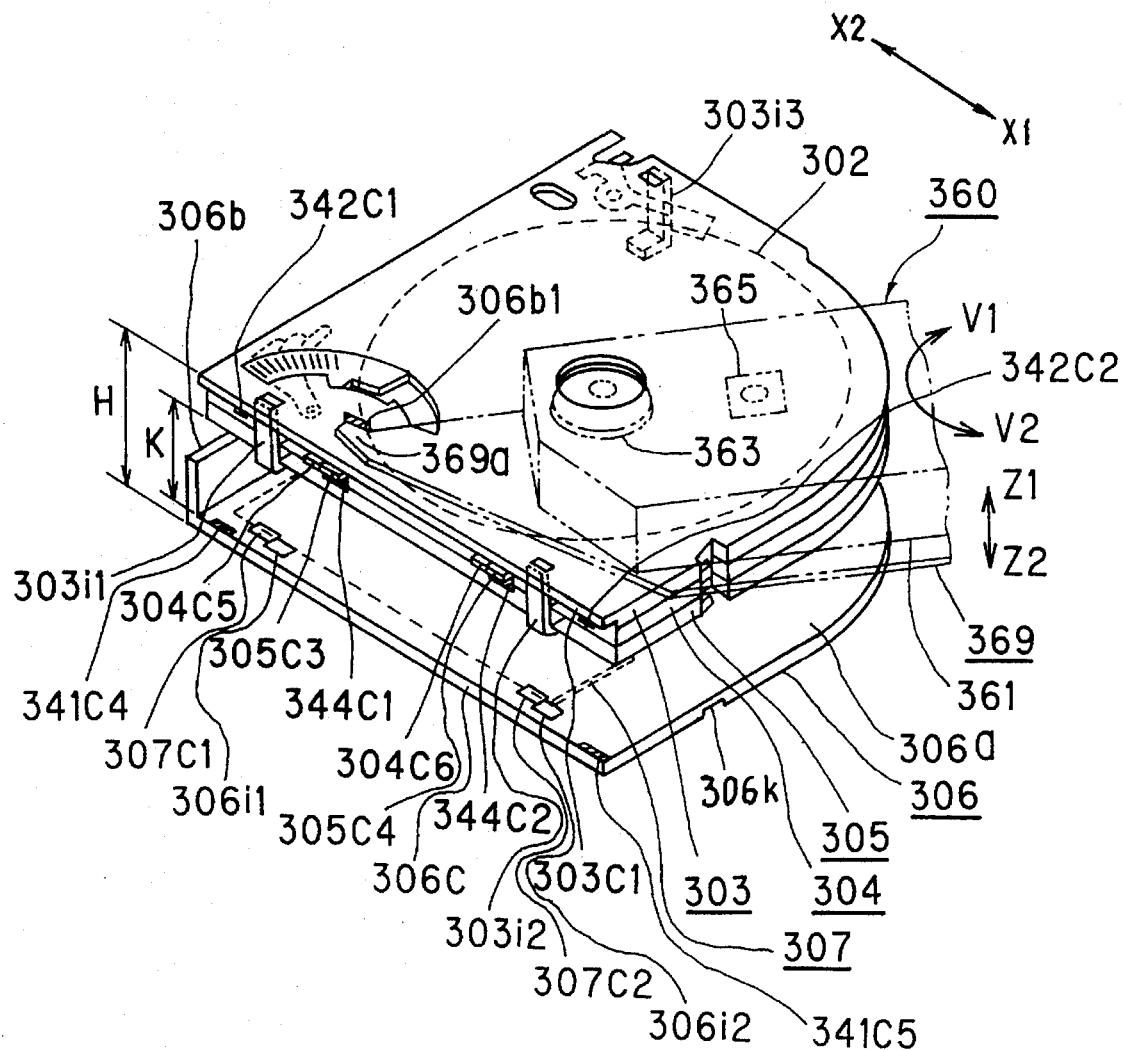
Figure 35B:
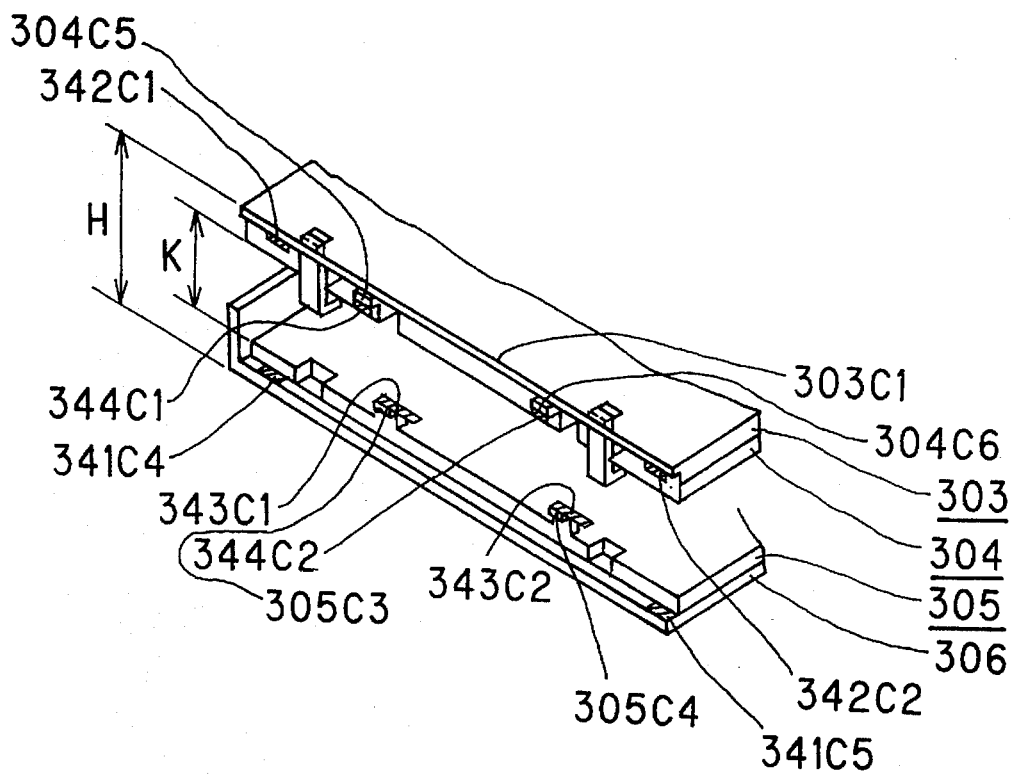
Figure 35C:
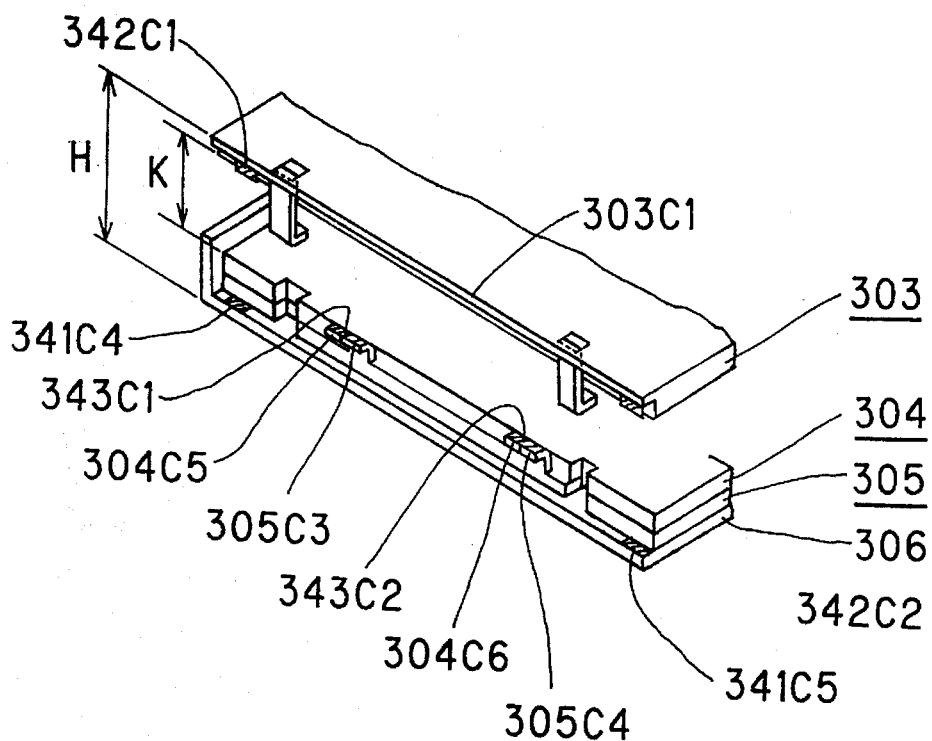
FIG. 35(C) shows a separation of the upper tray 303 from the middle tray 304, as a selected tray holding the disc 302 desired to be played.

FIGS. 35(A)–35(B) are perspective views respectively showing the second state of the magazine 301 corresponding to the second slide position of the magazine slide plate 307 when the magazine 301 is mounted on the disc player 330, wherein FIG. 35(A) shows a separation of the lower tray 305 from the tray base 306, FIG. 35(B) shows a separation of the middle tray 304 from the lower tray 305, and FIG. 35(C) shows a separation of the upper tray 303 from the middle tray 304, as a selected tray holding the disc 302 desired to be played.

In the FIG. 35(A) through 35(C), black shaded portion indicates a place where a part of another component including one belonged to the disc player 330, contacts with.

As shown in FIGS. 35(A)–35(B), a description is given to the states of the magazine 301 regarding the side of the edges 303c–305c thereof and the states of the tray base 306 regarding the side of the edge 306c.

As a common operation of the tray selection and separation of the magazine 301, upon insertion of the magazine 301 in the direction of the arrow X1, the tray base 306 is depressed on the magazine mounting base 341 in such a manner that tray base support members 341c4, 341c5 (FIG. 38) of the magazine mounting base 341 are positioned at outsides of the L-shaped slots 306i1, 306i2 on the upper surface 306a of the tray base 306, and the upper tray 303 is supported on the upper plate 342 of the magazine loading mechanism 340 in such a manner that upper tray support members 342c1, 342c2 (FIG. 38) contact with the stepped portion 303c1 of the upper tray 303. Further, the upper tray 303 is lifted upward by the upper plate 342 of the magazine loading mechanism 340 which is displaced upward by a lift plate 345 (FIG. 38), wherein the upper tray 303 is always lifted at a predetermined height H from the tray base 306 irrespective of selection of the trays 303–305.

Next, a description is given to respective operations of selecting the trays 303–305.

FIG. 35(A) shows an operation of the lower tray 305 to be selected.

Referring to FIG. 35(A), upon selecting the lower tray 305, the bent portions 305c3, 305c4 of the lower tray 305 on which the middle awed upper trays 304, 303 are stacked are supported by selection members 344c1, 344c2 of the second tray selection plate 344 (FIG. 38) provided on the magazine loading mechanism 340.

On the other hand, the tray base 306 is held on the magazine mounting base 341, thus, a predetermined space K is formed between the lower tray 305 and the tray base 306 to allow the disc play mechanism 360 to play the disc 302 held by the lower tray 305.

In this state, an arm 369 for supporting a disc play mechanism 360 having a turntable 363 and an optical pickup 363, is securely positioned at a predetermined position by causing an engaging part 369a to be engaged with the engage section 306b1 provided nearby the side plate 306b on the tray base 306. Thus, it needs not to provide another space to play the disc 302, which enables downsizing of the disc player 330.

FIG. 35(B) shows an operation of the middle tray 304 to be selected.

Referring to FIG. 35(B), upon selecting the middle tray 304, the tabs 304c5, 304c6 of the middle tray 304 on which the upper tray 303 is stacked, are supported upward by the selection members 344c1, 344c2 of the second tray selection plate 344 (FIG. 38) provided on the magazine loading mechanism 340.

On the other hand, the lower tray 305 is held on the tray base 306 by causing the bent portions 305c3, 305c4 of the lower tray 305 to be engaged with selection members 343c1, 343c2 of a first tray selection plate 343 (FIG. 38), thus, a predetermined space K is formed between the lower tray 305 and the middle tray 304 to allow the disc play mechanism 360 to play the disc 302 held by the middle tray 304.

FIG. 35(C) shows an operation of the upper tray 303 to be selected.

Referring to FIG. 35(C), the upper tray 303 is supported with the upper plate 342 of the magazine loading mechanism 340, on the other hand, the middle tray 304 and the lower tray 305 are held on the tray base 306 by causing the tabs 304c5, 314c6 of the middle tray 304 and the bent portions 305c3, 315c4 of the lower tray 305 to be engaged with selection members 343c1, 343c2 of a first tray selection plate 343 (FIG. 38), thus, a predetermined space K is formed between the upper tray 803 and the middle tray 304 to allow the disc play mechanism 860 to play the disc 302 held by the upper tray 303.

It should be noted that the predetermined space K is vertically displayed or relocated from the tray base 306 corresponding to the selected tray as shown in FIGS. 35($a$)–35($c$), however, the disc player 360 is also displaced vertically so as to play the disc 302 of the tray selected correspondingly with the displacement of the predetermined space K.

Figure 36:
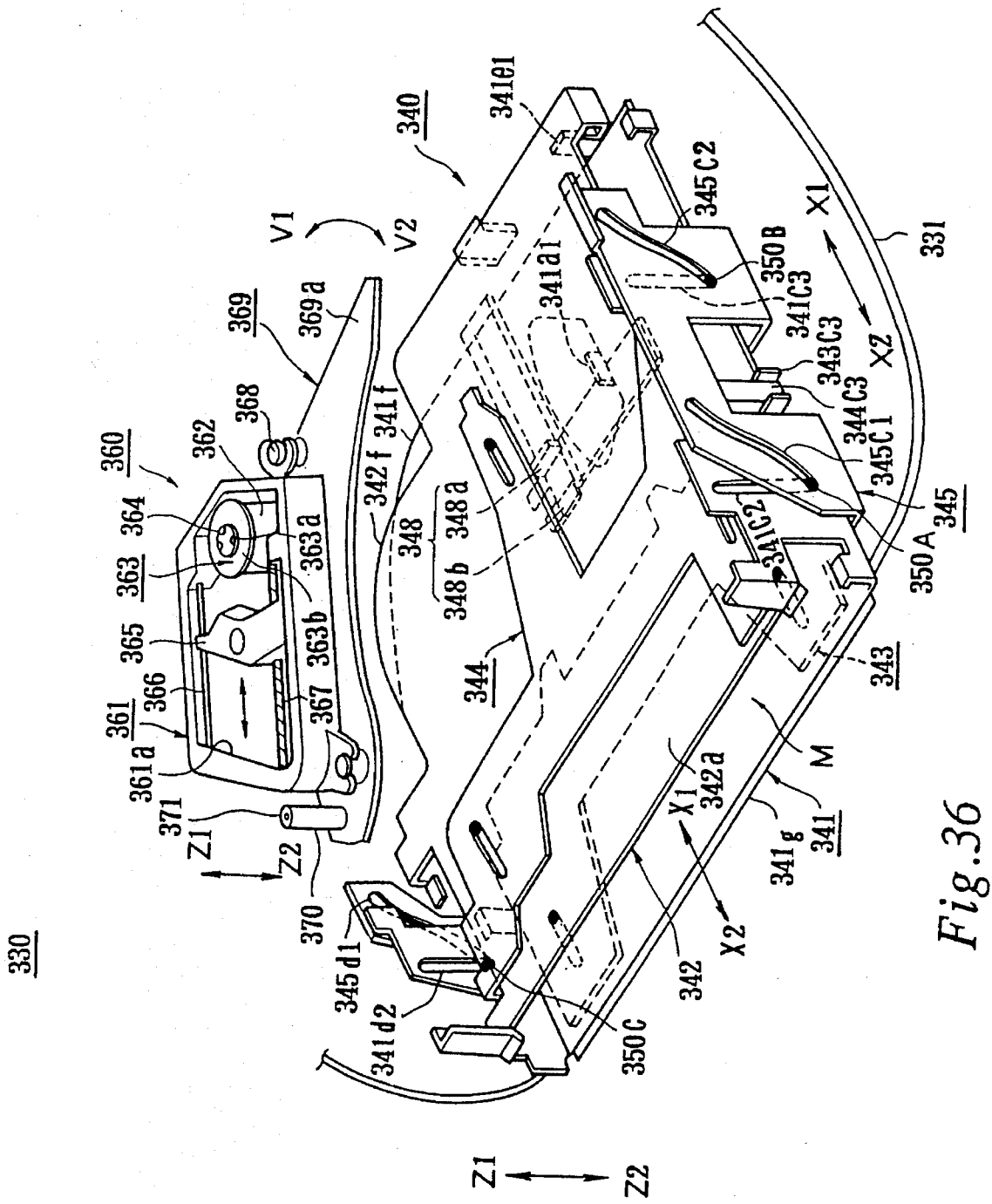
FIG. 36 is a perspective view showing an overall construction of the second embodiment of the disc player 330 in an initial state.

A Construction and Operations of a Second Automatic Disc Player Employing the Second Embodiment of the Magazine A description is given to a construction of a second automatic disc player 330 (referred to as disc player 330) employing the second embodiment of the magazine 301 referring to FIGS. 36 through 38.

FIG. 36 is a perspective view showing an overall construction of the second embodiment of the disc player 330 in an initial state.

FIG. 37 is a perspective view, with parts partially disassembled, showing a state where trays 303–305 are separated from the tray base 306 of the magazine 301 in the disc player 330 shown within FIG. 36.

FIG. 38 is an exploded perspective view of a magazine mounting section in the disc player.

Generally, in the disc player 330 as shown in FIG. 36, the magazine 301 of the second embodiment is mounted onto the magazine loading mechanism 340 provided on a chassis 33 of the disc player 330. Upon inserting the magazine 301, the magazine 301 becomes the second state as shown in FIG. 34 where the trays 303–305 are separable, and is positioned in the magazine loading mechanism 340. In this state, a desired tray (disc) is selected among the stacked trays 303–305 and separated from other parts so as to form a space K beneath the selected tray to allow the access of the disc play mechanism 360. The desired disc is clutched on the turntable 363 and played by the optical pickup 365 of the disc play mechanism 360.

Further, in the disc player 330 employing a thin type magazine 301 containing CDs held by respective trays, an external size of the disc player 330 satisfies the industry standard DIN specification size of 180×150×50 mm (width ×depth×height), thus the disc player 330 is very compact and is suitable, for instance, for a car use.

Referring to FIG. 36, the magazine loading mechanism 340 comprises the magazine mounting base 341 fixed on the chassis 301 forming a space therebetween and the upper plate 342 provided to move up and down on the magazine mounting base 341 in such a manner that the magazine mounting base 341 and the upper plate 342 form a box-like frame structure facing each other and forming a space therebetween, and form an inlet M for allowing the insertion of the magazine 301 at a front of the magazine loading mechanism 340 when the upper plate 342 descends to a height of the magazine mounting base 341.

Further, at a bottom 341g of the magazine mounting base 341, the first tray selection plate 343 for selecting a desired tray from the trays 303–305 constructing the magazine 301 is provided, which slides in directions of arrows X1, X2, corresponding to loading and unloading of the magazine 301, by being driven by a driving source (not shown) provided in the disc player 330.

On the other hand, on the upper surface 342a of the upper plate 342, the second tray selection plate 344 for selecting a desired tray is provided in such a manner that the second tray selection plate 344 is able to be displaced or slidden in the directions of the arrows X1, X2 by being connected to the first tray selection plate 343 before the trays 303–305 are separated, and is able to be moved up and down together with the upper plate 342 and is held at a predetermined height after the trays 303–305 are separated.

Further, at a bottom 343g of the first tray selection plate 343, the lift plate 345 for lifting the upper plate 342 in directions of arrows Z1, Z2 is provided slidably in the directions of the arrows X1, X2, wherein the upper plate 342 is displaced upward when the lift plate 345, connected to and driven by a driving source (not shown), is slidden in the direction of the arrow X1.

Referring to FIG. 38 together with FIG. 27, a detailed description is given to the magazine loading mechanism 340.

Generally, the magazine mounting base 341, the upper plate 342, the first tray selection plate 343, the second tray selection plate 844 and the lift plate 845 mentioned in the foregoing are formed of metal sheets respectively.

Further, configurations of the magazine mounting base 341, and the upper plate 342 are shaped corresponding to the shape of the magazine 301, so that numerals of the parts thereof are given after that of the magazine 301, i.e. an upper surface 341a, sides 341b, 341e, side plates 341c, 341d, R-portions 341f and the bottom surface 341g in the magazine mounting base 341, and an upper surface 342a, sides 342b, 342e, side plates 342c, 342d, R-portions 342f and the bottom surface 342g in the upper plate 342.

The the magazine mounting base 341 is provided with side plates 341c, 341d erected upright on the upper surface 342a thereof but with no parts at the side 341b so as to allow the insertion of the magazine 301.

The side plates 341c, 341d respectively comprises guide bent portions 341c1, 341d1 for guiding the separated trays 303–305 together with the upper plate 342 upward and positioning them in an elevated position, upright guide slots 341c2, 341c3, 341d2 for guiding the upper plate 342 vertically, tray base support members 341c4, 341c5, 341d3 protrudingly provided inward for preventing the tray base 306 from displacing upward by causing them to abut on and depress the upper surface 306a of the tray base 306 at the sides 306c, 306d thereof onto the magazine mounting base 41 upon the insertion of the magazine 301.

Further, the magazine mounting base 341 comprises the engage release member 341a1 on the upper surface 341a thereof for releasing the engagement of the hook member 309 with a tab 307a1 of the magazine slide plate 307 by abutting on the hook member 309 and displaces the magazine slide plate 307 to the second slide position (FIG. 34) in the direction of the arrow X2 from the first slide position by pushing the magazine slide plate 307, as mentioned in the foregoing.

The magazine mounting base 341 further comprises a sliding slot 341a2, a lever 347 having a sliding member 348 at one end thereof pivoted at the axle 346 on the bottom surface 341g by causing the sliding member 348 to engage with the sliding slot 341a2, wherein the sliding member 348 further comprises a front restricting member 348a protrudingly provided upward through the sliding slot 341a2 for restricting the front position of the tray base 306 and a protruding member 348b movably provided upward and downward on a leaf spring (not shown) for allowing an engagement with the magazine positioning hole 306m through the sliding slot 341a2.

When the magazine 301 is manually inserted into the magazine loading mechanism 40 by the user, the front of the magazine 301 abuts on the front restricting member 348a and the protruding member 348b is engaged with the magazine positioning hole 306m by the resilient force of the leaf spring (not shown), so that the sliding member 348 together with the magazine 301 is displaced in the direction of the arrow X1, thus the lever 347 is rotated in a clockwise direction. After that, by means of the sliding member 348 with which the magazine 301 is engaged with the magazine 301 is automatically transferred deeper in the X1 direction by a driving source (not shown) connected to the lever 347, wherein the magazine 301 is positioned in a predetermined position by abutting on a stopper 341e1 erected upright at the side 341e of the magazine mounting base 341.

Further, an erroneous insertion preventing member 341f1 is erected upright at the side of the magazine mounting base 341 nearby the R-portion 341f, which can effectively prevent the magazine 301 from being erroneously inserted in the magazine loading mechanism 340.

Next, a description is given to the upper plate 342.

The upper plate 342 further comprises side plates 342c, 342d hanging downward and pins 350A–350C protrudingly provided outward on the side plates 342c, 342d. The upper plate 342 is slidably provided on the magazine mounting base 341 by causing the pins 350A–350C to engage with the upright guide slot 341c2, 341c3, 341d2 of the side plates 341c, 341d.

The upper plate 342 further comprises upper tray supporters 342c1, 342c2, 342d1 bent inward at the side plates 342c, 342d for supporting the upper tray 303 by causing the upper tray supporters 342c1, 342c2, 342d1 to engage with the stepped portions 303c1, 303d1 of the upper tray 303 upon the insertion of the magazine 301, and a stopper 342e1 hanging downward at the side 342e thereof for positioning the front of the trays 303–305 which are separated.

Next a description is given to the first tray selection plate 343, which is slaidably provided on the bottom surface 341g of the magazine mounting base 341 and is displaced in the directions of the arrows X1, X2 by a driving source (not shown), as described hereafter.

The first tray selection plate 343 comprises guide slots 343a1, 343a2 on an upper surface 343a thereof for engaging with pins 349A, 349B provided on the bottom surface 341g of the magazine mounting base 341, and selection members 343c1, 343c2, 343d1 erected upright at sides 343c, 343d by bending thereof inward.

The first tray selection plate 343 is slidably provided on the bottom surface 341g of the magazine mounting base 341 by causing the guide slots 343a1, 343a2 thereof to engage with the pins 349A, 349B of the magazine mounting base 341 and causing the selection members 343c1, 343c2, 343d1 thereof to be entered in recesses 341c6, 341d4 of the magazine mounting base 341. Thus, the selection members 343c1, 343c2, 343d1 of the first tray selection plate 343 can optionally engage with the tabs 304c5, 304c6, 304d3 of the middle tray 304 and the bent portions 305c3, 305c4, (305d2) of the lower tray 305 by being displaced in the directions of the arrows X1, X2, wherein the selection member 343c1, for instance, is constructed or has a width large enough to allow the engagement with both the tab 304c5 of the middle tray 304 and the bent portion 305c3 of the lower tray 305 at the same time.

Further, the first tray selection member 343 further comprises a pair of connection members 343c3 bent downward facing each other and forming a space to allow a hanging member 344c3 of the second tray selection plate 344 which will be described hereafter to enter therebetween for an engagement.

Thus, the first tray selection member 343 has a function for supporting the trays which are located below the selected tray in the stacked manner, on the magazine mounting base 341 by causing itself to be displaced so as to selectively engage with, for instance, the tabs 304c5, 304c6, 304d3 of the middle tray 304 and/or the bent portions 305c3, 305c4, (305d2) of the lower tray 305.

In this embodiment, if the upper tray 303 is selected as the desired tray, the selection members 343c1, 343c2, 343d1 of the first tray selection plate 343 are displaced to the tabs 304c5, 304c6 of the middle tray 304 and the bent portions 305c3, 305c4 of the lower tray 305 so as to engage therewith.

Next, a description is given to the second tray selection plate 344, which is slaidably provided on the upper plate 342 of the magazine mounting base 341 and is displaced in the directions of the arrows X1, X2 by a driving source (not shown), as described hereafter.

The second tray selection plate 344 comprises guide slots 344a1, 344a2 on an upper surface 344a thereof for engaging with pins 351A, 351B provided on the upper surface 344a of the upper plate 342, and selection members 344c1, 344c2, 344d1 hanging downward at sides 344c, 344d thereof of which ends are bent inward. The selection members 344c1, 344c2, 344d1 thereof enter in relief recesses provided on the upper plate 342.

Thus, the selection members 344c1, 344c2, 344d1 of the second tray selection plate 344 can selectively engage with the tabs 304c5, 304c6, 304d3 of the middle tray 304 or the bent portions 305c3, 305c4, (305d2) of the lower tray 305 by being displaced in the directions of the arrows X1, X2, wherein the selection member 344c1, for instance, is constructed or has a width large enough to allow the engagement with the tab 304c5 of the middle tray 304 or the bent portion 305c3 of the lower tray 305.

Further, the hanging member 344c3 hangs downward at the side 344c of the second tray selection plate 344, and is able to enter in and out the space formed between the pair of connection members 343c3 of the first tray selection plate 343.

Before the magazine 301 is separated of its tray, the hanging member 344c3 enters the space of the pair of connection members 343c3, thus, the second tray selection plate 344 is displaced together with the first tray selection plate 343 in the direction of the arrow X1 by the displacement of the first tray selection plate 343 in the direction of the arrow X1. On the other hand, upon the magazine 301 is separated, the hanging member 344c3 is withdrawn from the space of the pair of connection members 343c3 upward, this allows the second tray selection plate 344 to displace together with the upper plate 342 in the direction of the arrow X1 when the upper plate 342 displaces in the direction of the arrow X1.

Thus, the second tray selection member 344 has a function for holding the selected tray together with the trays which are located on the selected tray in the stacked manner, on the upper plate 342 by causing itself to be displaced so as to selectively engage with the tabs 304c5, 304c6, 304d3 of the middle tray 304 or the tabs 305c3, 305c4, (305d2) of the lower tray 305.

Next a description is given to the lift plate 345, which is slaidably provided on the bottom surface 341g of the magazine mounting base 341 sandwiching the first tray selection plate 343 and is displaced in the directions of the arrows X1, X2 by a driving source (not shown) of the disc player 330, as described hereafter.

The lift plate 345 comprises guide slots 345a1, 345a2 on an upper surface 345a thereof for engaging with the aforementioned pins 349A, 349B provided on the bottom surface 341g of the magazine mounting base 341, which pins 349A, 349B are also engaged with the guide slots 343a1, 343a2 of the first tray selection plate 343, and side plates 345c, 345d erected upright at sides edges of the upper surface 345a thereof.

Further, the side plates 345c, 345d are provided with slant guide slots 345c1, 345c2, 345d1.

The side side plates 345c, 345d respectively face outsides of the side plates 341c, 341d of the magazine mounting base 341, and the pins 350A–350C of the upper plate 342 engage with the slant guide slots 345c1, 345c2, 345d1 of the lift plate 345 through the slots 341c2, 341c3, 341d2 of the magazine mounting base 341.

When the pins 350A–350C of the upper plate 342 are displaced to the lowest positions of the slant guide slots 345c1, 345c2, 345d1 of the lift plate 345, the upper plate 342 is positioned at its lowest position so as to allow the insertion of the magazine 301 into the magazine loading mechanism 340, and when the pins 350A–350C of the upper plate 342 are displaced to the highest positions of the slant guide slots 345c1, 345c2, 345d1 of the lift plate 345, the upper plate 342 is positioned at its highest position.

Thus, it will be understood from the above description that the magazine loading mechanism 340 for selecting and separating the desired tray from the stacked trays 303–305 has a simple structure, thus, enables a decrease of assembly parts and processes, and an increase of reliability of the operation of the selection and the separation of the desired tray.

Next, a description is given to the disc play mechanism 360 of the disc player 330.

Referring to FIG. 36 again, the disc play mechanism 360 is retracted out of the respective R-portions 341f, 342f of the magazine mounting base 341 and the upper plate 342 of the magazine loading mechanism 340 in the initial state.

The disc play mechanism 360 comprises a swing lever 369 having a bushing 370 at one end thereof, rotatably and slidably provided in directions of arrows V1, V2 and in directions of arrows Z1, Z2 around and along an axle 371 on the chassis 331 by causing the bushing 370 to rotatably and slidably engage with the axle 371, a box 361 made of die-casting material or resin provided on the swing lever 369 through a vibration isolator 368, a turntable 363 rotatably provided at a shaft of a motor 362 in the box 361, and an optical pickup 365 slidably provided in the radial direction of the disc 302 by being guided by a guide rail 366 at one end thereof and being connected to a motor (not shown) through a screw shaft 367 at the other end thereof for playing the disc 302 on the turntable 365, wherein the swing lever 369 is connected to a driving source (not shown).

The turntable 363 further comprises a spindle section 363a erected upward for engaging with the center hole 302b of the discs 302 (FIG. 27) and a disc mounting section 363b having nails 364 provided therearound for clutching the periphery of the center hole 302b (FIG. 27) of the disc 302.

The swing arm 369 is provided with an engage portion 369a at the other end thereof for securely positioning the turntable 363 to the center hole 302b of the selected disc 302 held by a tray by causing the engage portion 369a to abut on an engaging portion 306b1 of the side plate 306b on the tray base 306 after the trays 303–305 of the magazine 301 are separated so as to allow the access of the disc play mechanism 360 as described hereafter.

Tray Separating Operation and Disc Playing Operation of the Disc Player 330

FIGS. 39(A)–39(D) are explanatory views for the tray separating operation of the disc player 330 of the second embodiment.

FIGS. 40–48 are explanatory views for the disc player operation of the disc player 330 of the second embodiment.

Figure 39A:
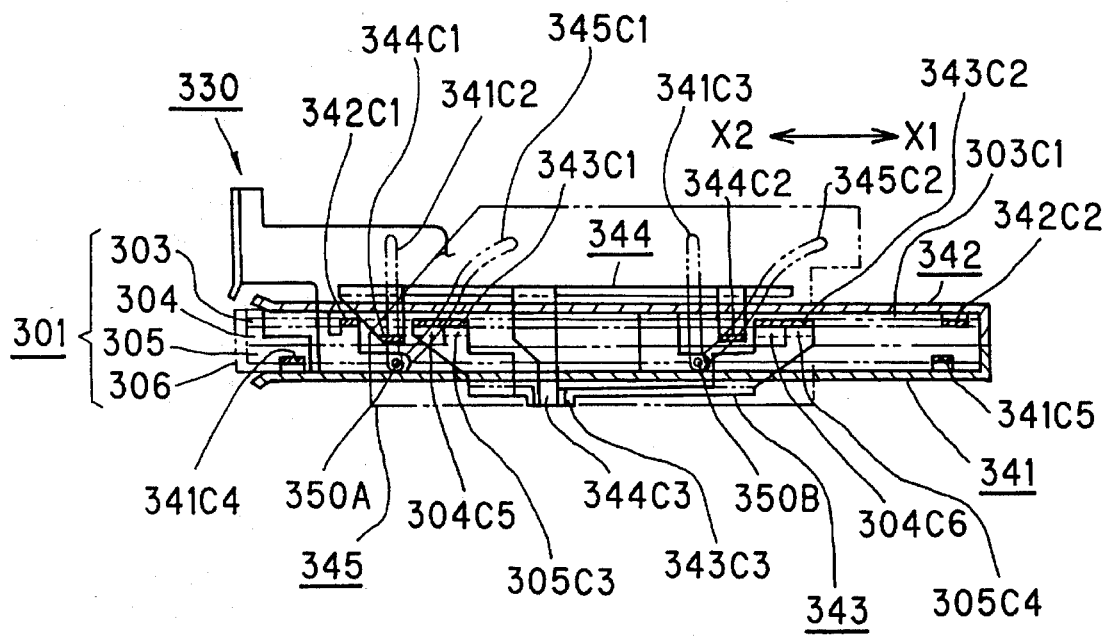
FIGS. 39(A)–39(D) are explanatory views for the tray separating operation of the disc player 330 of the second embodiment.
Figure 39B:
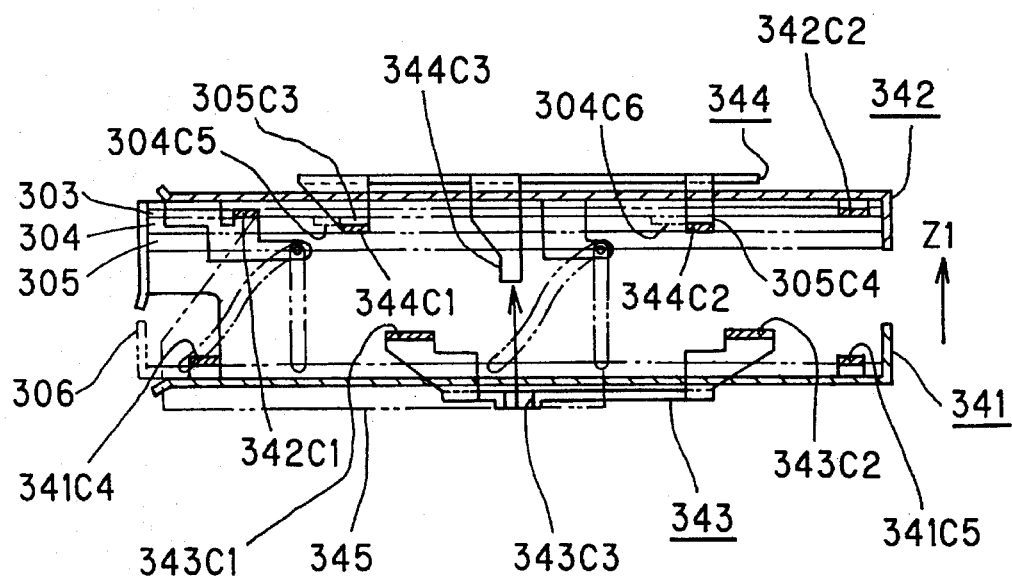
Figure 39C:
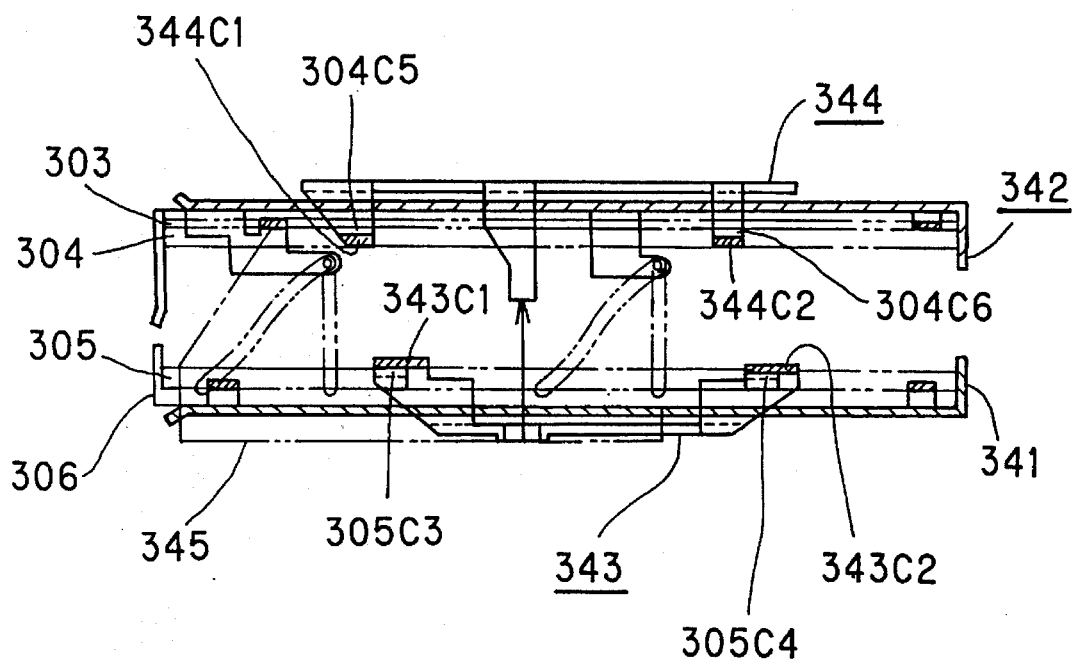
Figure 39D:
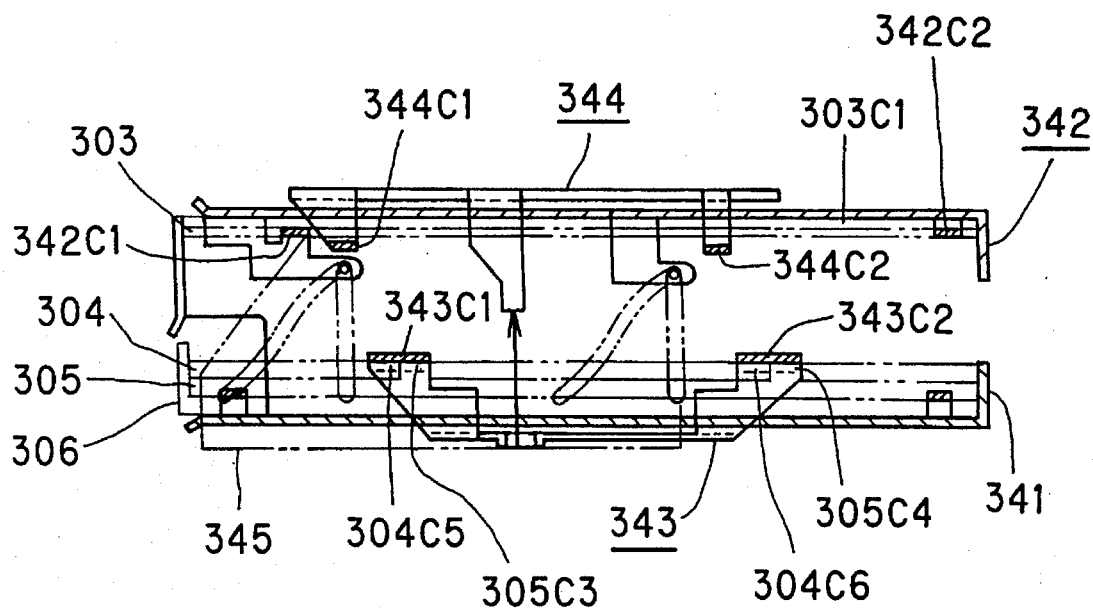
Figure 40:
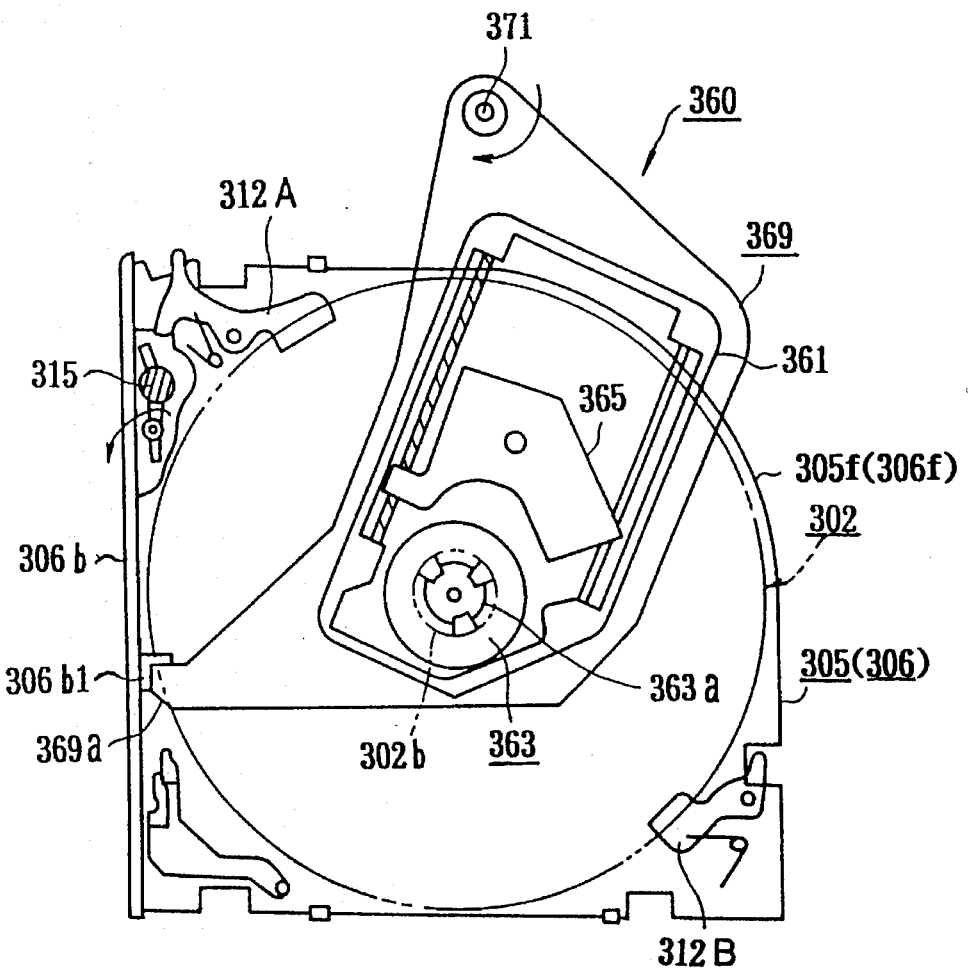
FIGS. 40(A)–40(B), 41(A)–41(B), 42(A)–42(B) and 43(A)–43(B) are explanatory views for the disc player operation of the disc player 330 of the second embodiment.
Figure 40:
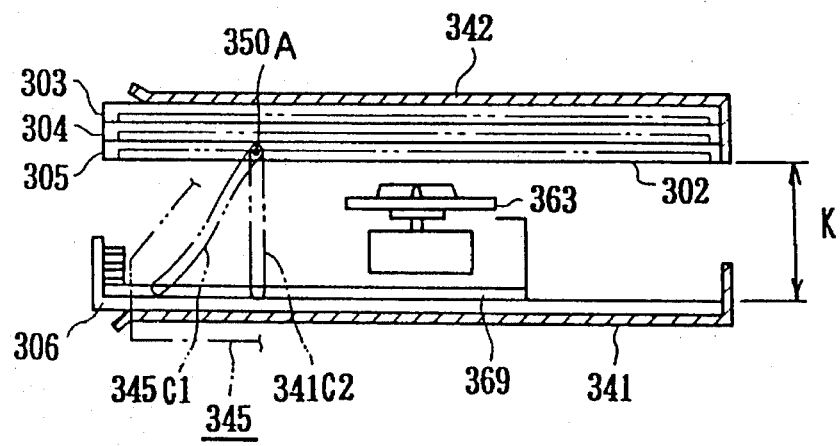

Referring to FIGS. 39(A)–39(B), a description is given to the tray separating operation of the disc player 330 regarding the side 303c–305c of the trays 303–305 and the side 306c of the magazine mounting base 306, wherein the magazine 301 is assumed to be mounted on the magazine loading mechanism 340 and the magazine slide plate 307 of the magazine 301 is assumed to be in the second slide position as shown in FIG. 34, and it should be noted that FIGS. 39(B)–39(D) are respectively corresponding to FIGS. 35(A)–35(C).

In FIG. 39 (A), the magazine 301 is mounted on the magazine loading mechanism 340 in a state where the trays 303–305 are separable, i.e. a state before the desired tray is selected from the trays 303–305.

In this state, the pins 350A, 350B provided on the upper plate 342 of the magazine loading mechanism 340 are positioned at the lowest positions of the upright guide slots 341c2, 341c3 of the magazine mounting base 341 and of the slant guide slots 345c1, 345c2 of the lift plate 345, so that the upper plate 342 is at its lower position to allow the insertion of the magazine 301.

Further, upon inserting the magazine 301, the tray base 306 of the magazine 301 is engaged with the tray base support member 341c4, 341c5 of the magazine mounting base 341, thus, the tray base 306 is held on the magazine mounting base 341 thereby, on the other hand, the stepped portions 303c1, 303d1 of the upper tray 303 are engaged with the upper tray supporters 342c1, 342c2, 342d1, thus, the upper tray 303 is held on the upper plate 342 of the magazine loading mechanism 340 thereby.

Further, upon inserting the magazine 301, the the tabs 304c5, 304c6, 304d3 of the middle tray 304, and the bent portions 305c3, 305c4 (305d2) of the lower tray 305 are engaged with the tray selection members 343c1, 343c2, 343d1 of the first selection plate 343 at the same time, thus the middle tray 304 and the lower tray 305 are held on the tray base 306, on the other hand, the selection members 344c1, 344c2 of the second tray selection plate 344 on the upper plate 342 is retracted to left of the tabs 304c5, 304c6 304d6 of the middle tray 304.

Further, the hanging member 344c3 of the second tray selection plate 344 enters into the space of the pair of connection members 343c3 of the first tray selection member 343 so as to connect the first and second tray selection plates 343, 344.

FIG. 39(B) shows a selection state where the lower tray 305 is selected from the initial state as shown in FIG. 39(A).

At first, the first tray selection plate 343 together with the second try selection plate 344 is displaced in the direction of the arrow X1, at that time, the selection members 343c1, 343c2, 343d1 of the first tray selection plate 343 are displaced or retracted to right of the bent portions 305c3, 305c4, (305d2) of the lower tray 305 and the selection members 344c1, 344c2 of the second tray selection plate 344 is engaged with the bent portions 305c3, 305c4 (305d2) of the lower tray 305.

After that, the lift plate 345 is displaced in the direction of the arrow X2, thus, the the pins 350A, 350B of the upper plate 342 come to the highest positions of the upright guide slots 341c2, 341c3 of the magazine mounting base 341 and the slant guide slots 345c1, 345c2 of the lift plate 345, so that the upper plate 342 together with the lower tray 303 on which the middle tray 304 and the lower tray 305 are stacked, held by the selection member 344c1, 344c2 of the second try selection plate 344 are integrally lifted upward leaving the tray base 306 on the magazine mounting base 341, i,e, the lower tray 305 is selected and separated. The hanging member 344c3 of the second tray selection plate 344 is withdrawn from the pair of connection members 343c3 of the first tray selection member 343 and is positioned just above the connection members 343c3.

FIG. 39(C) shows a selection state where the middle tray 304 is selected from the initial state as shown in FIG. 39(A).

At first, the first tray selection plate 343 together with the second try selection plate 344 is displaced in the direction of the arrow X1, at that time, the lower tray 305 is held on the tray base 306 by causing the selection members 343c1, 343c2, 343d1 of the first tray selection plate 343 to engage with only the bent portions 305c3, 305c4, (305d2) of the lower tray 305, on the other hand, the tabs 304c5, 304c6 of the middle tray 304 are engaged with the selection member 344c1, 344c2 of the second tray selection member 344.

After that, the lift plate 345 is displaced in the direction of the arrow X2, thus, the the pins 350A, 350B of the upper plate 342 come to the highest positions of the upright guide slots 341c2, 341c3 of the magazine mounting base 341 and the slant guide slots 345c1, 345c2 of the lift plate 345, so that the upper plate 342 together with the middle tray 305 on which the upper tray 303 is stacked, held by the selection member 344c1, 344c2 of the second try selection plate 344 are integrally lifted upward leaving the lower tray 305 and the tray base 306 on the magazine mounting base 341, i,e, the middle tray 304 is selected and separated.

FIG. 39(D) shows a selection state where the upper tray 303 is selected from the initial state as shown in FIG. 39(A).

In this state, as shown in FIG. 39(A), the selection members 343c1, 343c2 of the first selection plate 343 hold the middle tray 304 and the lower tray 305 on the tray base 306, thus, the upper tray 303 can be separated and selected by causing the lift plate 345 to displace in the direction of the arrow X2 to lift the upper tray 303 upward together with the upper plate 342 of the magazine loading mechanism 340.

A reverse operation for stacking the separated trays 303–305 tightly again is performed in reverse order regarding the operation order mentioned in the foregoing, thus, the description is omitted.

Next, a description is given to an operation of the disc player 330 referring to FIGS. 40–43, wherein the lower tray 305 is selected as the desired tray, and the disc clamp lever 312A is disengaged from the lock lever 315 upon the insertion of the magazine 301.

Referring to FIGS. 40(A)–40(B), when the lower tray 305 is separated upward, the swing arm 369 mounting the disc play mechanism 360 including the turntable 363 and the optical pickup 365 is rotated centering on the axle 371 or displaced into the predetermined space K formed beneath the lower tray 305 from the R-portion 305f side of the lower tray 305, and the engaging portion 369a of the swing arm 369 abuts on the engage section 306b1 of the tray base 306, so that the spindle section 363a of the turntable 363 is positioned just under the center hole 302b of the disc 302 held by the lower tray 305, wherein the box 361 is floatingly supported on the swing arm 369 so as to isolate outer vibrations.

Figure 41:
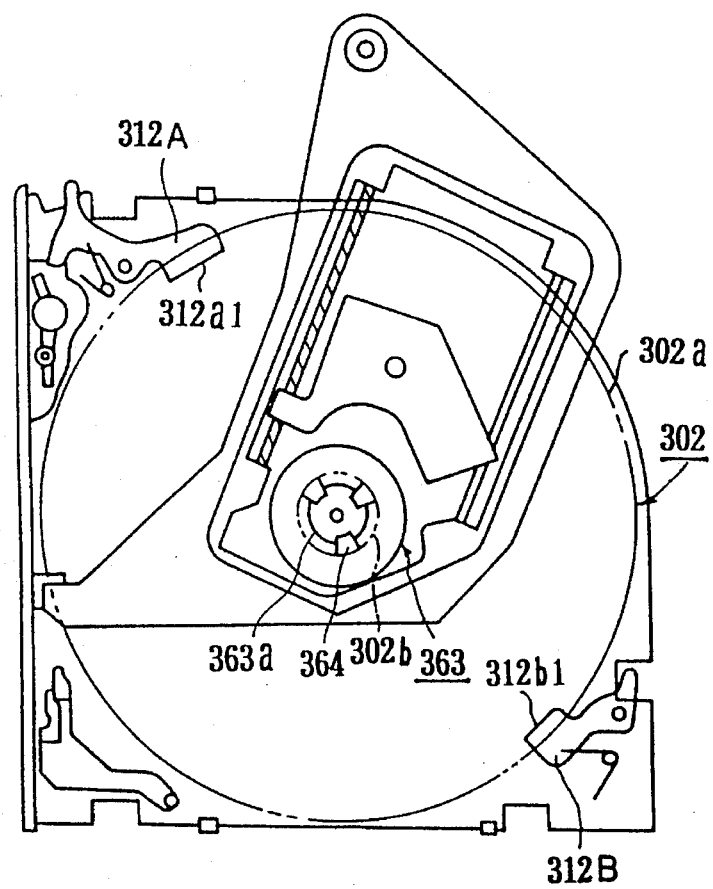
Figure 41B:
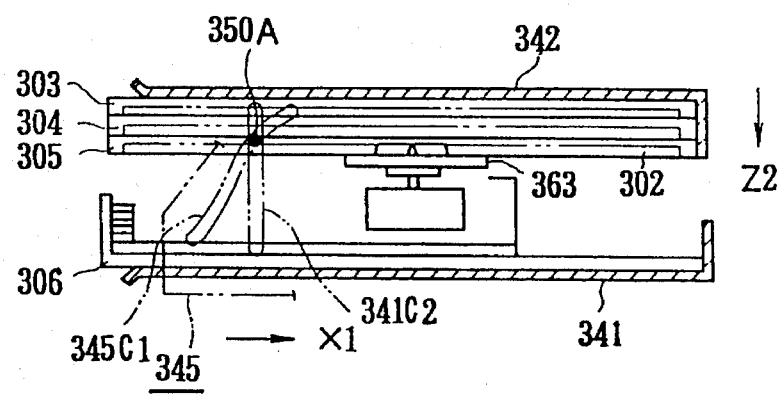

Referring to FIGS. 41(A), 41(B), when the the lift plate 345 is slightly displaced in the direction of the arrow X1, the upper plate 342 and the trays 303–305 integrally go down in the direction of the arrow Z2, thus, the the disc 302 held by the lower tray 305 is placed on the turntable 363 and securely clutched by the nails 364 provided around the spindle section 363. It should be noted that the disc 302 is clutched on the turntable 363 in such a manner that the disc 302 is kept clamped by the disc clamp levers 312A, 312B on the lower tray 305, which enables a secure clutching operation of the nails 364.

Figure 42A:
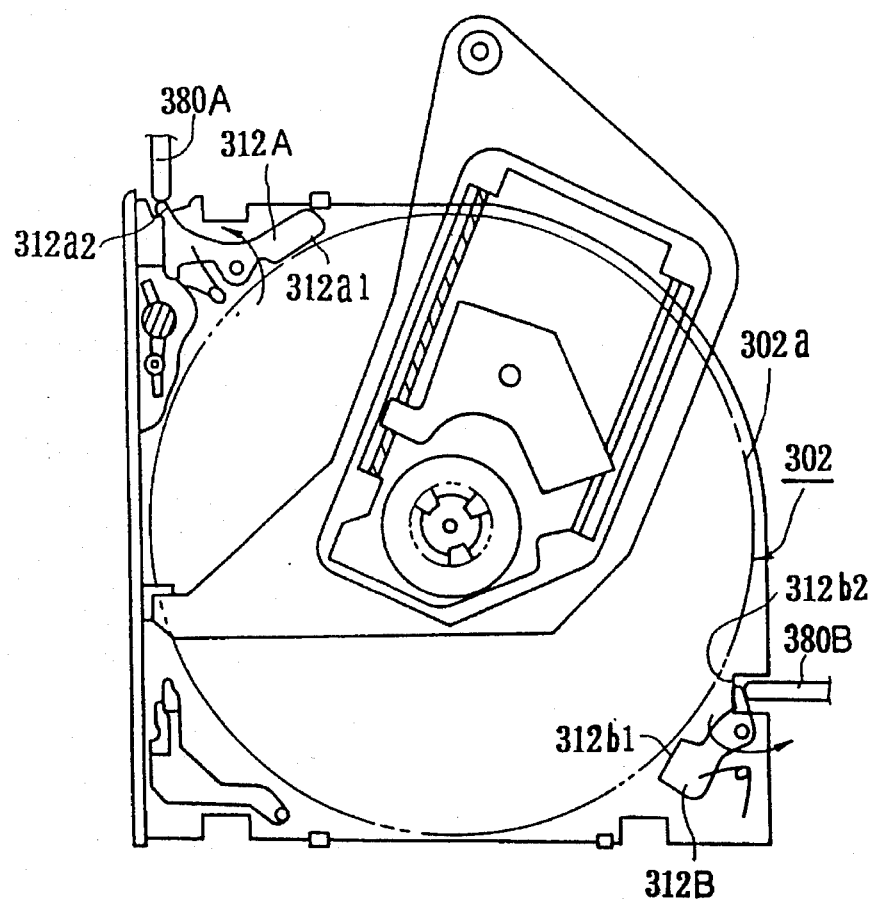
Figure 42B:
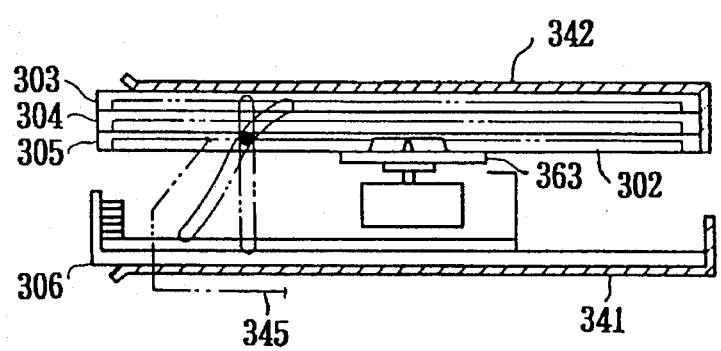
Figure 43:
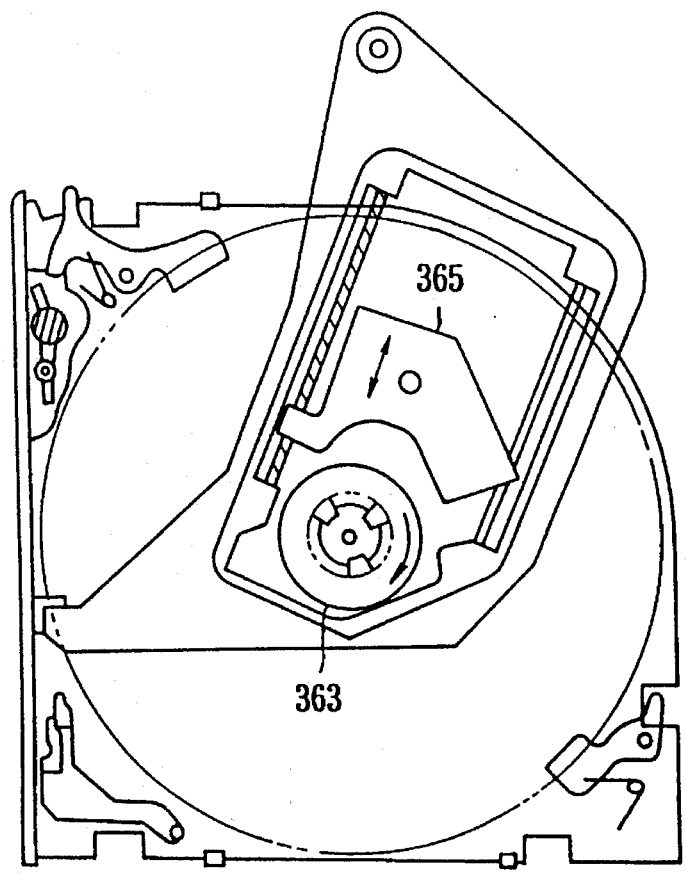
Figure 43:
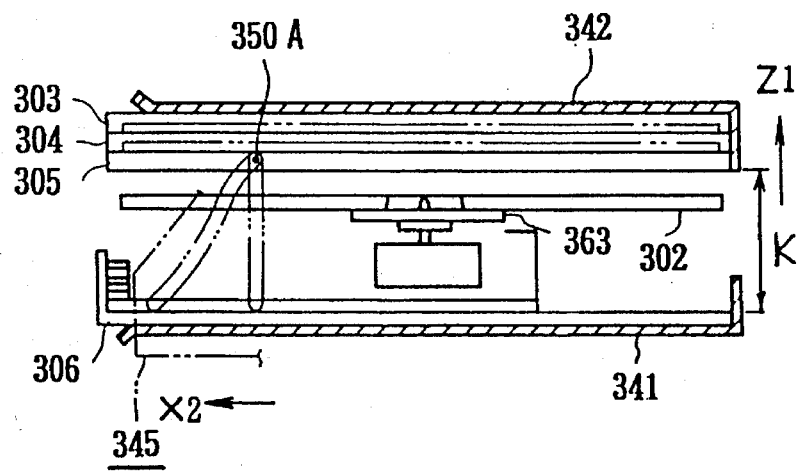

Next, referring to FIGS. 42(A), 42(B), the disc 2 clutched by the nails 364 on the turntable 363 is separated from the lower tray 305 by causing the disc cramp release levers 380A, 380B to abut on the contact sections 312a2, 312b2 of the disc clamp levers 312A, 312B.

Next, referring to FIGS. 43(A), 43(B), when the the lift plate 345 is slightly displaced in the direction of the arrow X2 again, the upper plate 342 and the trays 303–305 are integrally lifted upward in the direction of the arrow Z1, so that the lower tray 305 is retracted from the turntable 363, thus, the only disc 302 is left clutched on the turntable 363 and the predetermined space K is formed beneath the lower tray 305 again.

After that, the disc 302 clutched on the turntable 363 is rotated, and is played by the optical pickup 365 moving in the radial direction of the disc 302.

When the upper tray 303 or the middle tray 304 is selected, the disc play mechanism 360 enters the predetermined space K as shown in FIG. 35(B) or FIG. 35(C). As clearly understood from the foregoing detailed description, in the disc player 330, after the magazine 301 is inserted into the disc player 330 by a user, the desired disc 302 is automatically selected from the trays 303–305 to be played according to the user's choice. Further, it is not necessary for the disc player 330 to provide the disc playing section particularly kept in a position beside the magazine 301 in the disc player 330 as seen in the prior art, which enables a downsizing of the disc player 330, and providing a suitable automatic disc player for a car use, for instance.

What is claimed is:

1. A magazine for accommodating a plurality of discs each held by disc clamp means on a tray, the magazine being loaded into an automatic disc player having a disc play mechanism so that a desired disc in the magazine is automatically selected and played therein, the magazine comprising:

stacked wafers including a tray base and a plurality of stacked trays mounted on the tray base in a directly contacted state with each of the trays disposed contiguous to one another for a given magazine position, with the stacked wafers being separable in a wafer stacked direction;

a magazine slide plate slidably provided under a back surface of the tray base to slide along side faces of the stacked wafers;

magazine slide plate positioning means provided on the tray base for positioning the magazine slide plate into a magazine hand-carried position where the magazine takes a hand-carried state by causing the magazine slide plate to enclose part of the stacked wafers, or into a magazine separable position where the magazine takes a separable state in which the stacked wafers form two groups of wafers in the wafer stacked direction; disc exchanging means mounted on said tray base for allowing the disc to be discharged from and to be mounted on one of the stacked trays in the hand-carried state; and restrict means provided between the tray base and the magazine slide plate for restricting the magazine slide plate in the magazine hand-carried state and for preventing the magazine slide plate from being displaced to take the magazine separable state, whereby the magazine is loaded in the automatic disc player as the magazine slide plate is slidably displaced to take the magazine separable state, and the stacked wafers are separated into the two groups in the wafer stacked direction so that a predetermined single space is provided under one of the stacked trays holding the desired disc as the disc play mechanism as is displaced under the one of the stacked trays and to play the desired disc as the magazine slide plate is displaced to the magazine separable position in the automatic disc player by causing the restrict means to release restriction of the magazine slide plate during loading of the magazine into the automatic disc player and wherein the magazine hand-carried state includes the magazine slide plate taking a first position where the discs are prevented from being released from and/or inserted into the stacked trays and taking a second position where the discs are released from and/or inserted into the stacked trays, and the magazine separable state includes the magazine slide plate taking a third position where the stacked trays are separated, and further wherein the tray base further comprises recesses provided at sides facing each other for guiding the magazine slide plate to positions corresponding to the first position and the third position, and the stacked trays on the tray base comprise first recesses provided at the sides thereof corresponding to the side of the recesses provided on the tray base for guiding the magazine slide plate to positions corresponding to the first position and the third position and second recesses provided in the first recesses, and the magazine slide plate further comprises side plates erected upright each of which has a bent portion being inward at one end thereof facing each other for enclosing part of the periphery of the tray base and the stacked trays, whereby the bent portion of the magazine slide plate prevents the stacked trays from being separated as the magazine slide plate is displaced to one of the first and second positions and wherein at least one of the stacked trays in the magazine is separated in the wafer stacked direction by causing the bent portion to slip out the second recesses therethrough as the magazine slide plate is displaced to the third position.

2. A magazine for accommodating a plurality of discs each held by disc clamp means on a tray, the magazine being loaded into an automatic disc player having a disc play mechanism so that a desired disc in the magazine is automatically selected and played therein, the magazine comprising:

stacked wafers including a tray base and a plurality of stacked trays mounted on the tray base in a directly contacted state with each of the trays disposed contiguous to one another for a given magazine position, with the stacked wafers being separable in a wafer stacked direction;

a magazine slide plate slidably provided under a back surface of the tray base to slide along side faces of the stacked wafers;

magazine slide plate positioning means provided on the tray base for positioning the magazine slide plate into a magazine hand-carried position where the magazine takes a hand-carried state by causing the magazine slide plate to enclose part of the stacked wafers, or into a magazine separable position where the magazine takes a separable state in which the stacked wafers form two groups of wafers in the wafer stacked direction;

disc exchanging means mounted on said tray base for allowing the disc to be discharged from and to be mounted on one of the stacked trays in the hand-carried state; and restrict means provided between the tray base and the magazine slide plate for restricting the magazine slide plate in the magazine hand-carried state and for preventing the magazine slide plate from being displaced to take the magazine separable state, whereby the magazine is loaded in the automatic disc player as the magazine slide plate is slidably displaced to take the magazine separable state, and the stacked wafers are separated into the two groups in the wafer stacked direction so that a predetermined single space is provided under one of the stacked trays holding the desired disc as the disc play mechanism is displaced under the one of the stacked trays and to play the desired disc as the magazine slide plate is displaced to the magazine separable position in the automatic disc player by causing the restrict means to release restriction of the magazine slide plate during loading of the magazine into the automatic disc player, lock means for locking the disc clamp means to prevent the disc held by the tray from being released out of the tray as the magazine slide plate takes the magazine hand-carried state, the lock means further comprising a lock release member for releasing a lock engagement of the lock means from the disc clamp means to release the disc out of the tray by being actuated thereby, wherein the tray base further comprises sliding slots provided at sides thereof facing each other for guiding the magazine slide plate to positions taking the magazine separable state and the magazine hand-carried state, and an uppermost tray among the stacked trays on the tray base comprises engaging members hanging downward at the sides thereof corresponding to the sides of the sliding slots of the tray base in such a manner that the engaging members enclose the sides of the stacked trays by causing the engaging members to enter the sliding slots, and the magazine slide plate further comprises engaging portions erected upright, each of which has a bent portion being bent outward at one end thereof facing each other, wherein the engaging portions of the magazine slide plate prevent the uppermost tray from being separated by causing the engaging portion to engage with the engaging members through the sliding slots as the magazine slide plate is displaced to the position taking the magazine hand-carried state, and wherein at least one of the stacked trays in the magazine is separated in the wafer stacked direction by causing the engaging portions to disengage from the engaging members to slip out of the sliding slots as the magazine slide plate is displaced to the position taking the separable state.

3. An automatic disc player adapted to use a magazine comprising a plurality of stacked wafers including a tray base and a plurality of trays stacked on the tray base in a directly contacted state for holding a plurality of discs thereon and a magazine slide plate for separably coupling the stacked wafers forming the magazine, each of the trays having a selection engage portion for being selected in the magazine, the automatic disc player having means for selecting a desired disc held by a selected tray and separating the selected tray from the trays by causing the magazine slide plate to displace to a position of a magazine separable state during an insertion of the magazine in the automatic disc player, the automatic disc player comprising:

magazine loading means for displacing and positioning the magazine to the position of the magazine separable state during the insertion of the magazine in the automatic disc player by engaging with the tray base of the magazine;

disc play means including a turntable and pickup means; and tray selection and separation means for selecting one of the trays holding the desired disc and for separating the magazine into two groups of the wafers in a wafer stacked direction so as to provide a predetermined single space beneath the selected tray such that the disc play means accesses the desired disc to be played by engaging with the selection engage portion of the selected tray, wherein the magazine loading means further comprises a magazine mounting base for mounting the tray base of the magazine together with the stacked trays and for displacing the magazine to the position taking the magazine separable state by engaging with the selection engage portion of the selected tray, and the tray selection and separation means further comprises an upper plate provided movably up and down on the magazine mounting base for forming together with the magazine mounting base an inlet therebetween and for lifting an uppermost tray to a predetermined height, a first tray selection plate slidably provided under a bottom of the magazine mounting base for holding one part of the separated magazine on the magazine mounting base, and a second tray selection plate slidably provided on an upper surface of the upper plate for holding another part of the separated magazine on the upper plate.

* * * * *